(12) United States Patent
Asano

(10) Patent No.: US 7,088,822 B2
(45) Date of Patent: Aug. 8, 2006

(54) INFORMATION PLAYBACK DEVICE, INFORMATION RECORDING DEVICE, INFORMATION PLAYBACK METHOD, INFORMATION RECORDING METHOD, AND INFORMATION RECORDING MEDIUM AND PROGRAM STORAGE MEDIUM USED THEREWITH

(75) Inventor: Tomoyuki Asano, Kanagawa (JP)

(73) Assignee: Sony Corporation (JP)

( * ) Notice: Subject to any disclaimer, the term of this patent is extended or adjusted under 35 U.S.C. 154(b) by 834 days.

(21) Appl. No.: 10/075,016

(22) Filed: Feb. 13, 2002

(65) Prior Publication Data

US 2002/0152387 A1 Oct. 17, 2002

(30) Foreign Application Priority Data

Feb. 13, 2001 (JP) ............................. P2001-034968
Feb. 13, 2001 (JP) ............................. P2001-034969

(51) Int. Cl.
*H04L 9/00* (2006.01)
*H09N 7/167* (2006.01)
*H04L 9/30* (2006.01)
*G06F 11/30* (2006.01)
*G06Q 40/00* (2006.01)
*H04K 1/00* (2006.01)

(52) U.S. Cl. .................. 380/45; 713/189; 713/190; 713/191; 713/193; 380/201; 380/202; 380/203; 380/30; 380/278; 380/281; 380/284; 705/51; 705/57

(58) Field of Classification Search ........ 713/189–193, 713/155–158, 165, 176, 200–202; 380/201–203, 380/44–47, 277–282, 30; 705/51–57
See application file for complete search history.

(56) References Cited

U.S. PATENT DOCUMENTS

| 5,754,659 | A | * | 5/1998 | Sprunk et al. ................ 380/30 |
| 6,069,957 | A | * | 5/2000 | Richards ..................... 380/281 |
| 6,138,237 | A | * | 10/2000 | Ruben et al. ............... 713/200 |
| 6,253,193 | B1 | * | 6/2001 | Ginter et al. ................. 705/57 |
| 6,307,936 | B1 | * | 10/2001 | Ober et al. ................... 380/30 |

FOREIGN PATENT DOCUMENTS

JP 11-224461 A 8/1999

* cited by examiner

*Primary Examiner*—Christopher Revak
*Assistant Examiner*—Longbit Chai
(74) *Attorney, Agent, or Firm*—Learner, David, Littenberg, Krumholz & Mentlik, LLP

(57) ABSTRACT

By recording a digital signature and a public key certificate when recording data on an information recording medium, a recording device having recorded content can be specified. If recording media including illegally recorded data are distributed, the recording device used for the recording can be specified and can be excluded from the system. An information playback device verifies the validity of the digital signature and public key certificate when reading data, specifies a content recorder, and verifies no falsification in the digital signature and the public key certificate before playing back the data. This structure can efficiently exclude the playback of content recorded by an invalid recording device.

46 Claims, 35 Drawing Sheets

FIG. 12A

| GENERATION: t | |
|---|---|
| INDEX | ENCRYPTION KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG. 12B

| GENERATION: t | |
|---|---|
| INDEX | ENCRYPTION KEY |
| 000 | Enc(K000, K(t)00) |
| 001 | Enc(K(t)001, K(t)00) |
| 0010 | Enc(K0010, K(t)001) |

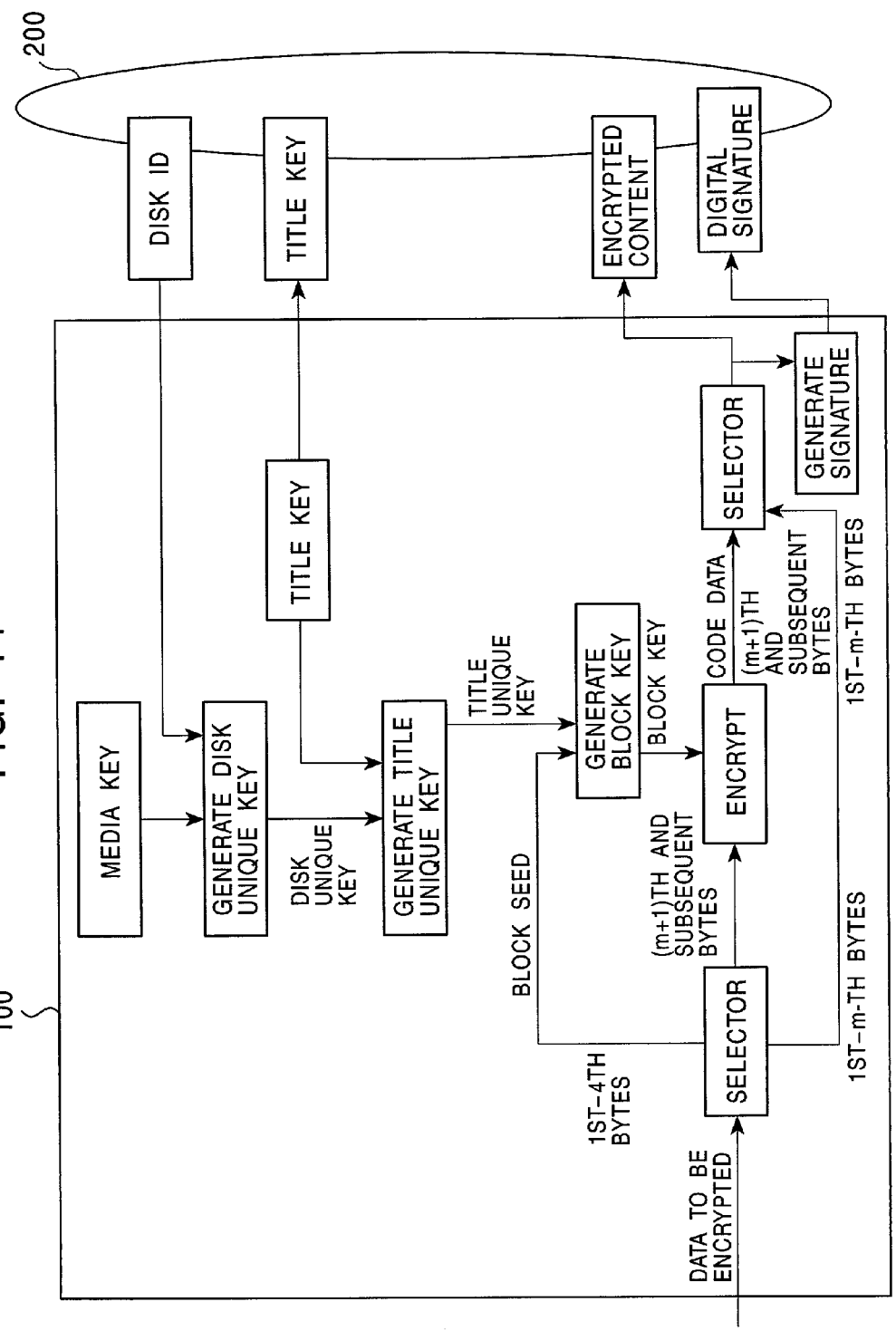

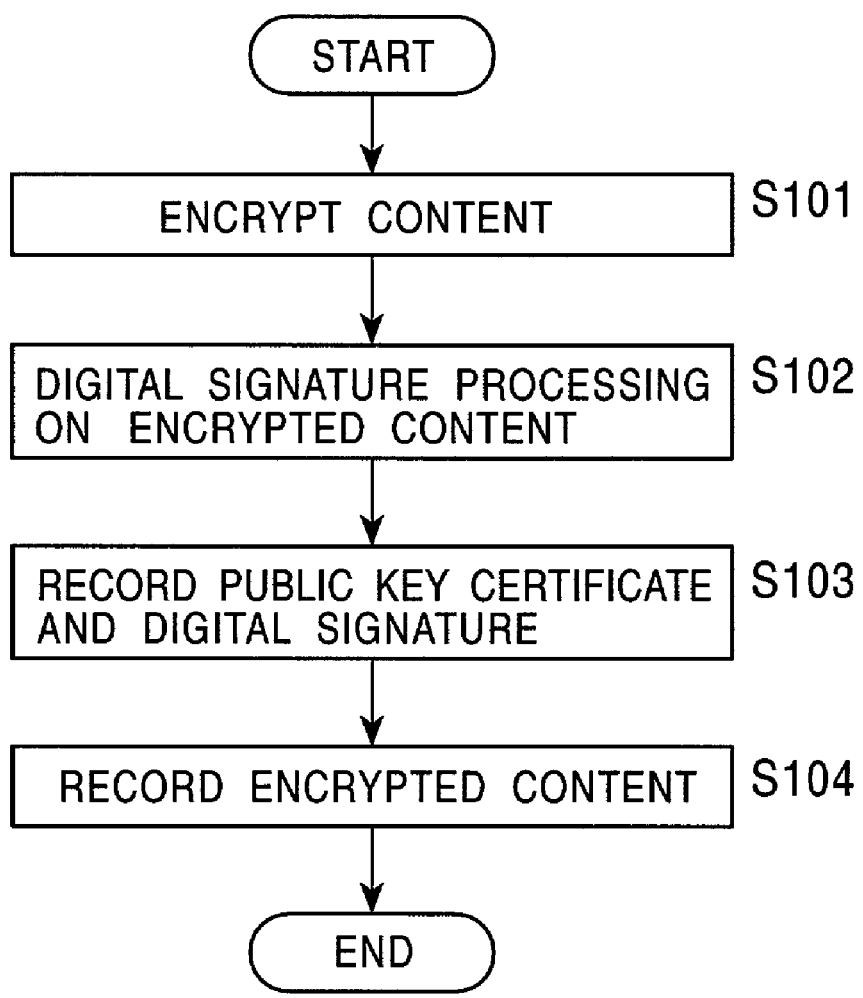

FIG. 20

| | |
|---|---|
| | CONTENT DATA ADDRESS |
| | TITLE KEY ADDRESS |
| FILE 1 | DIGITAL SIGNATURE ADDRESS |
| | PUBLIC KEY CERTIFICATE ADDRESS |
| | OTHER INFORMATION |
| | CONTENT DATA ADDRESS |
| | TITLE KEY ADDRESS |
| FILE 2 | DIGITAL SIGNATURE ADDRESS |
| | PUBLIC KEY CERTIFICATE ADDRESS |
| | OTHER INFORMATION |
| ⋮ | ⋮ |

FIG. 23

| VERSION NUMBER |
| --- |
| ID OF DEVICE TO BE REVOKED |
| ⋮ |
| DIGITAL SIGNATURE OF CENTER |

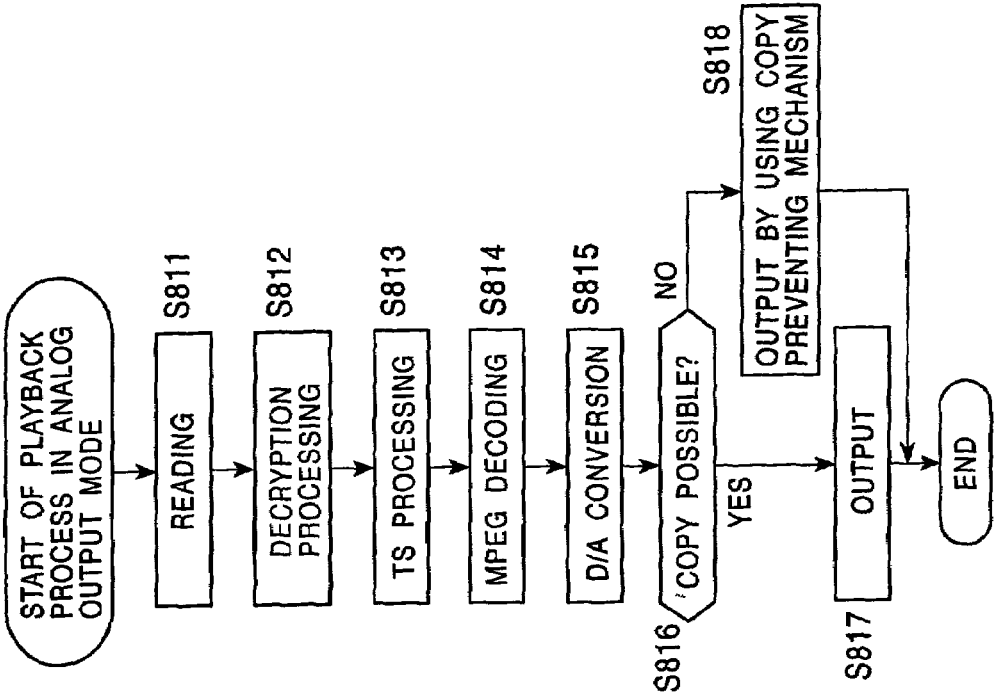
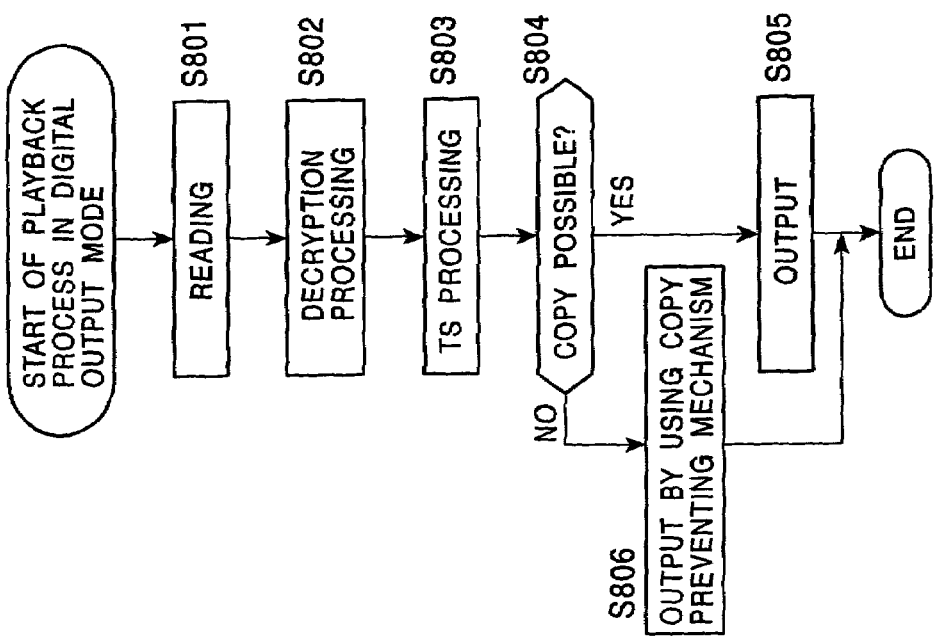

INFORMATION PLAYBACK DEVICE, INFORMATION RECORDING DEVICE, INFORMATION PLAYBACK METHOD, INFORMATION RECORDING METHOD, AND INFORMATION RECORDING MEDIUM AND PROGRAM STORAGE MEDIUM USED THEREWITH

CROSS-REFERENCE TO RELATED APPLICATIONS

The present application claims priority from Japanese application Nos. 2001-034968 filed Feb. 13, 2001 the disclosures of which are hereby incorporated by reference herein.

The present invention relates to information playback devices, information recording devices, information playback methods, information recording methods, and information recording media and program storage media used therewith. In particular, the present invention relates to an information playback device, an information recording device, an information playback method, an information recording method, and an information recording medium and a program storage medium used therewith that constitute a system in which the information recording device records its own digital signature and public key certificate when recording data on the recording medium, and the information playback device verifies the validity of the digital signature and public key certificate when reading the data, and can read the data after verifying that the information recording device has not been revoked.

With the progress and development of digital signal processing technology, recording devices and recording media for digital data recording have come into widespread use in recent years. By using the recording devices and recording media, images and sound can be repeatedly recorded and played back without deteriorating. In this manner, digital data can be repeatedly copied, with image and sound quality maintained. Accordingly, if illegally copied recording media are distributed in the market, the profits of copyright holders of various types of content, such as music and movies, or appropriate distributors of the content, will be damaged. Nowadays, to prevent such unauthorized copying of digital data, various mechanisms (systems) are applied to digital recording devices and recording media.

By way of example, in Minidisk (MD) (trademark) devices, the Serial Copy Management System (SCMS) is employed as a method of preventing unauthorized copying. In the SCMS, a data playback side outputs an SCMS signal with audio data from a digital interface (DIF), and a data recording side controls, based on the SCMS signal, recording of the audio data from the data playback side so that unauthorized copying can be prevented.

Specifically, the SCMS signal represents audio data of a "Copy Free" type in which the audio data may be copied any number of times, a "Copy Once Allowed" type in which the audio data may be copied only once, and a "Copy Prohibited" type in which the audio data is prohibited from being copied. When receiving the audio data from the digital interface, the data recording side detects the SCMS signal which is transmitted with the audio data. When the received SCMS signal represents the Copy Free type, the data recording side records the audio data on the Minidisk with the SCMS signal. When the SCMS signal represents the Copy Once Allowed type, the data recording side records the audio data on the Minidisk after changing the type of the audio data to the Copy Prohibited type. When the SCMS signal represents the Copy Prohibited type, the data recording side does not record the audio data. By using SCMS control, the Minidisk device prevents copyrighted audio data from being illegally copied.

However, it is difficult for the SCMS to cope with a case in which a Minidisk device having no structure for performing SCMS control is produced because the SCMS is based on the condition that a data recording device itself must have the above structure for performing control of the recording of audio data from the playback side. Accordingly, for example, digital versatile disk (DVD) players use a content scramble system to prevent copyrighted data from being illegally copied.

In the content scramble system, video data, audio data, etc., are recorded in a DVD-ROM in encrypted form, and a key (decryption key) for decrypting the encrypted data is given to a licensed DVD player. The license is given to a DVD player designed to obey predetermined operation rules such as not performing unauthorized copying. Accordingly, the licensed DVD player can play back images and sound from the DVD-ROM by using the given key to decrypt the encrypted data in the DVD-ROM.

Conversely, an unlicensed DVD player cannot decrypt the encrypted data in the DVD-ROM because it does not have the key for decrypting the encrypted data. In the scramble system, a DVD player that does not meet the conditions required for licensing may not play back a DVD-ROM containing digital data, so that unauthorized copying is prevented.

Nevertheless, the content scramble system employed in the DVD-ROM is directed to recording media (hereinafter referred to also as "ROM media") in which data writing by the user is impossible. The content scramble system is not applicable to recording media (hereinafter referred to also as "RAM media") in which data writing by the user is possible.

In other words, if data contained in ROM media is encrypted, unchanged copying of the entire encrypted data to RAM media makes it possible to create a so-called "pirated edition" which can be played back by a licensed valid device.

Accordingly, in an earlier patent application, Japanese Unexamined Patent Application Publication No. 11-224461 (Japanese Patent Application No. 10-25310), the assignee of the present application has proposed a construction in which by recording, on a recording medium, information (hereinafter referred to as "medium identification information") for identifying each recording medium together with other data, and using a condition that a device be licensed for use of the medium identification information, only when the condition is met does the device access the medium identification information on the recording medium.

In this construction, data on the recording medium is encrypted using the medium identification information and a secret key (master key) which is obtained when receiving a license. If an unlicensed device has read the encrypted data, it cannot obtain semantic data. When the device is licensed, its operations are regulated so as not to perform unauthorized reproduction (illegal copying).

The unlicensed device may not access the medium identification information, and the medium identification information has a unique value for each recording medium. Thus, if the unlicensed device has copied all pieces of encrypted data on a new recording medium, the encrypted data on the new recording medium cannot be correctly decrypted not only by the unlicensed device but also by even the licensed device. Therefore, illegal copying is substantially prevented.

In the above construction, in general, a common master key is stored in all licensed devices. This is because storing of the common master key in the devices is the condition required so that a recording medium having data recorded by one device may be played back by other devices (interoperability is ensured).

However, in this construction, if an attacker has succeeded in attacking one device and has extracted the master key, the attacker can decrypt the encrypted data contained in the entire system, so that the entire system may collapse. To prevent this situation, when it is detected that a device is attacked and the master key is exposed, the master key must be updated to a new one, and the updated master key must be given to all the devices other than the successfully attacked device. Concerning the simplest method for implementing this technique, it is possible to provide unique keys (device keys) for a plurality of devices, prepare values which are encrypted using the device keys, and send the values by a recording medium. In this case, the amount of all messages to be sent increases in proportion to the number of devices.

To solve this problem, the assignee of the present Application has already filed Japanese Patent Application 2000-105328 about a system in which, by using a key distribution method of arranging information recording/playback devices as leaves of an n-ary tree, and distributing by recording medium or communication link the key (master key or media key) required for recording/playback of content data on the recording medium so that each device can record or play back the content data, the master key or the media key can be sent using a small amount of messages to each valid device in which secret information is not exposed. Specifically, in this construction, each device can obtain the key required for recording/playback of information on the recording medium by setting, as an updating node key, the key required for generating the key required for recording/playback of information on the recording medium, for example, a node key assigned for each leaf of the n-ary tree, distributing to each information recording/playback device an enabling key block (EKB) including information generated by encrypting the updating node key using a leaf key and the node key possessed only by a valid device so that the information can be decrypted, and performing enabling-key-block decryption in each information recording/playback device when it receives the enabling key block (EKB).

The above system can exclude a device whose secrecy has been exposed. For this purpose, which device has had its secrecy exposed must be specified. For example, if it is found that a clone device having secrecy stolen from a certain device is made and sold on a black market, the device from which its secrecy was stolen can be specified and excluded from the system.

In addition, when considering attacks on the system, clone devices are not likely to be produced and marketed as described above, but a possible conduct is that, by altering an information recording device to perform unlawful recording, such as recording in plaintext of data that must normally be recorded in encrypted form, recording media having unlawfully recorded data, which are produced by using the altered information recording device, will be sold. In this case, the above method makes it possible that, if the information recording device used for the unlawful recording is specified, the device can be excluded and new content data can be distributed so as not to be decrypted by the excluded device.

SUMMARY OF THE INVENTION

To solve the above problem, it is an object of the present invention to provide an information playback device, an information recording device, an information playback method, an information recording method, and an information recording medium and a program storage medium used therewith that constitute a system in which the information recording device records its own digital signature and public key certificate when recording data on the recording medium, and the information playback device verifies the validity of the digital signature and public key certificate when reading the data, whereby content can be played back if the content has been validly recorded.

In addition, a method in which, if content data was recorded on a recording medium by an invalid device, a valid device is prevented from playing back the content data is considered effective to baffle evil intentions of pirated copy sellers, etc., which use invalid devices to unlawfully record content for sale. However, no specific method for practice has been proposed.

Accordingly, to solve the above problem, it is also an object of the present invention to provide a system in which when an information recording device records data on a recording medium, it records its own digital signature and public key certificate with the data, and when an information playback device reads the data, it verifies the digital signature and the public key certificate, and in which the information playback device reads the data after verifying that the recording device has not been revoked.

To these ends, according to a first aspect of the present invention, there is provided an information playback device for playing back information from a recording medium having encrypted content recorded thereon by a content recording entity. The information playback device includes a cryptosystem unit operable to determine the validity of a public key certificate of the content recording entity, to acquire a public key of the content recording entity from the public key certificate if the public key certificate is valid, and to decrypt the encrypted content if the validity of a digital signature of the content recording entity is verified based on the acquired public.

Preferably, the digital signature of the content recording entity is generated by digitally signing the encrypted content, and the cryptosystem unit decrypts the encrypted content if the validity of the generated digital signature is verified.

The digital signature of the content recording entity may be generated by digitally signing a title key which corresponds to the encrypted content, and the cryptosystem unit may decrypt the encrypted content if the validity of the generated digital signature is verified.

The information playback device may include a plurality of nodes constituting a layered key-tree structure having a plurality of different information playback devices as leaves, the key-tree structure defining a plurality of node paths each including a multiplicity of the nodes arranged serially from a lowermost node to an uppermost node; and a plurality of stored keys including node keys unique to the plurality of nodes and leaf keys unique to the plurality of different information playback devices; wherein the cryptosystem unit may acquire decryption-key-generating data required for decrypting the encrypted content by decrypting, based on the stored keys, an enabling key block composed of data generated by using each key on one node path to encrypt a next adjacent upper key on the one node path.

The decryption-key-generating data may be a master key common to the plurality of different information playback devices or a media key unique to the recording medium.

According to a second aspect of the present invention, there is provided an information recording device for recording information on a recording medium. The information recording device includes a cryptosystem unit operable to encrypt content recorded on the recording medium by a content recording entity. The cryptosystem unit generates a digital signature of the content recording entity, and records the encrypted content, the digital signature, and a public key certificate of the content recording entity on the recording medium so as to correspond to one another.

Preferably, the information recording device includes a processing unit operable to generate a management table having correspondences among addresses of the encrypted content, the digital signature, and the public key certificate, and to record the management table on the recording medium.

The cryptosystem unit may generate the digital signature of the content recording entity by digitally signing the encrypted content, and may record the generated digital signature in association with the encrypted content.

The cryptosystem unit may generate the digital signature of the content recording entity by digitally signing a title key which corresponds to the encrypted content, and may record the generated digital signature in association with the encrypted content.

The information recording device may include a plurality of nodes constituting a layered key-tree structure having a plurality of different information playback devices as leaves, the key-tree structure defining a plurality of node paths each including a multiplicity of the nodes arranged serially from a lowermost node to an uppermost node; and a plurality of stored keys including node keys unique to the plurality of nodes and leaf keys unique to the plurality of different information playback devices; wherein the cryptosystem unit is operable to acquire encryption-key-generating data required for encrypting the content recorded on the recording medium by decrypting, based on the stored keys, an enabling key block composed of data generated by using each key in one node path to encrypt a next adjacent upper key on the one node path.

The encryption-key-generating data may be a master key common to the plurality of different information playback devices or a media key unique to the recording medium.

According to a third aspect of the present invention, there is provided a method for playing back information from a recording medium having encrypted content recorded thereon by a content recording entity. The information playback method includes determining the validity of a public key certificate of the content recording entity; acquiring a public key of the content recording entity from the public key certificate if the public key certificate is valid; verifying the validity of a digital signature of the content recording entity based on the acquired public key; and decrypting the encrypted content if the validity of the digital signature is verified.

Preferably, the digital signature of the content recording entity is generated by digitally signing the encrypted content, and the step of verifying the validity of the digital signature includes verifying the validity of the generated digital signature.

The digital signature of the content recording entity may be generated by digitally signing a title key which corresponds to the encrypted content, and the step of verifying the validity of the digital signature may include verifying the validity of the generated digital signature.

The information playback method may further include providing an information playback device having a plurality of nodes constituting a layered key-tree structure having a plurality of different information playback devices as leaves, the key-tree structure defining a plurality of node paths each including a multiplicity of the nodes arranged serially from a lowermost node to an uppermost node, and a plurality of stored keys including node keys unique to the plurality of nodes and leaf keys unique to the plurality of different information playback devices; generating key data by using each key on one node path to encrypt a next adjacent upper key on the one node path; and acquiring decryption-key-generating data required for decrypting the encrypted content by decrypting, based on the stored keys, an enabling key block composed of the key data.

According to a fourth aspect of the present invention, there is provided a method for recording information on a recording medium. The information recording method includes encrypting content recorded on the recording medium by a content recording entity; generating a digital signature of the content recording entity; and recording the encrypted content, the digital signature, and a public key certificate of the content recording entity on the recording medium so as to correspond to one another.

Preferably, the information recording method generates a management table having correspondences among addresses of the encrypted content, the digital signature, and the public key certificate, and records the management table on the recording medium.

The digital signature of the content recording entity may be generated by digitally signing the encrypted content, and the generated digital signature may be recorded on the recording medium in association with the encrypted content.

The digital signature of the content recording entity may be generated by digitally signing a title key which corresponds to the encrypted content, and the generated digital signature may be recorded on the recording medium in association with the encrypted content.

The information recording method may further include providing an information recording device having a plurality of nodes constituting a layered key-tree structure having a plurality of different information playback devices as leads, the key-tree structure defining a plurality of node paths each including a multiplicity of the nodes arranged serially from a lowermost node to an uppermost node, and a plurality of stored keys including node keys unique to the plurality of nodes and leaf keys unique to the plurality of different information playback devices; generating key data by using each key on one node path to encrypt a next adjacent upper key on the one node path; and acquiring encryption-key-generating data required for encrypting the content recorded on the recording medium by decrypting, based on the stored keys, an enabling key block composed of the key data.

According to a fifth aspect of the present invention, there is provided an information recording medium, including encrypted content recorded thereon by a content recording entity; identification data for identifying the content recording entity; a public key certificate of the content recording entity; and a digital signature of the content recording entity.

Preferably, the recording medium further includes a management table having correspondences among addresses of the encrypted content, the digital signature, and the public key certificate.

According to a sixth aspect of the present invention, there is provided a program storage medium storing a computer program for controlling a computer system to execute a process for playing back information from a recording medium having encrypted content recorded thereon by a content recording entity. The computer program includes determining the validity of a public key certificate of the content recording entity; acquiring a public key of the content recording entity from the public key certificate if the public key certificate is valid; verifying the validity of a digital signature of the content recording entity based on the acquired public key; and decrypting the encrypted content if the validity of the digital signature is verified.

According to a seventh aspect of the present invention, there is provided a program storage medium storing a computer program for controlling a computer system to execute a process for recording information on a recording medium. The computer program includes encrypting content recorded on the recording medium by a content recording entity; generating a digital signature of the content recording entity; and recording the encrypted content, the digital signature, and a public key certificate of the content recording entity on the recording medium so as to correspond to one another.

According to an eighth aspect of the present invention, there is provided an information playback device for playing back information from a recording medium having encrypted content recorded thereon by a content recording entity. The information playback device includes a cryptosystem unit operable to acquire from the recording medium identification data representing the content recording entity, to determine a revocation state of the content recording entity based on the acquired identification data, and to decrypt the encrypted content if the content recording entity has not been revoked.

Preferably, the cryptosystem unit is operable to determine the validity of a public key certificate of the content recording entity, to acquire data identifying the content recording entity from the public key certificate if the public key certificate is valid, and to determine whether the content recording entity has been revoked based on the identifying data.

The cryptosystem unit may decrypt the encrypted content if the validity of a digital signature of the content recording entity is verified.

The cryptosystem unit may determine the validity of a public key certificate of the content recording entity, may acquire a public key of the content recording entity from the public key certificate if the public key certificate is valid, and may decrypt the encrypted content if the validity of a digital signature of the content recording entity is verified based on the public key.

The cryptosystem unit may determine the validity of a digital signature of the content recording entity generated by digitally signing the encrypted content, and may decrypt the encrypted content if the digital signature is valid.

The cryptosystem unit may determine the validity of a digital signature of the content recording entity generated by digitally signing a title key which corresponds to the encrypted content, and may decrypt the encrypted content if the digital signature is valid.

The cryptosystem unit may determine the validity of a public key certificate of the content recording entity, may acquire data identifying the content recording entity from the public key certificate if the public key certificate is valid, and may determine whether the content recording entity has been revoked based on a comparison between the identifying data and an identification stored in a revocation list.

The information playback device may further include a layered key-tree structure having a plurality of devices as leaves, the key-tree structure defining a plurality of paths each including a root, nodes and the leaves arranged serially from the root to an end leaf, each of the root, nodes and leaves corresponding to a unique key. The cryptosystem unit may determine the validity of a public key certificate of the content recording entity, may acquire data identifying the content recording entity from the public key certificate if the public key certificate is valid, and may determine whether the content recording entity has been revoked by executing a process, based on the identifying data, of following the indices of an enabling key block composed of data generated by using each of the keys on a selected path to encrypt a next adjacent upper key on the selected path.

The information playback device may have a plurality of node keys constituting a layered key-tree structure having a plurality of different information playback devices as leaves, the key-tree structure defining a plurality of node paths each including a multiplicity of the nodes arranged serially from a lowermost node to an uppermost node; and a plurality of stored keys including node keys unique to the plurality of nodes. The cryptosystem unit may acquire decryption-key-generating data required for decrypting the encrypted content by decrypting, based on one of the stored keys, an enabling key block composed of data generated by using each of the keys on one node path to encrypt a next adjacent upper key on the one node path.

The decryption-key-generating data may be a master key common to the plurality of different information playback devices or a media key unique to the recording medium.

According to a ninth aspect of the present invention, there is provided a method for playing back information from a recording medium having encrypted content recorded thereon by a content recording entity. The information playback method includes acquiring from the recording medium identification data representing the content recording entity; determining a revocation state of the content recording entity based on the acquired identification data; and decrypting the encrypted content if the content recording entity has not been revoked.

Preferably, after determining the validity of a public key certificate of the content recording entity, the information playback method may acquire data identifying the content recording entity from the public key certificate if the public key certificate is valid, and determine whether the content recording entity has been revoked based on the identifying data.

After verifying the validity of a digital signature of the content recording entity, the information playback method may decrypt the encrypted content if the validity of the digital signature is verified.

After determining the validity of a public key certificate of the content recording entity, the information playback method may acquire a public key of the content recording entity from the public key certificate if the public key certificate is valid, verify the validity of a digital signature of the content recording entity based on the public key, and decrypt the encrypted content if the validity of the digital signature is verified.

After verifying the validity of a digital signature of the content recording entity generated by digitally signing the encrypted content, the information playback method may decrypt the encrypted content if the digital signature is valid.

After verifying the validity of a digital signature of the content recording entity generated by digitally signing a title key corresponding to the encrypted content, the information playback method may decrypt the encrypted content if the digital signature is valid.

After determining the validity of a public key certificate of the content recording entity, the information playback method may acquire data identifying the content recording entity from the public key certificate if the public key certificate is valid, and may determine whether the content recording entity has been revoked based on a comparison between the identifying data and an identification stored in a revocation list.

The information playback method may further include providing an information playback device having a layered key-tree structure having a plurality of devices as leaves, the key-tree structure defining a plurality of paths each including a root, nodes and the leaves arranged serially from the root to an end leaf, each of the root, nodes and leaves corresponding to a unique key; determining the validity of a public key certificate of the content recording entity; acquiring data identifying the content recording entity from the public key certificate if the public key certificate is valid; and determining whether the content recording device has been revoked by executing a process, based on the identifying data, of following the indices of an enabling key block composed of data generated by using each of the keys on a selected path to encrypt a next adjacent upper key on the selected path.

The information playback method may further include providing an information playback device having a plurality of nodes constituting a layered key-tree structure having a plurality of different information playback devices as leaves, and a plurality of stored keys including node keys unique to the plurality of nodes and leaf keys unique to the plurality of nodes; and acquiring decryption-key-generating data for decrypting the encrypted content by decrypting an enabling key block based on the stored keys.

According to a tenth aspect of the present invention, there is provided an information recording medium, including encrypted content recorded thereon by a content recording entity; a public key certificate of the content recording entity; a digital signature of the content recording entity; and a revocation list.

Preferably, the recording medium further includes a management table having correspondences among addresses of the encrypted content, the digital signature, and the public key certificate.

According to an eleventh aspect of the present invention, there is provided a program storage medium storing a computer program for controlling a computer system to execute a process for playing back information from a recording medium having encrypted content recorded thereon by a content recording entity. The computer program includes acquiring from the recording medium identification data representing the content recording entity; determining a revocation state of the content recording entity based on the acquired identification data; and decrypting the encrypted content if the content recording entity has not been revoked.

In the present invention, when recording data on an information recording medium, an information recording device records its own digital signature and public key certificate with the data. Therefore, since evidence showing which recording/playback device was used for recording is always recorded with the data in the case of recording information, which recording/playback device was used for recording is specified and can be excluded from the system, even if recording media including illegally recorded data are distributed.

In addition, a playback device is designed so that it can read data after verifying the validity of the digital signature and the public key certificate. This prevents a situation in which an invalid recording device does not digitally sign unlawfully recorded data. In other words, if the recorded data has no valid digital signature, a valid playback device cannot play back the data.

By distributing, to each information playback device, revocation information indicating which device has been revoked, each valid playback device can verify whether a recording device having recorded data has been revoked. Accordingly, exclusion of the invalid device is strengthened in such a way that the data a data playback is stopped if revocation is found.

According to the present invention, when recording data on an information recording medium, an information recording device records its own digital signature and public key certificate with the data. Accordingly, evidence showing which recording/playback device was used for recording is always recorded with the data in the case of recording information. Before decrypting content, an information playback device verifies the validity of the digital signature and the public key certificate, specifies the recorder of the content, and verifies that the digital signature has not been falsified. This enables efficient exclusion of the use (playback) of content recorded by an invalid recording device. In addition, if a recording medium having unlawfully recorded data is distributed, it can be excluded from the system because a recording device having recorded the data on the recording medium can be specified.

BRIEF DESCRIPTION OF THE DRAWINGS

FIGS. 12A and 12B are EKBs for use in the distribution of keys to the information recording/playback device of the present invention;

FIG. 14 is a block diagram showing encryption processing performed when data recording processing using a media key is performed in the information recording/playback device of the present invention;

FIG. 18 is a flowchart showing an encryption process performed when data recording processing is performed in the information recording/playback device of the present invention;

FIG. 20 is an illustration of an example of a table for managing correspondence among encrypted content, a public key certificate, a digital signature, etc., which are recorded by the information recording/playback device of the present invention;

FIG. 23 is an illustration of a revocation list for use in the information recording/playback device of the present invention;

FIGS. 34A and 34B are flowcharts respectively showing copy control processes performed when data playback processes are performed by the information recording/playback device of the present invention.

DESCRIPTION OF THE PREFERRED EMBODIMENTS

System Configuration

Figure 1:
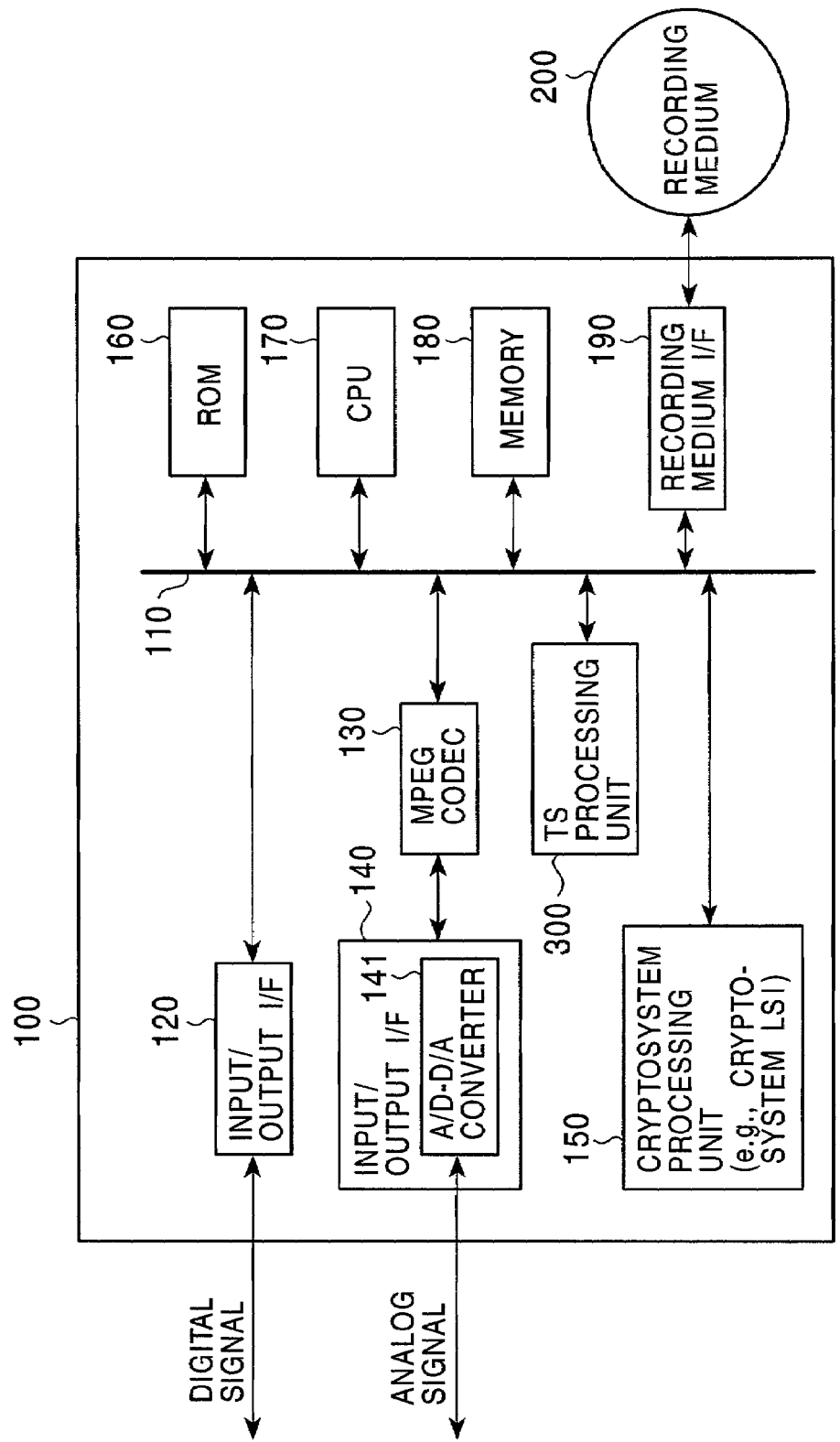
FIG. 1 is a block diagram showing an embodiment of an information recording/playback device of the present invention.

FIG. 1 is a block diagram showing an embodiment of a recording/playback device 100 to which the present invention is applied. The recording/playback device 100 includes an input/output interface (I/F) 120, an MPEG (Motion Picture Experts Group) codec 130, an input/output I/F 140 including an A/D-D/A converter 141, a cryptosystem processing unit 150, a read-only memory (ROM) 160, a central processing unit (CPU) 170, a memory 180, a recording medium I/F 190 for a recording medium 200, and a transport stream (TS) processing unit 300. These are connected to one another by a bus 110.

The input/output I/F 120 receives a digital signal representing various types of content that is externally supplied, such as image, sound, and program content, and outputs the received digital signal from the bus 110. The input/output I/F 120 also receives a digital signal from the bus 110 and outputs the digital signal to the exterior. MPEG-encoded data which is supplied via the bus 110 is MPEG-decoded and output to the input/output I/F 140 by the MPEG codec 130. Also, a digital signal which is supplied from the input/output I/F 140 is MPEG-encoded and output to the bus 110 by the MPEG codec 130. The input/output I/F 140 includes the A/D-D/A converter 141. The input/output I/F 140 receives an analog signal as externally supplied content, and outputs, to the MPEG codec 130, a digital signal obtained by using the A/D-D/A converter 141 to perform A/D conversion on the analog signal. The input/output I/F 140 outputs, to the exterior, an analog signal obtained by using the A/D-D/A converter 141 to perform D/A (Digital to Analog) conversion on a digital signal from the MPEG codec 130.

The cryptosystem processing unit 150 is formed by, for example, a single-chip large-scale integrated circuit (LSI). A digital signal as content supplied via the bus 110 is encrypted or decrypted and output by the cryptosystem processing unit 150. The cryptosystem processing unit 150 is not limited to the single-chip LSI, but can be formed by combining various types of software or various types of hardware. The structure of a processing unit formed by software is described later.

The ROM 160 stores, for example, leaf keys which are unique to recording/playback devices or which are device keys unique to groups of recording/playback devices, and node keys which are common to a plurality of recording/playback devices or to groups thereof. The ROM 160 also stores a secret key unique in a public key cryptosystem to each recording/playback device, a public key certificate, and a public key of a reliable center (authority).

Figure 2:
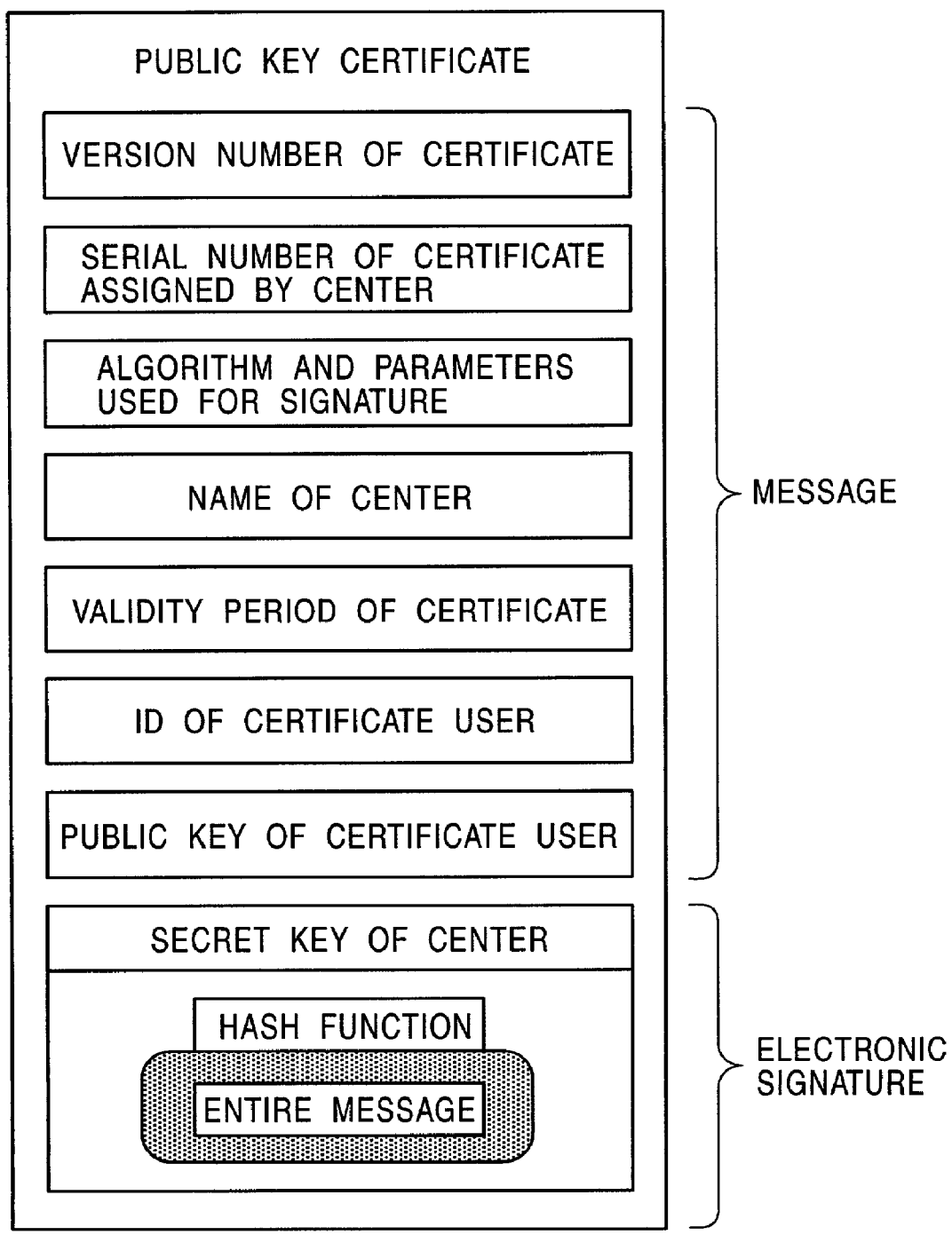
FIG. 2 is an illustration of a public key certificate applied to the information recording/playback device of the present invention.

As FIG. 2 shows, a public key certificate is data created such that a reliable center (authority) digitally signs a message storing data on a user of the certificate, for example, the identification (ID) of a recording/playback device and a public key of the user, and the other data. By using a public key of the center which is obtained beforehand, processing to verify the center's digital signature is performed to verify the validity of the public key certificate, and the stored public key can be extracted and used.

The CPU 170 controls the MPEG codec 130, the cryptosystem processing unit 150, etc., by executing a program stored in the memory 180. The memory 180 is, for example, a nonvolatile memory, and stores programs to be executed by the CPU 170, and data required for the operation of the CPU 170. By driving the recording medium 200, to/from which digital data can be recorded/read, the drive 190 reads (plays back) and outputs digital data from the recording medium 200 to the bus 110, and supplies digital data from the bus 110 for recordation on the recording medium 200. The programs may be stored in the ROM 160, and the device keys may be stored in the memory 180.

The recording medium 200 is a medium that can store digital data, for example, an optical disk such as a digital versatile disk (DVD) or a compact disk (CD), a magneto-optical disk (MO), a magnetic disk, a magnetic tape, or a semiconductor memory such as a RAM. In this embodiment, the recording medium 200 can be loaded into/unloaded from the drive 190. However, the recording medium 200 may be built into the recording/playback device 100.

The TS processing unit 300, which is fully described later with reference to the drawings, performs data processing that, after extracting transport packets corresponding to a specified program (piece of content) from a transport stream in which a plurality of TV programs (pieces of content) are multiplexed, stores appearance-timing information of the extracted transport packets on the recording medium 200 with each packet, and appearance-timing-control processing in the mode of reading from the recording medium 200.

In the transport stream, an arrival time stamp (ATS) is set as the appearance-timing information of each transport packet. This timing is determined in an encoding mode so as not to break a transport stream system target decoder (T-STD) which is a virtual decoder defined in MPEG-2. When the transport stream is read, an ATS that is added to each transport packet controls the appearance timing. The TS processing unit 300 executes control of these steps. For example, for recording a transport packet on the recording medium 200, the transport packet is recorded as a source packet in which intervals of packets are shortened. By recording the transport stream on the recording medium 200 with the appearance timing of each transport packet, the output timing of each transport packet can be controlled in the reading mode. When recording data on the recording medium 200 such as a DVD, the TS processing unit 300 additionally records an ATS representing the input timing of each transport packet.

The data processed in the processing system of the present invention is not limited to format data in accordance with the transport stream. Accordingly, when executing a process on data other than the transport stream, the TS processing unit 300 shown in FIG. 1 is not always necessary.

Data Recording Process and Data Playback Process

Figure 3A:
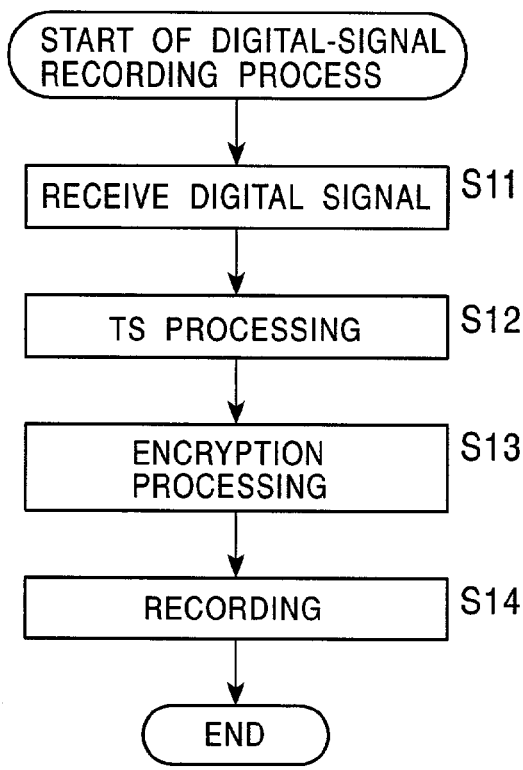
FIGS. 3A and 3B are flowcharts showing a digital-signal recording process and an analog-signal recording process, respectively.

Next, with reference to the flowcharts shown in FIGS. 3A to 4B, a process of recording data on the recording medium 200 and a process of reading data from the recording medium 200 in the recording/playback device 100 in FIG. 1 are described. When digital-signal content from the exterior is recorded on the recording medium 200, a recording process in accordance with the flowchart shown in FIG. 3A is performed. Specifically, digital-signal content (digital content) is supplied to the input/output I/F 120 via, for example, an IEEE (Institute of Electrical and Electronic Engineers) 1394 serial bus or the like, in step S11, the supplied content is received and output to the TS processing unit 300 or the cryptosystem processing unit 150 via the bus 110.

When the received data needs transport-stream processing, the TS processing unit 300 executes the transport-stream processing. In step S12, the TS processing unit 300 generates block data in which ATSs are added to transport stream packets constituting a transport stream, and outputs the block data to the cryptosystem processing unit 150 via the bus 110. This step is further described later.

In step S13, the cryptosystem processing unit 150 executes encryption processing on the received digital content, and outputs the obtained encrypted content to the recording medium I/F 190 via the bus 110. The encrypted content is recorded (S14) on the recording medium 200 via the recording medium I/F 190, and the recording process ends.

Five companies including the assignee of the present application, Sony Corporation, have established the 5CDTCP (Five Company Digital Transmission Content Protection) (hereinafter referred to also as the "DTCP") system as a standard for protecting digital content in a case in which the digital content is transmitted between devices connected by an IEEE 1394 serial bus. In the DTCP, when digital content having no copy-free information is transmitted between devices, authentication which determines whether or not copy-control information for copy control is properly treated is mutually performed before performing data transmission. After that, the digital content is encrypted and transmitted by a transmitting end, and the encrypted digital content (hereinafter referred to also as the "encrypted content") is decrypted by a receiving end.

In data transmission/reception based on the DTCP standard, in step S11, the input/output I/F 120 at the data receiving end receives the encrypted content via the IEEE 1394 serial bus. After decrypting the encrypted content in accordance with the DTCP standard, the input/output I/F 120 outputs the content as plaintext to the cryptosystem processing unit 150.

Digital content encryption based on the DTCP is performed by using a time-changing key after generating the key. The encrypted digital content is transmitted on the IEEE 1394 serial bus, including a key used for the encryption, and the receiving end decrypts the encrypted digital content by using the key included therein.

According to the DTCP, an initial value of the key, and a flag representing timing of changing a key for use in encryption of the digital content, are included in the digital content. At the receiving end, by changing the initial value of the key included in the encrypted content, based on the timing of the flag included in the encrypted content, a key used for decryption is generated and the encrypted content is decrypted. Here, it may be considered that the encrypted content is equivalent to a case in which a key for decrypting the encrypted content is included therein. Concerning the DTCP, on a Web page specified by a uniform resource locator (URL) of, for example, http://www.dtcp.com, an Information Version can be obtained.

Figure 3B:
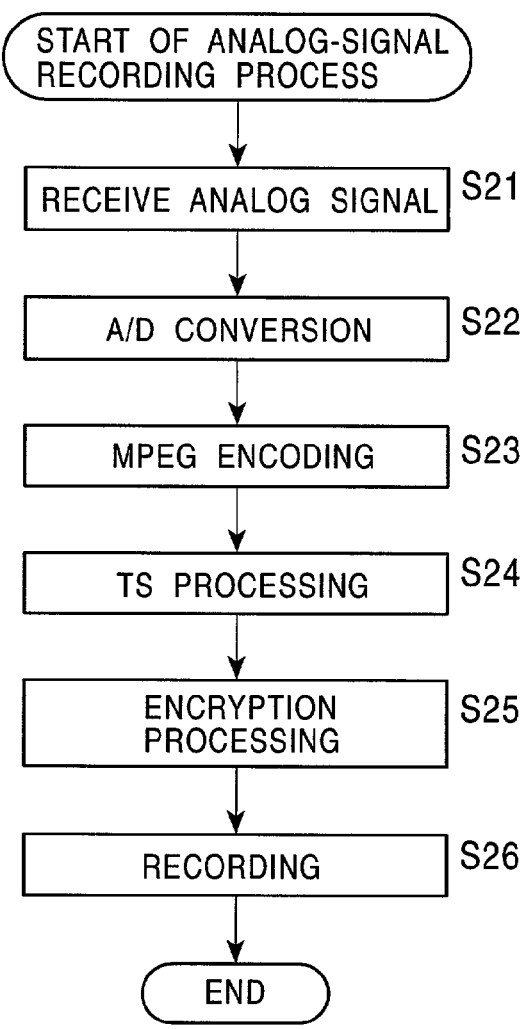

Next, with reference to the flowchart in FIG. 3B, a case in which analog signal content from the exterior is recorded on the recording medium 200 is described. When the analog signal content (hereinafter referred to also as the "analog content") is supplied to the input/output I/F 140, in step S21, the input/output I/F 140 receives the analog content. In step S22, the input/output I/F 140 generates digital signal content (digital content) by using the A/D-D/A converter 141 to perform A/D conversion on the analog content.

The digital content is supplied to the MPEG codec 130. In step S23, the MPEG codec 130 performs MPEG encoding or encoding processing using MPEG compression on the digital content, and supplies the encoded content to the cryptosystem processing unit 150 via the bus 110.

Subsequently, steps S24, S25, and S26 are performed identically to steps S12, S13, and S14 in FIG. 3A. In other words, the addition of ATSs to transport packets by the TS processing unit 300 and the encryption processing by the cryptosystem processing unit 150 are performed as required. The resulting encrypted content is recorded on the recording medium 200, and the recording processing is terminated.

With reference to the flowcharts shown in FIGS. 4A and 4B, processing in which content recorded on the recording medium 200 is played back and output as digital content or analog content is described below.

Figure 4A:
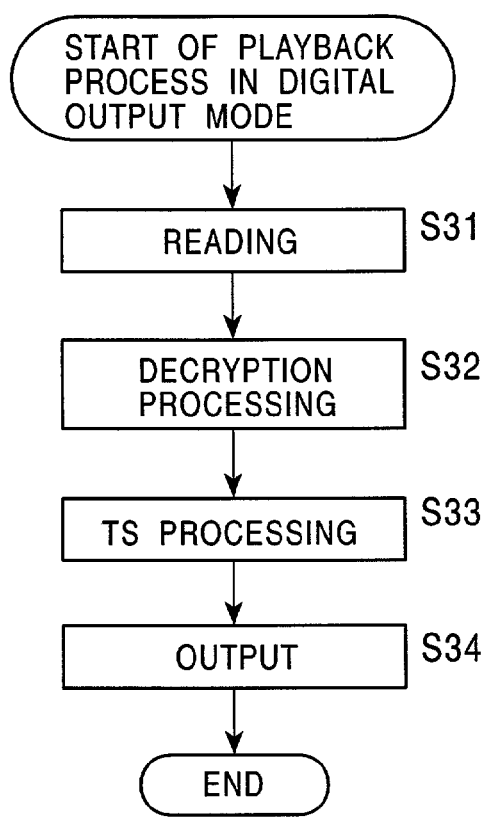
FIGS. 4A and 4B are flowcharts showing a playback process in digital output mode and a playback process in analog output mode, respectively.

A process of outputting the content as digital content to the exterior is executed as a playback process in accordance with the flowchart in FIG. 4A. Specifically, in step S31, the encrypted content recorded on the recording medium 200 is read by the recording medium I/F 190, and is output to the cryptosystem processing unit 150 via the bus 110.

In step S32, the cryptosystem processing unit 150 performs decryption processing on the encrypted content supplied from the recording medium I/F 190. When the data is a transport stream, the decrypted data is output to the TS processing unit 300 via the bus 110. When transport stream processing does not need to be performed, the decrypted data is supplied to the input/output I/F 120.

In step S33, the TS processing unit 300 determines output timing from the ATS of each transport packet forming the transport stream, and performs control in accordance with the ATS so that the transport packet is supplied to the input/output I/F 120 via the bus 110. The input/output I/F 120 outputs the digital content from the TS processing unit 300 to the exterior and terminates the playback processing. The processing of the TS processing unit 300 and the digital-content decryption processing of the cryptosystem processing unit 150 are described later.

The data is supplied to the input/output I/F 120. In step S34, the input/output I/F 120 outputs the digital content to the exterior and terminates the playback processing.

In step S34, when outputting the digital content via an IEEE 1394 serial bus, the input/output I/F 120 performs mutual authentication with another device, as described above, and subsequently transmits the digital content in an encrypted form.

Figure 4B:
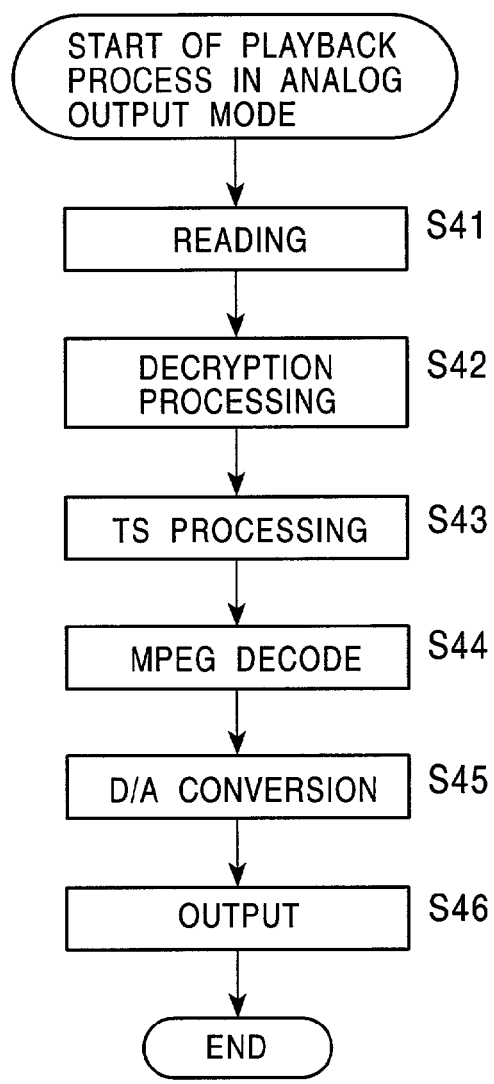

When the content recorded on the recording medium 200 is played back and output as analog content to the exterior, a playback process in accordance with the flowchart in FIG. 4B is performed.

Specifically, steps S41, S42, and S43 are performed identically to steps S31, S32, and S33. These supply the MPEG codec 130 via the bus 110 with the decrypted digital content obtained in the cryptosystem processing unit 150.

In step S44, the MPEG codec 130 performs MPEG decoding or decompression processing on the digital content, and supplies the decompressed content to the input/output I/F 140. In step S45, the input/output I/F 140 generates analog content by using the built-in A/D-D/A converter 141 to perform D/A conversion on the MPEG-decoded digital content. In step S46, the input/output I/F 140 outputs the analog content to the exterior and terminates the playback process.

Transport Stream

A data format on the recording medium 200 in a case in which transport stream data is processed is described below with reference to FIG. 5. The minimum unit for reading data from/writing data to the recording medium 200 is called a "block". One block has a size of 192 by X bytes where, for example, X=32.

An ATS is added to a transport stream (TS) packet (188 bytes) in accordance with MPEG-2 so that the total size is 192 bytes, and X ATS-added transport stream packets constitute one block of data. An ATS is data of 24 to 32 bits which represents an arrival time, and is an abbreviation of an arrival time stamp. An arrival time stamp is formed as random data in accordance with the arrival time of each packet. In one block (sector) of the recording medium 200, X ATS-added TS packets are recorded. In the present invention, by using an arrival time stamp added to the first TS packet of each block forming a transport stream, a block key for encrypting the data of the block (sector) is generated.

By using the random ATS to generate the encryption block key, different unique keys for blocks are generated. The generated block unique keys are used to perform encryption processing on blocks. Also, by employing the ATS generation of the block keys, the need for the area of the recording medium 200 required for the encryption keys is eliminated, and a main data area can be effectively used. This eliminates the need for accessing data other than the main data in data recording and reading modes, so that efficient processing can be performed.

Figure 5:
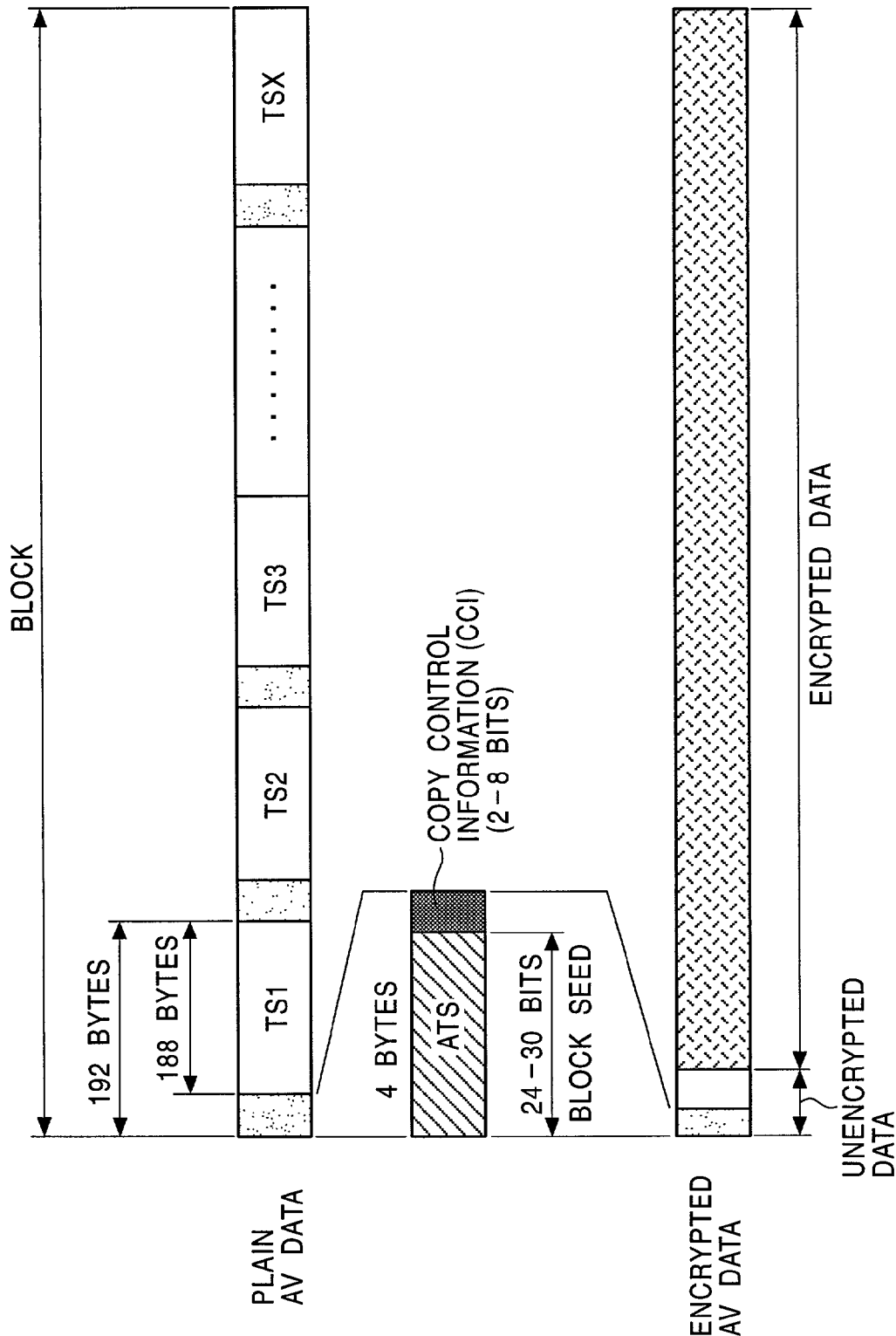
FIG. 5 is an illustration of data formats processed by the information recording/playback device of the present invention.

The block seed shown in FIG. 5 is additional information including the ATS. The block seed may include not only the ATS but also copy control information (CCI). In this case, by using the ATS and the CCI, each block key can be generated.

In the present invention, when data is stored on a recording medium such as a DVD, most of the content data is encrypted, but the first m bytes (e.g., m=8 or 16) of the block are not encrypted and are recorded as unencrypted data, and the remaining data (byte m+1 or greater) is encrypted, as is indicated by the bottom image in FIG. 5. This is because the encrypted data length is restricted by performing the encryption processing in units of eight bytes. If the encryption processing can be performed not in units of eight bytes but in units of one byte, all portions excluding the block seed may be encrypted using m=4.

Processing by TS Processing Unit 300

Here, the function of the ATS is fully described. As described above, the ATS is an arrival time stamp added in order to store the appearance timing of each transport packet in an input transport stream.

Figure 7:
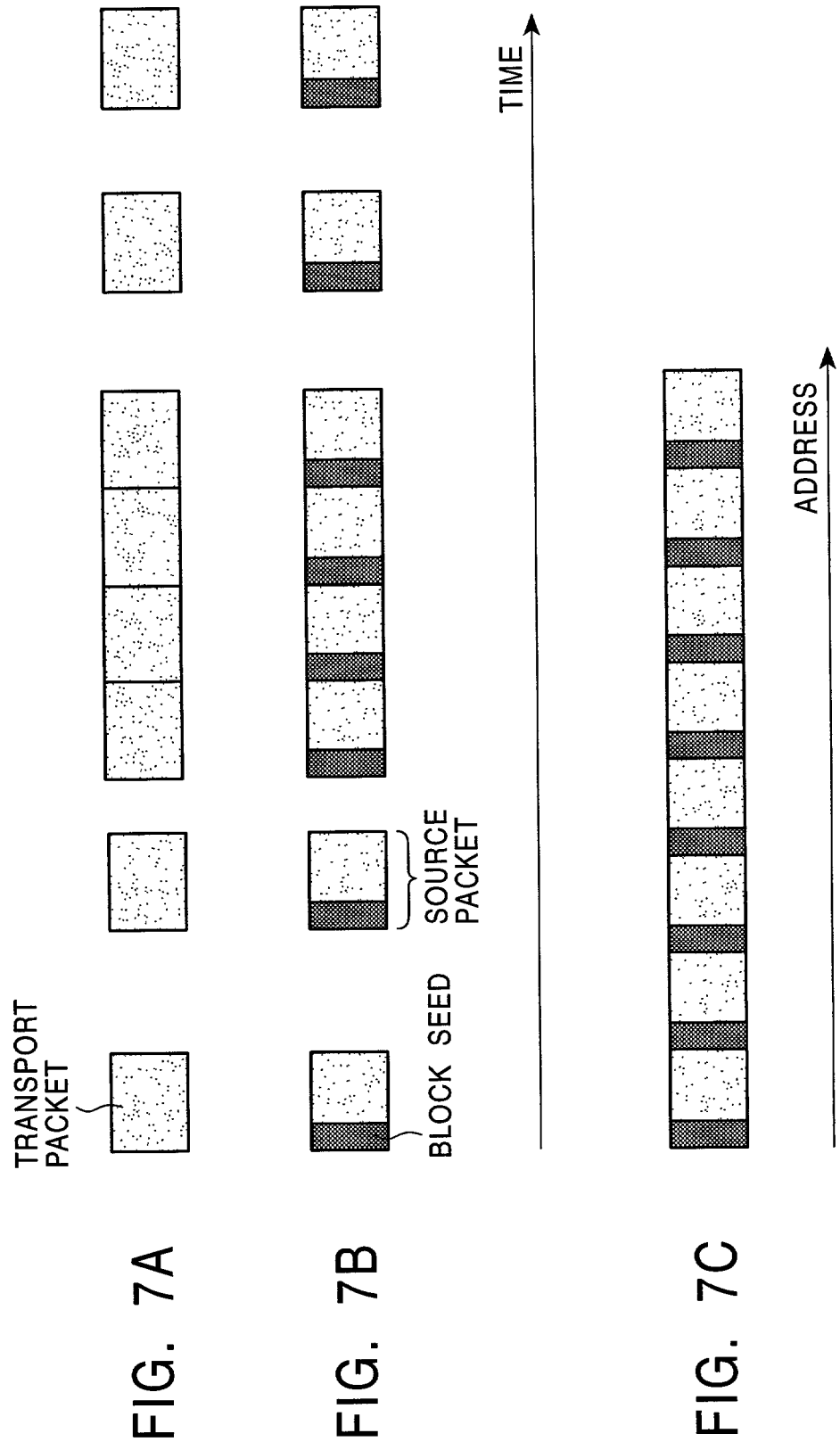
FIGS. 7A, 7B, and 7C are illustrations of transport stream packets.

Specifically, when one or more TV programs (content) are extracted from a transport stream in which a plurality of TV programs (pieces of content) are multiplexed, TS packets constituting the transport stream appear irregularly (see FIG. 7A). In the transport stream, the appearance timing of each transport packet has important meaning. The appearance timing is determined in encoding mode so as not to break a T-STD (transport stream system target decoder) which is a virtual decoder defined in MPEG-2 (ISO/IEC 13818-1).

When the transport stream is read, the appearance timing is controlled by the ATS added to each transport packet. Accordingly, when recording transport packets on the recording medium, the input timing of each transport packet must be stored. Thus, when recording the transport packet on the recording medium, an ATS that represents the input timing of each transport packet is additionally recorded.

Figure 6:
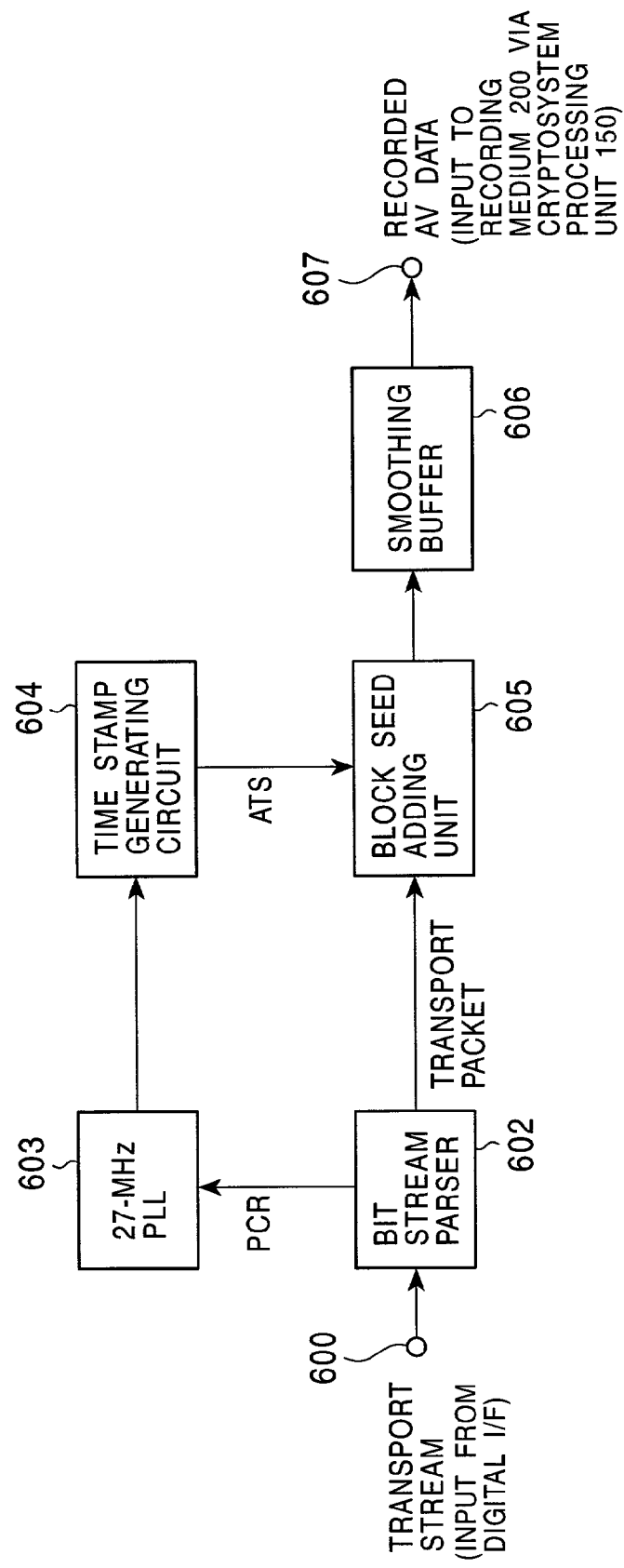
FIG. 6 is a block diagram showing a TS processing unit in the information recording/playback device shown in FIG. 1.

FIG. 6 is a block diagram illustrating processing executed by the TS processing unit 300 when a transport stream input via a digital interface is recorded on a storage medium, such as the recording medium 200. From a terminal 600, a transport stream is input as digital data of a digital broadcast. In FIG. 1, the transport stream is input from the terminal 600 either via the input/output I/F 120 or via the input/output I/F 140 and the MPEG codec 130.

The transport stream is input to a bit stream parser 602. The bit stream parser 602 detects a program clock reference (PCR) packet from the input transport stream. The PCR packet is such that a PCR defined in MPEG-2 is encoded. The PCR packet is obtained by performing encoding at time intervals of 100 milliseconds or less. The PCR represents a time at which a transport packet arrives at the receiving side, with a precision of 27 MHz.

In a 27 MHz phase-locked loop (PLL) circuit 603, the 27 MHz clock signal of the recording/playback device is locked in the program clock reference of the transport stream. A time stamp generating circuit 604 generates a time stamp based on a count of clocks of the 27 MHz clock signal. A block seed adding circuit 605 uses a time stamp obtained when the first byte of a transport stream is input to a smoothing buffer 606 as an arrival time stamp, and adds the arrival time stamp to the transport stream.

The ATS-added transport packet passes through the smoothing buffer 606 and is output from a terminal 607 to the cryptosystem processing unit 150. After the ATS-added transport packet is encoded by the cryptosystem processing unit 150, the encoded transport packet is recorded on the recording medium 200 via the recording medium I/F 190 (FIG. 1).

FIGS. 7A to 7C show an example of a process performed when the input transport stream is recorded on the recording medium 200. FIG. 7A shows input transport packets constituting a specified program (content), where the vertical axis is a time base indicating time on the transport stream. As shown in FIG. 7A, the input transport packets appear with irregular timing.

FIG. 7B shows an output from the block seed adding circuit 605. The block seed adding circuit 605 outputs source packets by adding, to each transport packet, a block seed including an arrival time stamp representing a time on the stream of the packets. FIG. 7C shows source packets recorded on the recording medium 200. By recording the source packets at shortened intervals as shown in FIG. 7C, the recording area of the recording medium 200 can be effectively used.

Figure 8:
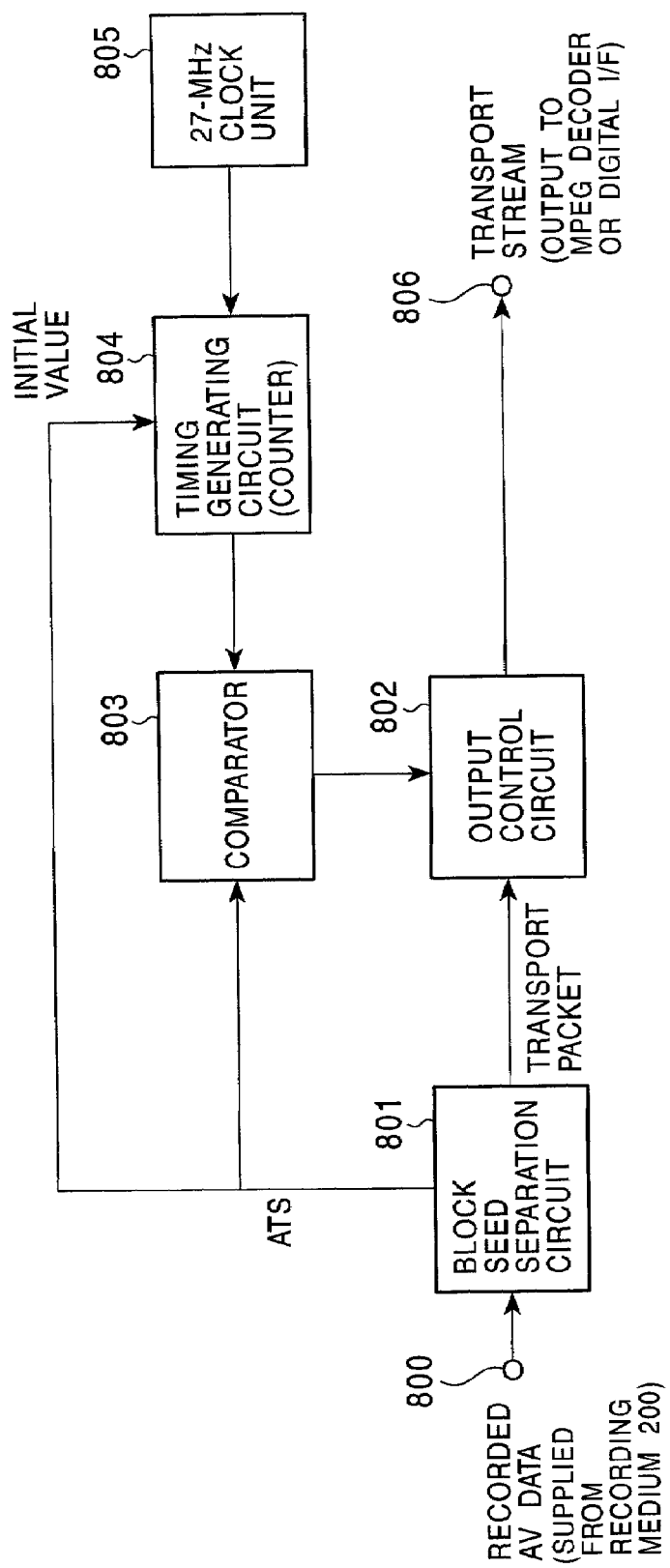
FIG. 8 is a block diagram showing a TS processing unit in the information recording/playback device shown in FIG. 1.

FIG. 8 is a block diagram showing a processing configuration of the TS processing unit 300 in a case in which the transport stream recorded on the recording medium 200 is played back. An ATS-added transport packet, decrypted by a cryptosystem processing unit (described later), is input from a terminal 800 to a block seed separation circuit 801, and is separated into an ATS and a transport packet. A timing generating circuit 804 calculates a time based on a clock counter value of a 27 MHz clock unit 805 of the TS processing unit 300 when it performs playback.

At the start of playback, the first ATS is set as an initial value in a timing generating circuit 804. A comparator 803 compares the ATS with the present time input from the timing generating circuit 804. When the time generated by the timing generating circuit 804 is equal to the ATS, an output control circuit 802 outputs the transport packet to the MPEG codec 130 or the input/output I/F 120.

Figure 9:
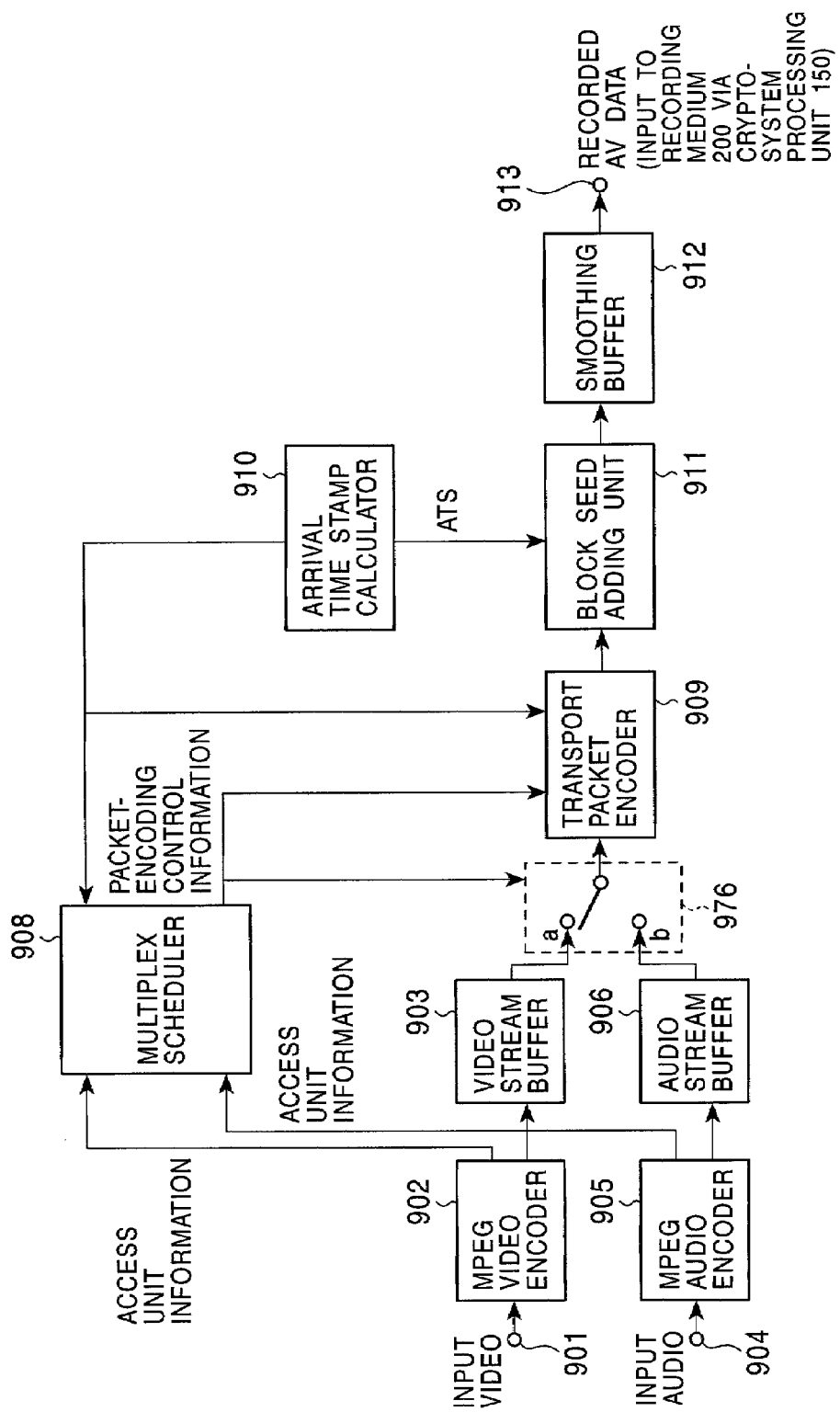
FIG. 9 is a block diagram showing a combination of the MPEG codec 130 and the TS processing unit 300 shown in FIG. 1.

FIG. 9 shows a case in which an input AV signal is MPEG-encoded by the MPEG codec 130 of the recording/playback device 100, and a transport stream is encoded by the TS processing unit 300. Accordingly, FIG. 9 is a block diagram showing a combination of the MPEG codec 130 and the TS processing unit 300 in FIG. 1.

A video signal is input from a terminal 901 to an MPEG video encoder 902. The MPEG video encoder 902 encodes the input video signal to generate an MPEG video stream, and outputs the MPEG video stream to a video stream buffer 903. The MPEG video encoder 902 outputs access-unit information on the MPEG video stream to a multiplex scheduler 908. An access unit is a picture, and the access-unit information is the picture type of each picture, an amount of encoded bits, and a decode-time stamp. The picture type is I/P/B picture information. The decode-time stamp is information defined in MPEG-2.

An audio signal is input from a terminal 904 to an MPEG audio encoder 905. The MPEG audio encoder 905 encodes the input audio signal to generate an MPEG audio stream, and outputs the stream to an audio stream buffer 906. The MPEG audio encoder 905 also outputs access-unit information on the MPEG audio stream to the multiplex scheduler 908. An access unit of an audio stream is an audio frame, and the access-unit information is an amount of encoded bits in each audio frame and a decode-time stamp.

Access-unit information on video and audio is input to the multiplex scheduler 908. Based on the input access-unit information, the multiplex scheduler 908 controls a method of encoding a video stream and an audio stream to generate transport packets. The multiplex scheduler 908 includes a 27 MHz precision clock generator for generating a reference time, and determines packet-encoding control information for a transport packet so as to satisfy a transport stream system target decoder as a virtual decoder model. The packet-encoding control information is the type of stream to be formed in packets and the length of the stream.

When the packet-encoding control information represents a video packet, a switch 976 connects to the side a, so that video data having a payload data length designated by the packet-encoding control information is read from the video stream buffer 903, and is input to a transport packet encoder 909.

When the packet-encoding control information represents an audio packet, the switch 976 connects to the side b, so that audio data having a payload data length designated by the packet-encoding control information is read from the audio stream buffer 906, and is input to the transport packet encoder 909.

When the packet-encoding control information represents a program clock reference packet, the transport packet encoder 909 captures a program clock reference input from the multiplex scheduler 908, and outputs a program clock reference packet. When the packet-encoding control information indicates that packet encoding is not performed, nothing is input to the transport packet encoder 909.

When the packet-encoding control information indicates that packet encoding is not performed, the transport packet encoder 909 does not output any transport packet. In cases other than that, based on the picture, the transport packet encoder 909 generates and outputs transport packets. Accordingly, the transport packet encoder 909 intermittently outputs transport packets. Based on the PCR input from the multiplex scheduler 908, an arrival-time-stamp calculating unit 910 calculates an arrival time stamp representing a time at which the first byte of the transport packet arrives at the receiving side.

The PCR input from the multiplex scheduler 908 represents an arrival time at which the tenth byte of a transport packet defined in MPEG-2 arrives at the receiving side. Thus, the value of the ATS is an arrival time of a byte that is positioned ten bytes before the time of the program clock reference.

A block-seed adding circuit 911 adds an ATS to the transport packet output from the transport packet encoder 909. The ATS-added transport packet output from the block-seed adding circuit 911 passes through a smoothing buffer 912 to be input to the cryptosystem processing unit 150. After the input ATS-added transport packet is encrypted as described later, the encrypted ATS-added transport packet is recorded on the recording medium 200.

Before being encrypted by the cryptosystem processing unit 150, the ATS-added transport packets to be recorded on the recording medium 200 are input, with the intervals of the packets shortened as shown in FIG. 7C. After that, the encrypted ATS-added transport packets are recorded on the recording medium 200. Even if the transport packets are recorded with the intervals thereof shortened, a time at which the transport packets are input can be controlled.

The length of an arrival time stamp is not limited to 32 bits, but may be 24 to 31 bits. The longer the bit length of the arrival time stamp, the greater each cycle of a time counter for the arrival time stamp. For example, when the time counter for the arrival time stamp is a binary counter with a precision of 27 MHz, the time required for a cycle of a 24-bit-length arrival time stamp is approximately 0.06 seconds. This time is sufficient for an ordinary transport stream. This is because under the provisions of MPEG-2, each packet interval of transport streams is a maximum of 0.1 seconds. However, the arrival time stamp may have 24 or more bits for sufficient tolerance.

Figure 10:
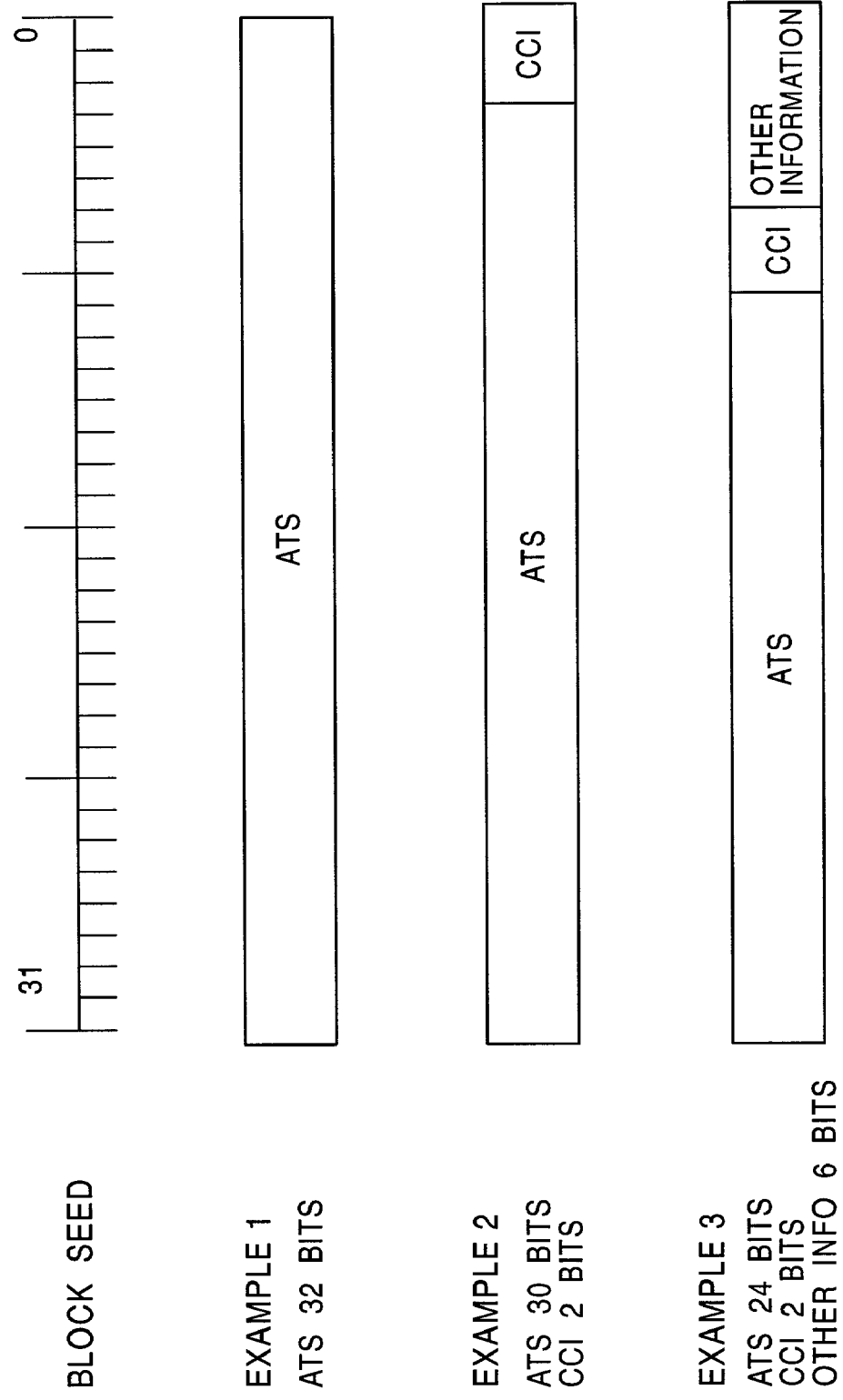
FIG. 10 is an illustration of configurations of a block seed as additional information on block data.

In the above cases in which the bit length of the arrival time stamp is variably set, there are a plurality of possible configurations for a block seed as additional data to block data. FIG. 10 shows block seed configurations. In example 1 in FIG. 10, thirty-two bits are used for the arrival time stamp. In example 2 in FIG. 10, thirty bits are used for the arrival time stamp, and two bits are used for copy control information. Copy control information represents a state of copy control in the data to which the copy control information is added. Concerning copy control information, the Serial Copy Management System (SCMS) and the Copy Generation Management System (CGMS) are famous. By using copy control information based on these systems, a plurality of pieces of information can be shown, such as Copy Free indicating that the data may be copied limitlessly, One Generation Copy Allowed indicating that the data may be copied only in one generation, and Copy Prohibited indicating that the data may not be copied.

In example 3 in FIG. 10, twenty-four bits are used for the ATS, two bits are used for the CCI, and six bits are used for other information. Various types of information, such as information representing the switching on/off of a Macro-vision as an analog-picture-copy-control mechanism in a case in which other-information-included data is analog-output, can be used as other information.

Tree Structure as Key Distribution Configuration

Figure 11:
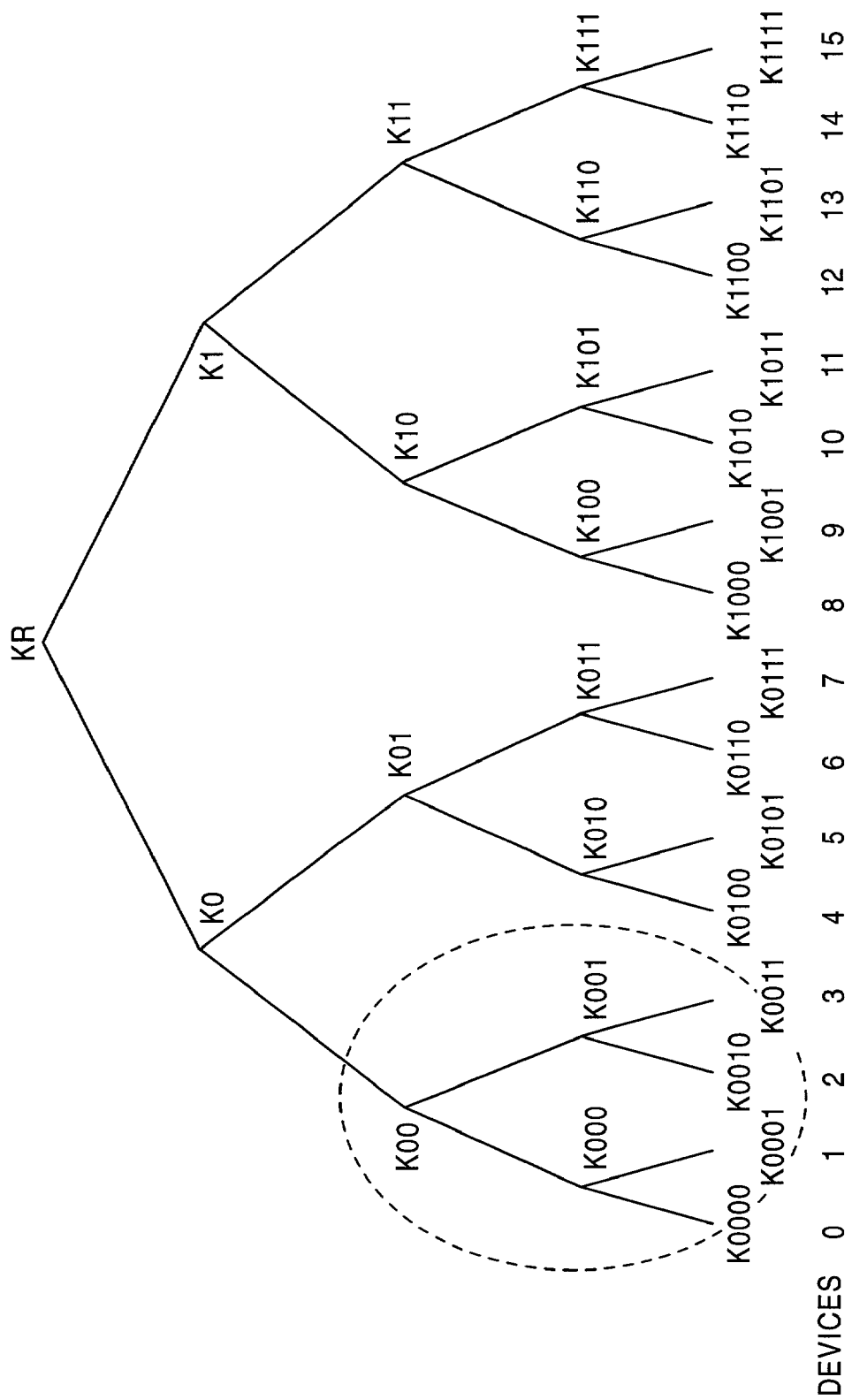
FIG. 11 is an illustration of a tree structure showing the distribution of a key for each recording/playback device in a recording system using the configuration.

Next, a configuration is described below in which the recording/playback device 100 in FIG. 1 distributes, to each device, a key, for example, a media key, which is required for recording data on the recording medium 200 or playing back data from the recording medium 200. FIG. 11 is an illustration of the distribution of a key for each recording/playback device in a recording system using the configuration. In FIG. 11, the numbers 0 to 15 shown at the bottom indicate devices as recording/playback devices. The leaves of the tree structure shown in FIG. 11 correspond to the devices.

In each of the devices 0 to 15, node keys assigned to nodes from a leaf as the node itself to the root and a leaf key assigned to the node itself are stored when the device is produced (shipped). The alphanumeric representations K0000 to K1111 shown in the bottom of FIG. 11 are leaf keys assigned to the devices 0 to 15. In FIG. 11, the top node KR to the nodes K000 to K111 in the second row from the bottom are node keys.

In the tree structure shown in FIG. 11, for example, device 0 possesses leaf key K0000, and node keys K000, K00, K0, and KR. Device 5 possesses leaf key K0101, and node keys K010, K01, K0, and KR. Device 15 possesses leaf key K1111, and node keys K111, K11, K1, and KR. Although the tree structure shown in FIG. 11 includes only the sixteen devices 0 to 15 and has four levels and balanced symmetry, it may include more devices and a different number of levels in each portion of the tree.

The devices 0 to 15 as recording/playback devices include various types of recording/playback devices that use various types of recording media such as DVDs, CDs, MDs, and Memory Sticks (trademark). Also, it is possible that various application services coexist. The key distribution in FIG. 11 is applied to a coexistence configuration of different devices and different applications.

In the system in which various devices and applications coexist, for example, the portion surrounded by the dotted line in FIG. 11, specifically, devices 0, 1, 2, and 3 are treated as a group using a single recording medium. To devices 0, 1, 2, and 3 included in this group, a process of simultaneously sending by a provider common content in an encrypted form, a process of sending a master key for use in common, and a process of outputting content-charge-payment data in an encrypted form from each device to a provider are performed. An authority that transmits data to/receives data from each device, such as a content provider or a settlement authority, treats the portion surrounded by the dotted line in FIG. 11 as one group and performs simultaneous data-transmission processing. A plurality of similar groups exist in the tree in FIG. 11.

Node keys and leaf keys may be controlled by a single key, or may be controlled for each group by an authority that transmits data to/receives data from each group, such as a provider or a settlement authority. These node keys and leaf keys are updated, for example, when a leak of a key occurs, and the process of updating is executed by a key-control center, a provider, a settlement authority, etc.

As is clear from FIG. 11, in the tree structure, the three devices 0, 1, 2, and 3 included in one group possess common keys K00, K0, and KR as node keys. By using this node-key sharing system, for example, a common master key can be provided to a limited number of devices 0, 1, 2, and 3. For example, by using node key K00 itself, which is possessed in common, as a master key, only devices 0, 1, 2, and 3 can use the master key in common if the sending of a new key is not executed. In addition, by distributing, to devices 0, 1, 2, and 3, code Enc(K00, Kmaster) obtained by encrypting new master key Kmaster using node key K00 via a network or by using a recording medium containing the value, only devices 0, 1, 2, and 3 decrypt code Enc(K00, Kmaster) with shared master key K00, which is possessed by them, and can obtain Kmaster. Data obtained by using Ka to encrypt Kb is represented by Enc(Ka, Kb).

When it is discovered at time t that the keys of device 3, K0011, K001, K00, K0, and KR, have been analyzed and exposed by a hacker, device 3 must be cut off from the system in order to protect data transmitted and received in the system (the group of devices 0, 1, 2, and 3) after time t. Accordingly, node keys K001, K00, K0, and KR must be updated to generate new keys K(t)001, K(t)00, K(t)0, K(t)R, respectively, and the new keys must be posted to devices 0, 1, 2, and 3. Here, K(t)aaa represents an updated key in generation t of key Kaaa.

A process for distributing the updated keys is described. Key updating is performed by distributing, to devices 0, 1, and 2, a table formed by block data called an "enabling key block (EKB)", which is shown in FIG. 12A, for example, via a network or by using recording media containing the table.

In the enabling key block (EKB) shown in FIG. 12A, only devices in which node keys must be updated are shown as block data having an updatable data arrangement. The example shown in FIG. 12 is block data formed for the purpose of distributing updated node keys in generation t in connection with devices 0, 1, and 2 in the tree structure in FIG. 11. As is clear from FIG. 11, devices 0 and 1 need K(t)00, K(t)0, and K(t)R as updated keys, device 2 needs K(t)001, K(t)00, K(t)0, and K(t)R as updated keys.

As the EKB in FIG. 12A shows, the EKB includes a plurality of encryption keys. The bottom encryption key is Enc(K0010, K(t)001). This is updated node key K(t)001 obtained by performing encryption using leaf key K0010 of device 2. Device 2 can obtain K(t)001 by using its leaf key to decrypt encryption key Enc(K0010, K(t)001). By using K(t)001 obtained by decryption, the second encryption key Enc(K(t)001, K(t)00) from the bottom in FIG. 12A can be decrypted. This makes it possible to obtain updated node key K(t)00. Similarly, by decrypting the second encryption key Enc(K(t)00, K(t)0) from the top in FIG. 12A, updated node key K(t)0 can be obtained. By decrypting the first encryption key Enc(K(t)0, K(t)R) from the top in FIG. 12A, K(t)R can be obtained. In the case of devices 0 and 1, node key K000 is not included in what to update. Necessary node keys are K(t)00, K(t)0, and K(t)R. In devices 0 and 1, by decrypting the third encryption key Enc(K000, K(t)00), K(t)00 can be obtained. Subsequently, by decrypting the second encryption key Enc(K(t)00, K(t)0) from the top in FIG. 12A, updated node key K(t)0 can be obtained. By decrypting the top encryption key Enc(K(t)0, K(t)R), K(t)R can be obtained. By using the above operation, devices 0, 1, and 2 can obtain updated key K(t)R. The INDEX in FIG. 12A indicates the absolute address of a node key or a leaf key used as a decryption key.

In a case in which upper node keys K0 and KR in the tree structure in FIG. 11 do not need to be updated, and only node key K00 must be updated, updated node key K(t)00 can be distributed to devices 0, 1, and 2 by using the enabling key block (EKB) in FIG. 12B.

The EKB in FIG. 12B can be used in the case of distributing a new master key that is shared in a specified group. It is assumed as a specific example that devices 0, 1, 2, and 3 in the dotted-line group in FIG. 11 use certain recording media and need a new common master key K(t)master. Then, data Enc(K(t), K(t)master) is distributed which is obtained by encrypting updated master key K(t)master with K(t)00 obtained by updating node key K00 common to devices 0, 1, 2, and 3. Thus, data Enc(K(t), K(t)master) is distributed, as data that is not decrypted, to the devices of other groups, such as device 4. This applies to the media key.

In other words, devices 0, 1, and 2 can obtain master key K(t)master and media key K(t)media at time t by decrypting the above data using K(t)00 obtained by processing the EKB.

Obtainment Using EKB of Media Key

Figure 13:
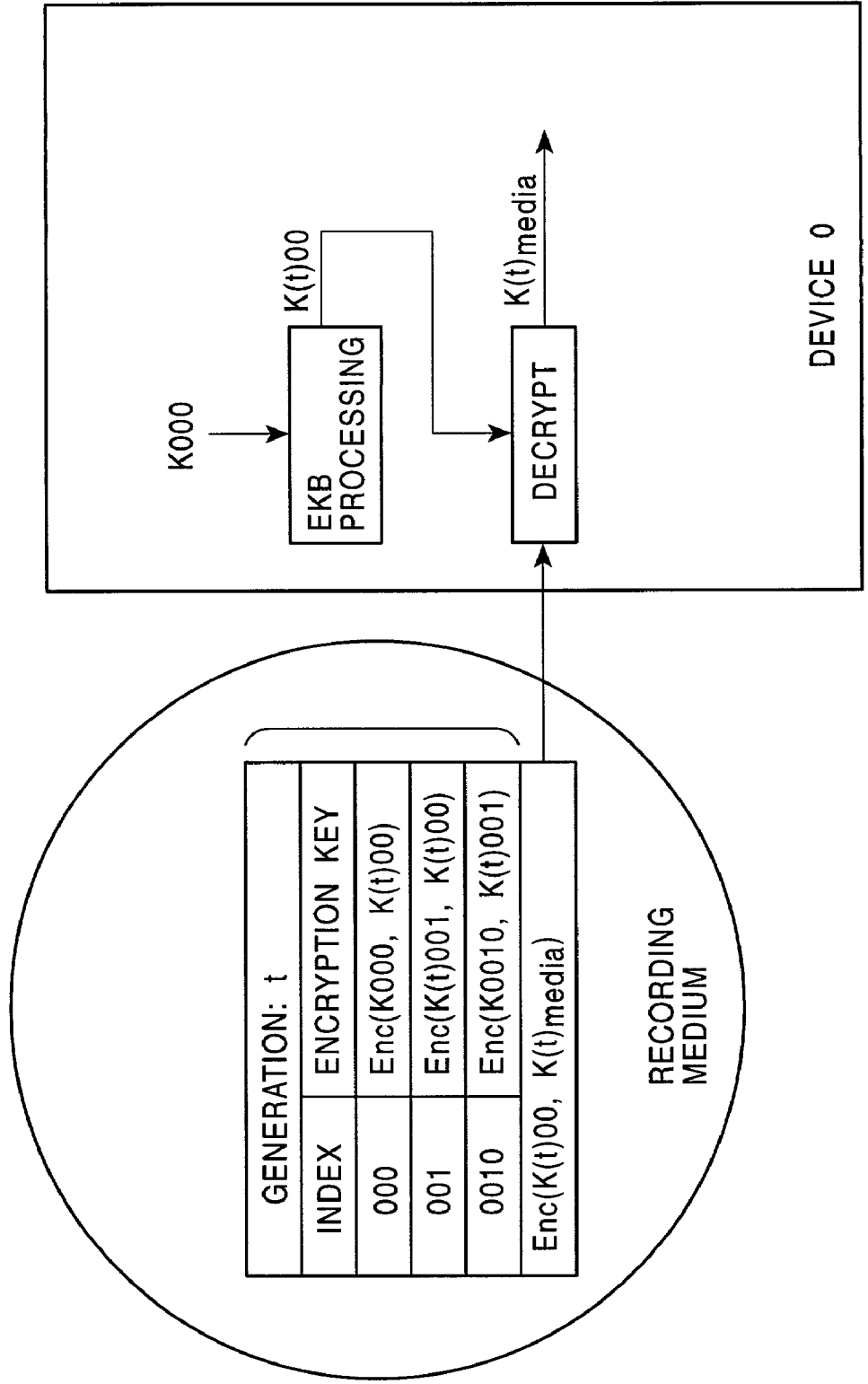
FIG. 13 is an illustration of distribution and decryption processing using the EKB of a media key in the information recording/playback device of the present invention.

FIG. 13 shows, as an example of obtaining master key K(t)master at time t, which has been proposed in Japanese Patent Application No. 2000-105328 earlier filed by the assignee of the present application, processing of device 0 that receives, via a recording medium, data Enc(K(t)00, K(t)media) obtained by using K(t)00 to encrypt new common master key K(t)media, and the EKB shown in FIG. 12B.

As shown in FIG. 11, it is assumed that a recording/playback device includes four devices 0, 1, 2, and 3 which are surrounded by the dotted line. FIG. 13 shows processing in which, when device 3 is revoked, and each media key assigned for each recording medium is used, the media key required for the recording/playback device (device 2) to encrypt or decrypt content on a recording medium is found by using an EKB stored on the recording medium and a device key stored in the recording/playback device.

The memory of device 2 securely stores a leaf key K_0010 which is only assigned to device 2, and the node key K_001 of node 001, the node key K_00 of node 00, K_0 of node 0, and the node key K_R of node R. Device 2 must calculate the node key K(t)_001 of node 001 by using its leaf key K_0010 to decrypt a code among EKBs stored on the recording medium in FIG. 13 which has the index 0010. Next, by using the calculated node key to decrypt a code having the index 001, device 2 calculates the node key K(t)_00 of node 00. Finally, by using the calculated node key to decrypt a code, device 2 must calculate the media key K(t)_media. The number of times the above calculation is performed increases in proportion to the depth from a leaf to a node that decrypts the media key. In other words, in a system having many recording/playback devices, many calculations must be performed. Data encryption processing and data decryption processing by using the media key calculated and obtained as described above are described below.

Content Recording Processing Using Media Key

Data encryption processing and record processing on the recording medium 200 which are executed by the cryptosystem processing unit 150 are described below with reference to the processing block diagram shown in FIG. 14.

The recording/playback device 100 in FIG. 14 acquires a media key by performing calculation processing based on the above EKB.

Next, the recording/playback device 100 inspects the recording medium 200, such as an optical disk, to determine whether a disk ID as identification information has been recorded thereon. If the disk ID has been recorded, the recording/playback device 100 reads it. If it has not been recorded, the cryptosystem processing unit 150 generates a disk ID using a predetermined technique, such as random number generation, and records the disk ID on the recording medium 200. Since it is enough for a disk to have one disk ID, the disk ID also can be stored in a portion such as a lead-in area.

The recording/playback device 100 uses the media key and the disk ID to generate a disk unique key. Specific methods of generating a disk unique key include example 1 shown in FIG. 15A in which the result of inputting a media key and a disk ID to a hash function using a block encryption function is used, and example 2 shown in FIG. 15B in which data generated by bit combination of a media key and a disk ID is input to the hash function SHA-1 defined in FIPS 180-1, and from the resultant 160-bit output, only a necessary data length is used as the disk unique key.

Next, a title key as a unique key for each record is randomly generated by the cryptosystem processing unit 150 (in FIG. 1) or by a predetermined technique such as random number generation, and is recorded on the disk 200.

Based on a combination of the disk unique key and the title key, a title unique key is generated.

Figure 16A:
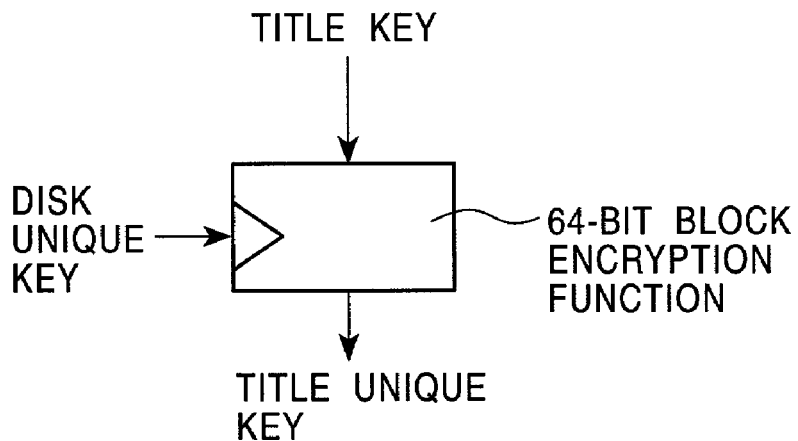
FIGS. 16A and 16B are illustrations of examples of generating a title unique key which are used in the information recording/playback device of the present invention.
Figure 16B:
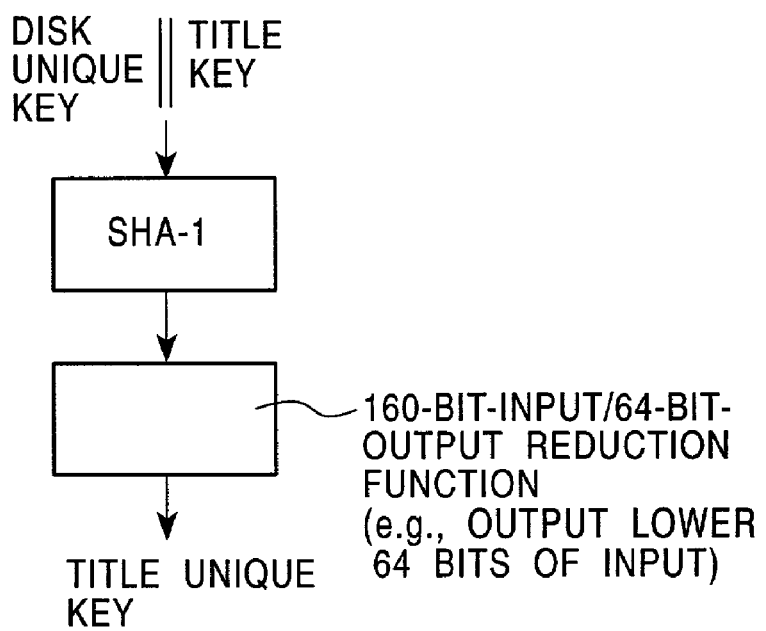

Specific methods of generating the title unique key include example 1 shown in FIG. 16A in which the result of encrypting the title key by using a block encryption function with the disk unique key as a unique key is used, and example 2 shown in FIG. 16B in which data generated by bit combination of the disk unique key and the title key is input to the hash function SHA-1 defined in FIPS 180-1, and from the resultant 160-bit output, only a necessary data length is used as the title unique key.

In the above description, the disk unique key is generated from the media key and the disk ID, and from the disk unique key and the title key, the title unique key is generated. However, by eliminating the need for the disk unique key, the title unique key may be directly generated from the media key, the disk ID, and the title key. Also, a key corresponding to the title unique key may be directly generated from the media key and the disk ID, without the title key.

Subsequent processing is described with reference to FIG. 14. From a block seed which is output by separating the first to fourth bytes from the beginning of block data input as data to be encrypted, and the already generated title unique key, a block key that encrypts the data of the block is generated.

Figure 17A:
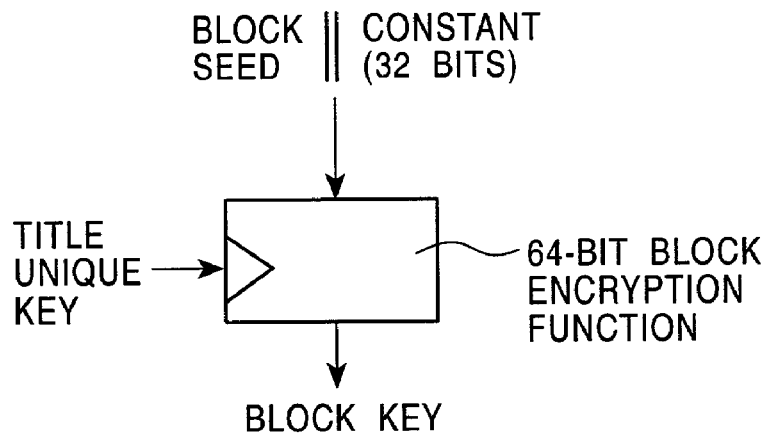
FIGS. 17A and 17B are illustrations of techniques for generating a block key which are used in the information recording/playback device of the present invention.
Figure 17B:
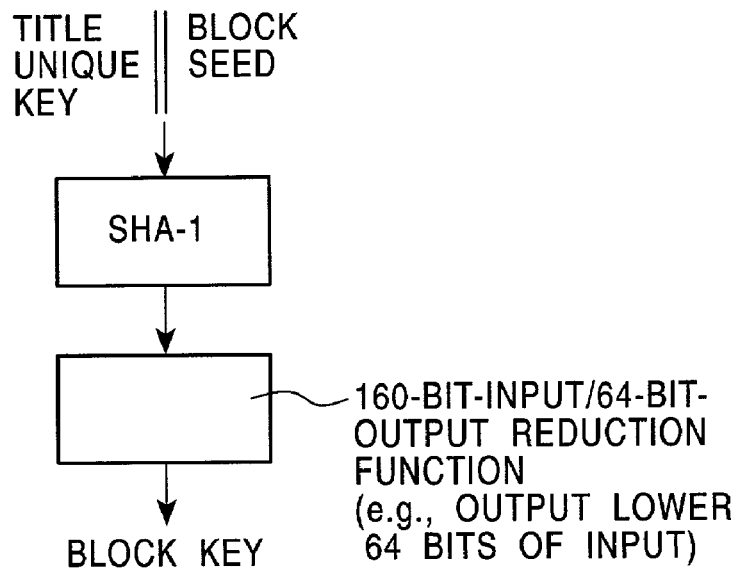

FIGS. 17A and 17B show two methods for generating the block key. In each method, from a 32-bit block seed and a 64-bit title unique key, a 64-bit block key is generated.

In example 1 shown in FIG. 17A, an encryption function is used which has a key length of 64 bits and an input/output length of 64 bits. A title unique key is used as a key for the encryption function, and a result that is obtained by inputting to the encryption function a concatenation value of a block seed and a 32-bit constant is used as a block key.

In example 2 shown in FIG. 17B, the hash function SHA-1 defined in FIPS PUB 180-1 is used. Reduced data having 64 bits is used as the block key. For example, a concatenation value of a title unique key and a block seed is input to hash function SHA-1, and from the resultant 160-bit output, only a lower-64-bit part is used.

The above examples 1 and 2 in which the disk unique key, the title unique key, and the block key are generated have been described. However, without executing the generation of the disk unique key and the title unique key, the block key may be generated by using, for each block, a media key, a disk ID, a title key, and a block seed.

After the block key is generated, the generated block key is used to encrypt block data. As the bottom of FIG. 14 shows, the first to m-th (e.g., m=8) bytes at the start of the block data including the block seed are separated (by a selector 1608) and are not encrypted. The (m+1)th byte to the final byte are encrypted by a selector 1609. The m bytes that are not encrypted include the first to fourth bytes as a block seed. The block data after the (m+1)th byte which is separated by the selector 1608 are encrypted by the selector 1609 in accordance with an encryption algorithm preset in the cryptosystem processing unit 150. For example, the Data Encryption Standard (DES) defined in FIPS 46-2 can be used as the encryption algorithm.

In the above processing, content is recorded on the recording medium 200 in units of blocks in a form in which the content is encrypted by using a block key generated based on the media key, the block seed, etc., which are generation-managed.

The recording/playback device 100 computes a digital signature using an assigned secret key (signature generating key) in a public key cryptosystem, and records the digital signature on the recording medium 200 with its own public key certificate and content data. For example, the Elliptic Curve Digital Signature Algorithm (EC-DSA) which is being established in the IEEE P1363 can be used as a method of generating the digital signature. FIG. 18 shows a flowchart illustrating the outline of a content recording process.

In step S101, the recording/playback device 100 executes encryption processing on content to be recorded. The content encryption is executed as block-key processing of encrypting block data, as described using FIG. 14.

In step S102, the recording/playback device 100 computes a digital signature on the encrypted content using an assigned secret key (signature generating key) in the public key cryptosystem. For example, the EC-DSA which is being established in the IEEE P1363 can be used as a method of generating the digital signature.

In step S103, the recording/playback device 100 records the digital signature and the public key certificate on the recording medium 200 so that they are correlated with the content to be recorded. In step S104, the recording/playback device 100 executes the process of recording the encrypted content on the recording medium 200.

Figure 19:
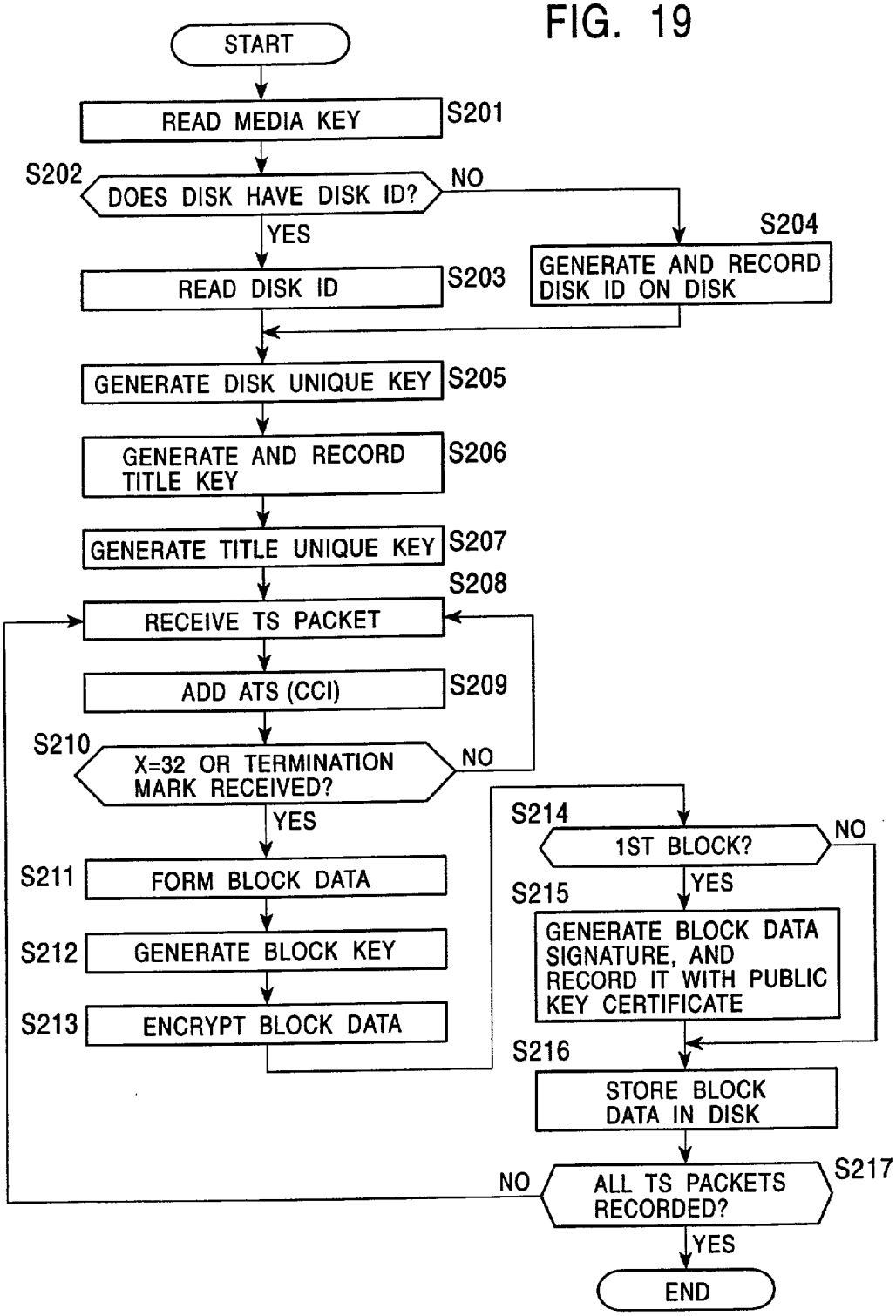
FIG. 19 is a flowchart showing a process of generating and putting a digital signature on encrypted content and before recording the encrypted content.

FIG. 19 shows a detailed flowchart of a process for putting the digital signature on the encrypted content and before recording the encrypted content.

In step S201, the recording/playback device 100 acquires the media key by using the above EKB processing (in FIG. 13).

Figure 15A:
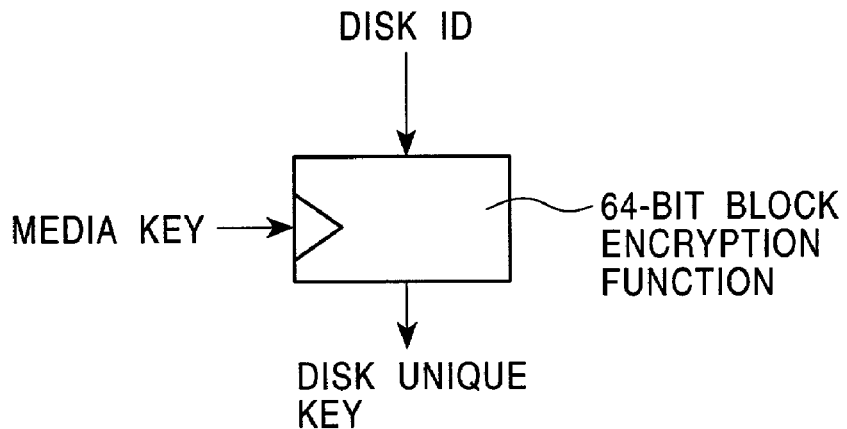
FIGS. 15A and 15B are illustrations of examples of generating a disk unique key which are used in the information recording/playback device of the present invention.
Figure 15B:
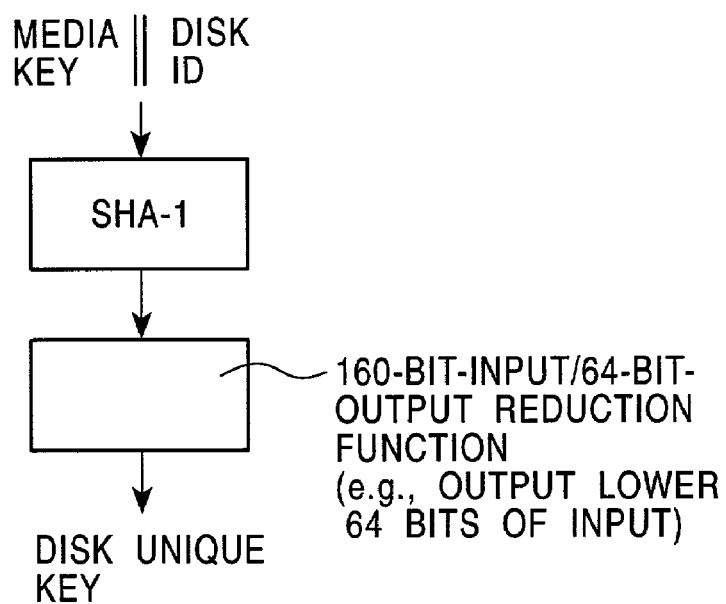

In step S202, the recording/playback device 100 inspects the recording medium 200 to determine whether a disk ID has been recorded thereon as identification information. If the disk ID has been recorded, the recording/playback device 100 reads the disk ID in step S203. If not, in step S204, a disk ID is randomly generated and recorded on the recording medium 200 by the recording/playback device 100. In step S205, by using the media key and the disk ID, a disk unique key is generated. As described above, the disk unique key can be obtained, for example, by using hash function SHA-1 defined in the FIPS 180-1 or by using a hash function based on block encryption, as shown in FIGS. 15A and 15B.

Proceeding to step S206, a title key as a unique key for each time of recording is generated and recorded on the recording medium 200 (i.e., disk). In step S207, a title unique key is generated using the disk unique key and the title key, as shown in FIGS. 16A and 16B.

In step S208, the recording/playback device 100 receives the data of the content to be encrypted in the form of TS packets. In step S209, an ATS as information on a time at which each TS packet is received is added to the TS packet by the TS processing unit 300. Otherwise, a value obtained by combining the CCI, the ATS, and other information is added. In step S210, the TS packets with the ATS added are sequentially received, and it is determined whether the number (indicated by "X") of TS packets forming one block has reached 32, or whether identification data representing the termination of the TS packets has been received. When one of the conditions is satisfied, the recording/playback device 100 proceeds to step S211, and block data for one block is formed by arranging the X TS packets or the TS packets up to the end packet.

In step S212, based on the first 32 bits (block seed including the ATS) of the block data and the title unique key generated in step S207, the cryptosystem processing unit 150 generates a block key as a key for encrypting the data of the block (see FIGS. 17A and 17B).

In step S213, the block key is used to encrypt the block data formed in step S211. As described above, what is to be encrypted is the (m+1)th byte to the end byte. For example, the DES defined in the FIPS 46-2 may be used as the encryption algorithm.

In step S214, it is determined whether the block to be recorded is the first block. If the determination is affirmative, in step S215, a digital signature is generated by treating the block data as data on which the digital signature is put, and is recorded on the recording medium 200 with the public key certificate. For example, the EC-DSA which is being established in the IEEE P1363 may be used for the generation of the digital signature.

In step S216, the encrypted block data is recorded on the recording medium 200. In step S217, it is determined whether all of the pieces of block data have been recorded. If the determination is affirmative, the recording process is terminated. If not, the recording/playback device 100 goes back to step S208 and executes processing on the remaining pieces of block data.

In the above processing, the content is encrypted and recorded on the recording medium 200, and the digital signature on the block data of the encrypted content and the public key certificate are recorded on the recording medium 200.

The content, the title key, the digital signature, the public key certificate, and other content-related data are recorded in a form in which each correspondence can be recognized. By way of example, by recording management data in the form of a table, correlation can be established. FIG. 20 shows an example of a table in the case of recording address data of correspondence data for recorded content.

As FIG. 20 shows, pieces of content are managed as files with content-related data. Each table in which a content data address, a title key address, a digital signature address, a public key certificate address, and other file information are recorded is generated and recorded on the recording medium 200.

Figure 21:
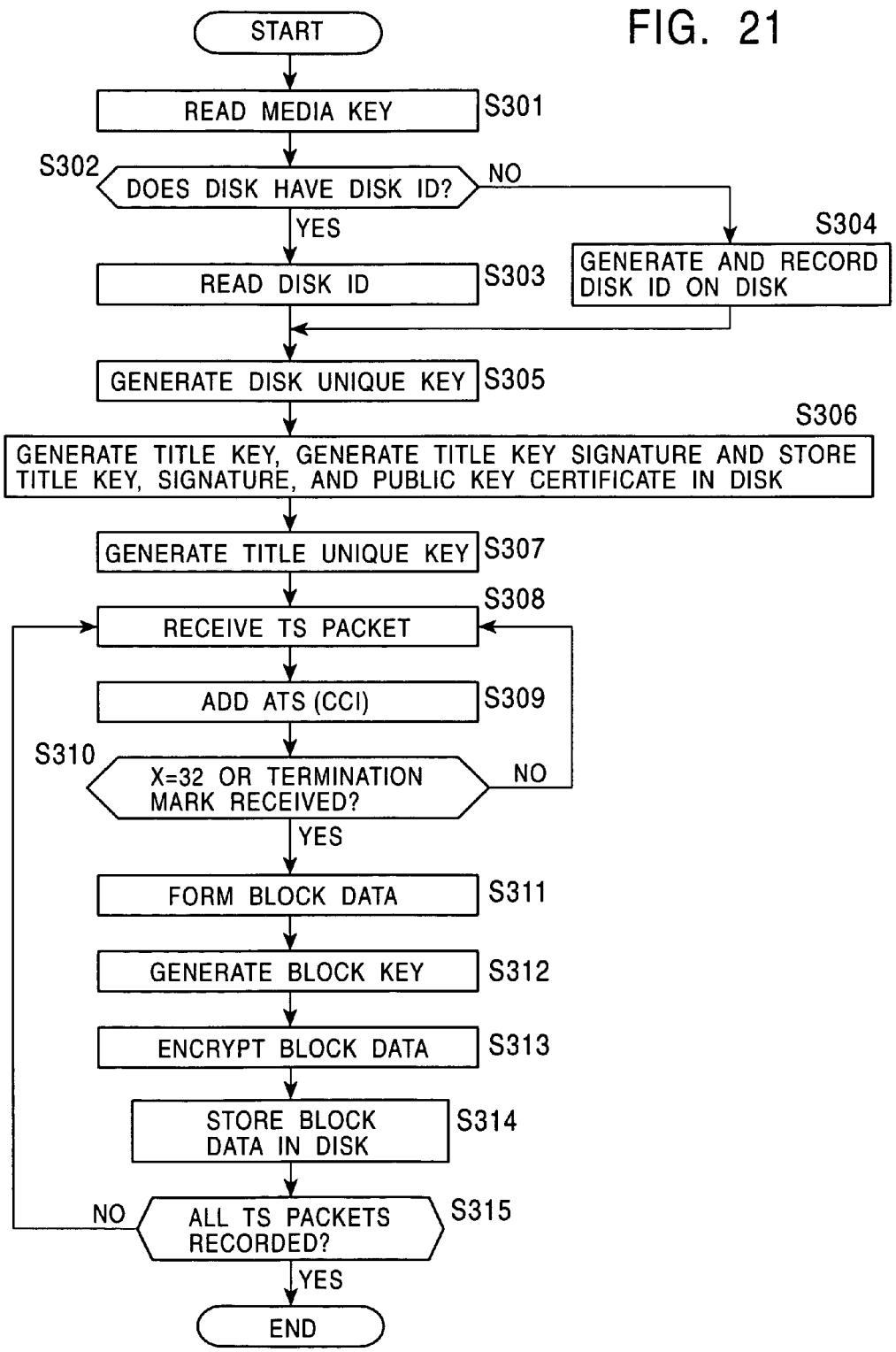
FIG. 21 is a flowchart showing a process of generating a digital signature on a title key before recording data in the information recording/playback device of the present invention.

A process of not signing the encrypted content but executing a digital signature on the title key corresponding to the content when the encrypted content is recorded on the recording medium 200 is described below with reference to the flowchart shown in FIG. 21.

In step S301, the recording/playback device 100 acquires the media key by performing the above EKB processing shown in FIG. 13.

In step S302, the recording/playback device 100 inspects the recording medium 200 to determine whether a disk ID has been recorded thereon as identification information. If the disk ID has been recorded, the recording/playback device 100 reads the disk ID in step S303. If the disk ID has not been recorded, in step S304, a disk ID is generated at random or by a predetermined technique and is recorded on the recording medium 200. In step S305, by using the media key and the disk ID, a disk unique key is generated. The disk unique key is generated by using, for example, the hash function SHA-1 defined in the FIPS 180-1 or a hash function based on block encryption as described above and shown in FIGS. 15A and 15B.

Proceeding to step S306, a title key is generated as a unique key for each time of recording, and a digital signature is put on the generated title key. For example, the EC-DSA which is being established in the IEEE P1363 can be used as a method of generating the digital signature. The generated title key, digital signature, and public key certificate are recorded on the recording medium 200 (i.e., disk).

In step S307, based on the above disk unique key and title key, a title unique key is generated as shown in FIGS. 16A and 16B.

In step S308, the recording/playback device 100 receives the data of the content to be encrypted in the form of TS packets. In step S309, an ATS as information on a time at which each TS packet is received is added to the TS packet by the TS processing unit 300. Otherwise, a value obtained by combining the CCI, the ATS, and other information is added. In step S310, the TS packets with the ATS added are sequentially received, and it is determined whether the number (indicated by "X") of TS packets forming one block has reached 32, or whether identification data representing the termination of the TS packets has been received. When one of the conditions is satisfied, the recording/playback device 100 proceeds to step S311, and block data for one block is formed by arranging the X TS packets or the TS packets up to the end packet.

In step S312, based on the first 32 bits (block seed including the ATS) of the block data and the title unique key generated in step S307, the cryptosystem processing unit 150 generates a block key as a key for encrypting the data of the block (see FIGS. 17A and 17B).

In step S313, the block key is used to encrypt the block data formed in step S311. As described above, what is to be encrypted is the (m+1)th byte to the end byte. For example, the DES defined in the FIPS 46-2 may be used as the encryption algorithm.

In step S314, the encrypted block data is recorded on the recording medium 200. In step S315, it is determined whether all of the pieces of block data have been recorded. If the determination is affirmative, the recording process is terminated. If not, the recording/playback device 100 goes back to step S308 and executes processing on the remaining pieces of block data.

In the above processing, the content is encrypted and recorded on the recording medium 200, and the digital signature on the title key and the public key certificate are recorded on the recording medium 200.

In the above case, a digital signature is put on the title key. However, digital signatures may be put on the title key and a disk ID. This can make it clear that the data has been recorded on the disk. Accordingly, it can be easily determined that the data which is copied on another disk is an unlawful copy.

Content Playback Processing Using Media Key

Figure 22:
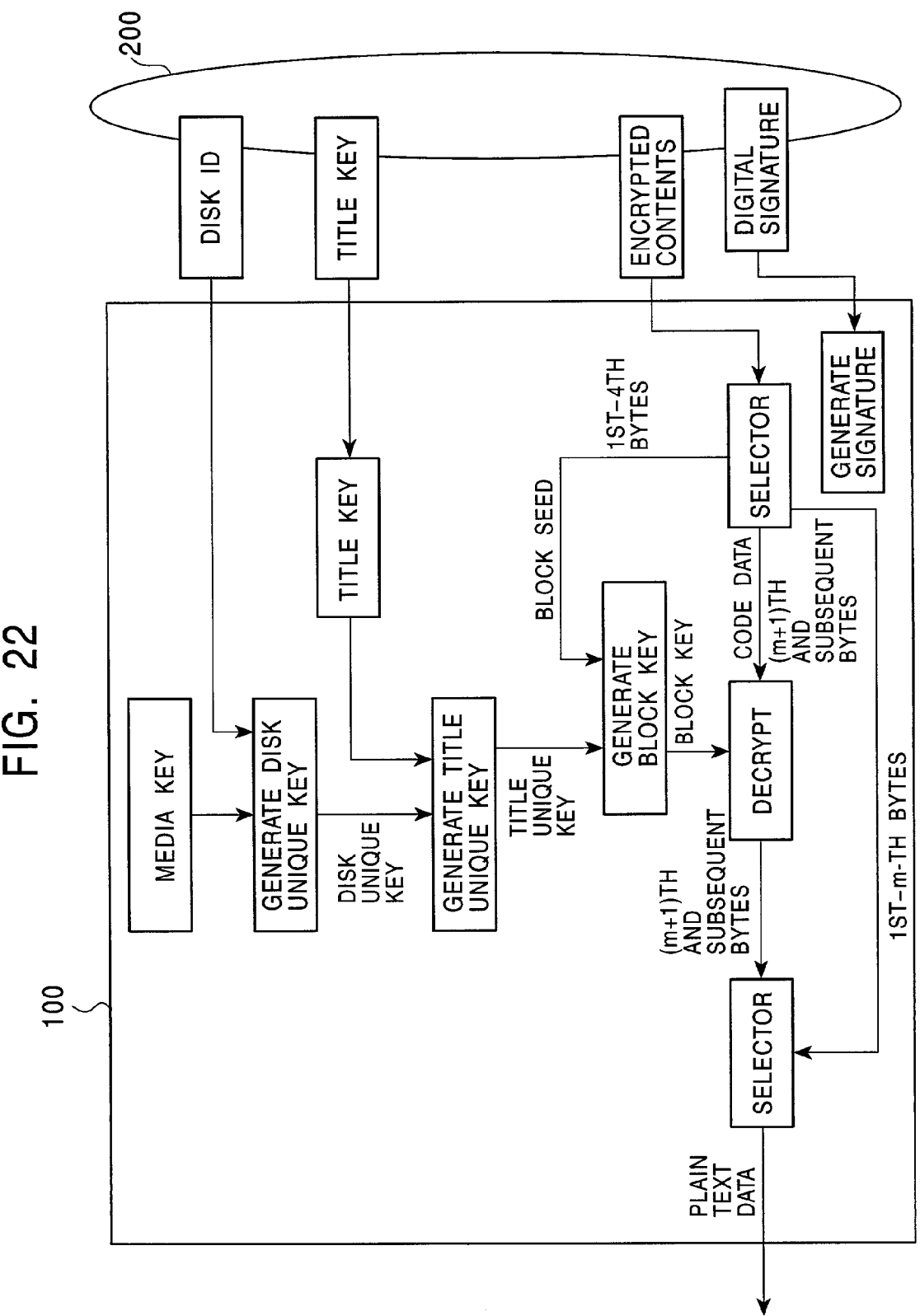
FIG. 22 is a block diagram showing decryption processing performed when data-playback processing is performed by the information recording/playback device of the present invention.

Next, processing to decrypt and play back the encrypted content recorded on the recording medium 200 is described below with reference to FIG. 22 and subsequent drawings.

In the playback processing, first, the public key certificate and digital signature of a recording device are read by a playback device together with content data to be played back, and are checked for validity.

Specifically, by using a public key (signature verification key) of a reliable center which is retained by the playback device, the validity of the public key certificate can be verified. If the verification is affirmative, the digital signature which is included in the public key certificate and which is generated and recorded by using the public key (signature verification key) of the recording device is inspected. For example, the EC-DSA can be used as a method of inspecting the digital signature.

Next, the playback device reads the identification information (ID) of the recording device from the recorded public key certificate. The playback device verifies, based on the read public key certificate and revocation information, that the recording device has not been revoked.

Revocation Inspection Using Revocation List

For example, the revocation list shown in FIG. 23 can be used as the revocation information. As shown in FIG. 23, the revocation list contains data on the IDs of devices to be revoked, and a digital signature put on the version number by the center. The revocation list is (1) stored, for example, in the memory of a produced device (recording/playback device), and (2) distributed with content data by a network or on recording media. By using this method, etc., to distribute the revocation list in the system, the playback device can be set to obtain newer revocation list information when performing playback processing.

When the revocation list is used, processing for verifying the center's signature stored in the revocation list is executed in order to check the revocation list for forgery and falsification. The signature verification processing can be performed by using the center's public key (signature verification key) retained beforehand by a device similarly to the verification of signature on the public key certificate.

Revocation Inspection Using EKB

Figure 24:
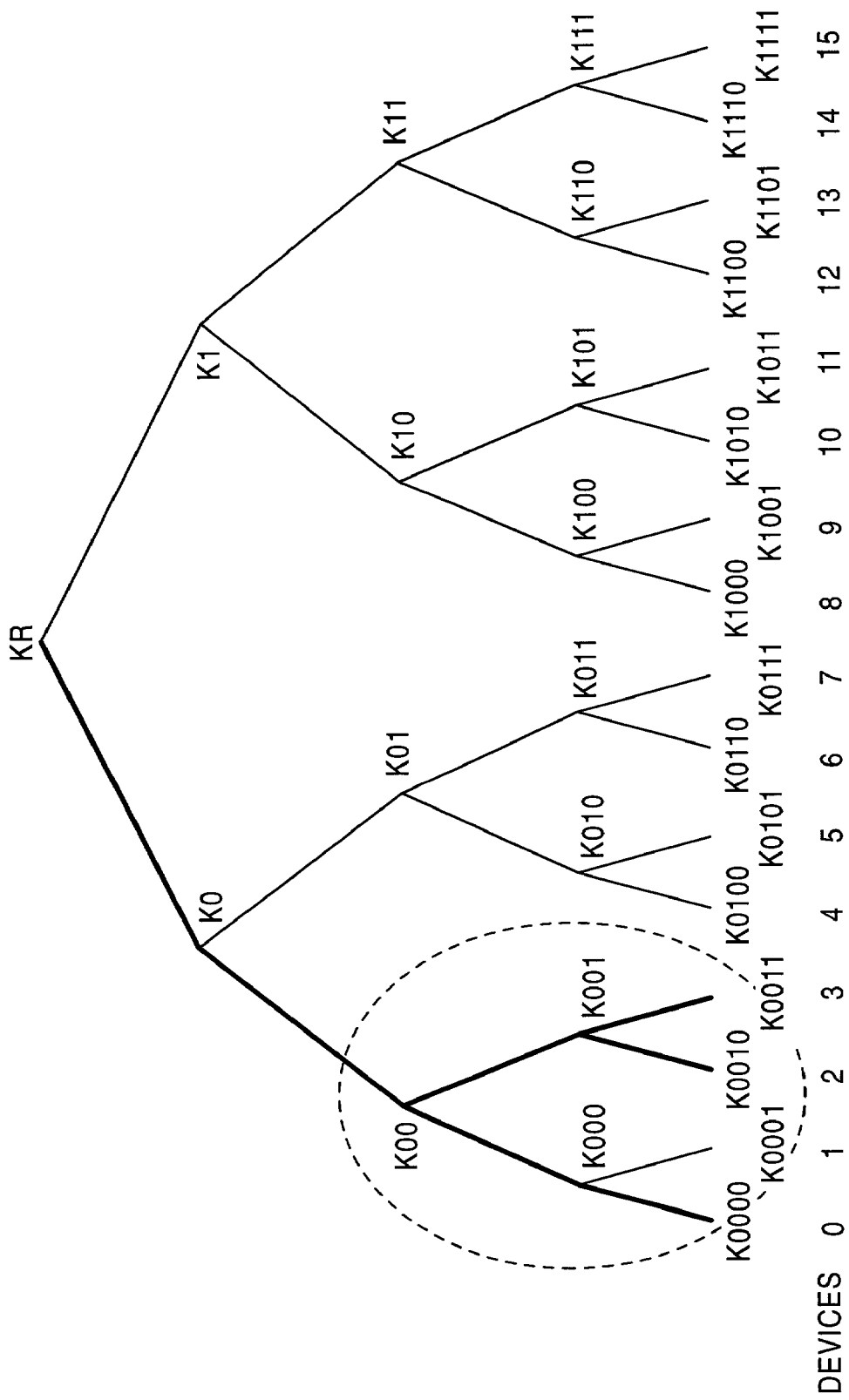
FIG. 24 is an illustration of processing in the case of applying the EKB distribution tree to inspection of devices for revocation in the information recording/playback device of the present invention.

The revocation list information does not need to be distributed to each device in the list form shown in FIG. 23, and it may be determined separately whether or not each device has been revoked. For example, it is assumed that the EKB in the example 1 shown in FIG. 12A is stored in a recording medium in a system composed of devices arranged in the form of a tree as shown in FIG. 11. In this case, by following the values of the index of the EKB, it can be understood as to each device that node keys updated by the EKB are represented in the form of the bold line tree shown in FIG. 24.

It also can be understood that the only devices capable of obtaining updated node keys are those under the leaves of the bold line tree, that is, devices 0, 1, and 2. In addition, it can be understood that the other devices are revoked, so that, when executing the playback processing, by executing processing to inhibit content data recorded by revoked devices from being played back, redistribution of the content recorded by the revoked devices can be terminated. In this example, it is assumed that the positions of the leaves shown in FIG. 11 corresponds to the device IDs. In other words, based on the IDs, by executing processing which follows the values of the index of the EKB, it can be determined whether or not each device is revoked.

Revocation inspection by index-value following processing is described below.

Figure 25:
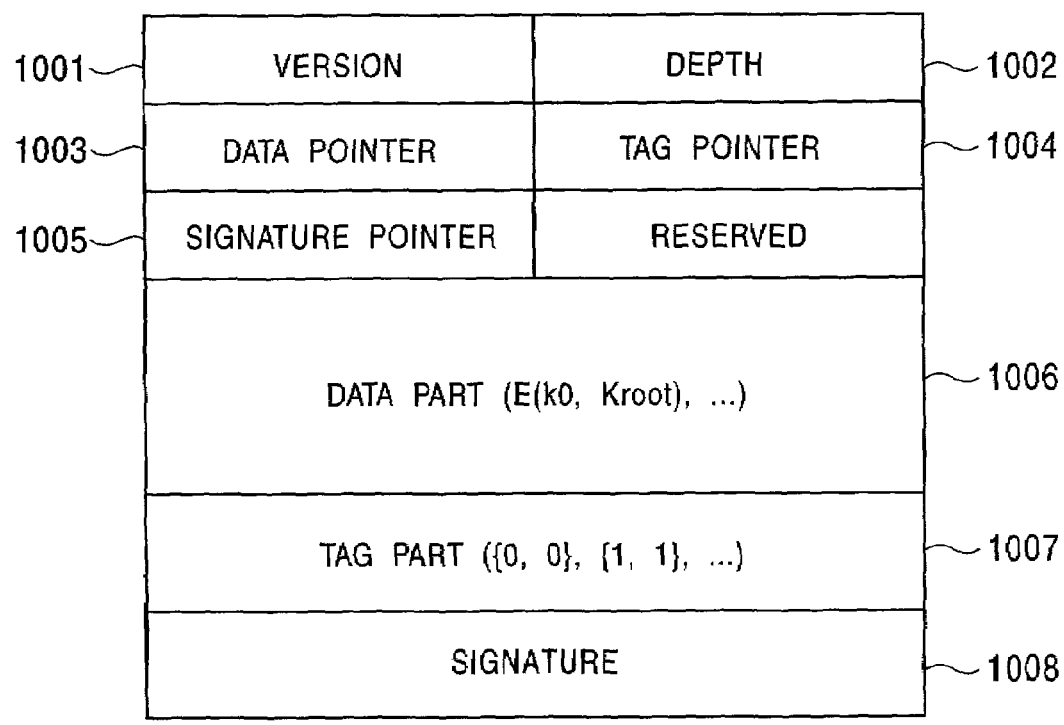
FIG. 25 is an illustration of a format for an EKB usable for the information recording/playback device of the present invention.

First, in FIG. 25, an example of a format of an EKB is shown. "Version" 1001 is an identifier indicating the version of an EKB. The Version 1001 has functions of identifying the latest EKB and of showing correspondence with pieces of content. "Depth" 1002 represents the number of layers in a layered tree formed by devices to which the EKB is distributed. "Data pointer" 1003 is a pointer representing the position of a data part 1006 of the EKB. "Tag pointer" 1004 is a pointer representing the position of a tag part 1007, and "Signature Pointer" 1005 is a pointer representing a signature.

The data part 1006 stores, for example, data generated by an encrypted node key to be updated. Specifically, the data part 1006 stores, for example, the encryption keys on the updated node keys shown in FIG. 13.

Figure 26:
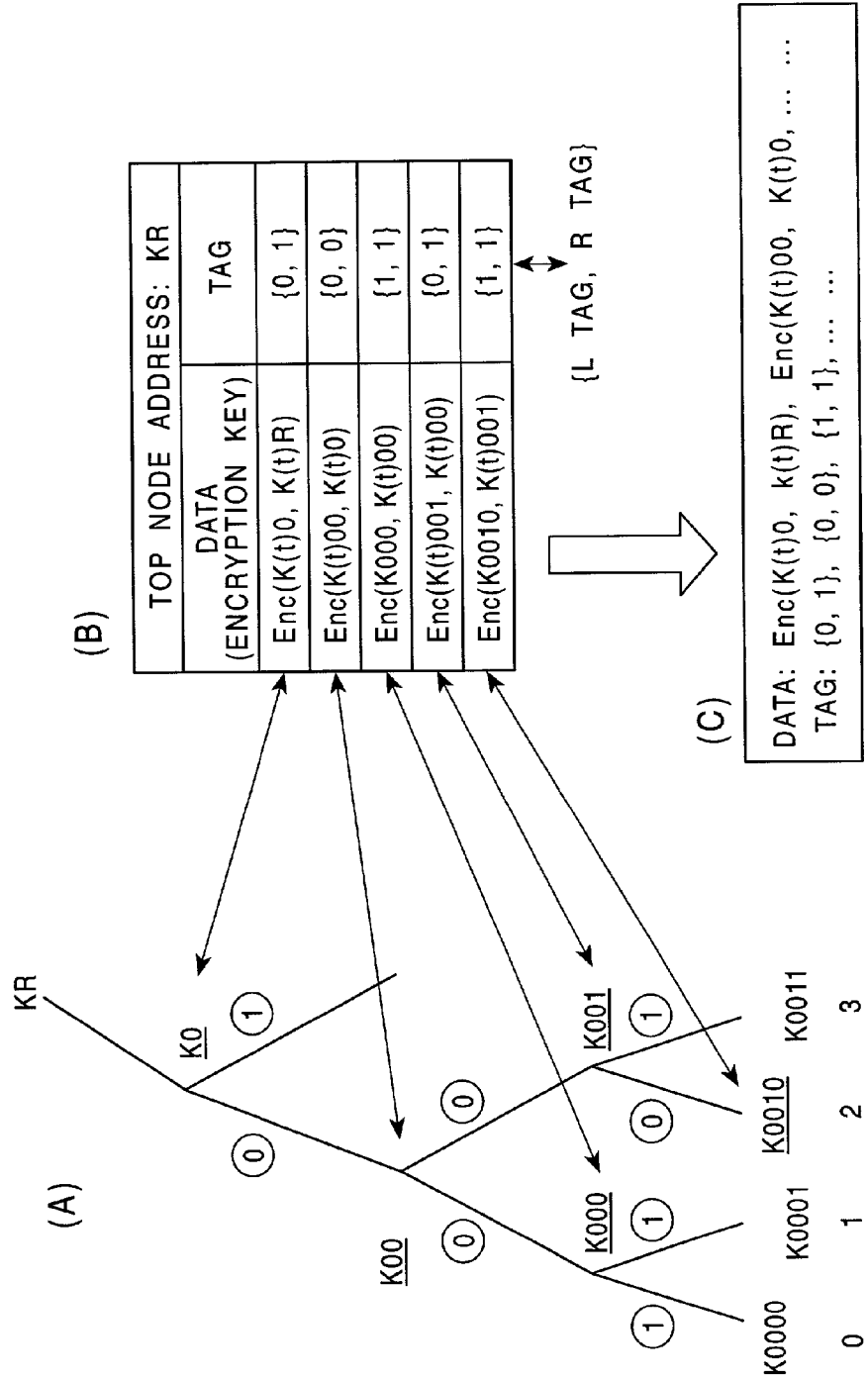
FIG. 26 is an illustration of tags in the EKB.

The tag part 1007 represents positional relationships among the encrypted node keys and leaf keys which are stored in the data part 1006. The rule of provision of tags is described with reference to FIG. 26. FIG. 26 shows a case in which the EKB shown in FIG. 12A is sent. Data in this case is shown in portion (B) of FIG. 26. The address of a top node included in the encryption key is used as a top node address. In this case, an updating key K(t)R of a root key is included. Thus, the top node address is KR. At this time, for example, the top data Enc(K(t)0, K(t)R) (in portion (B) of FIG. 26) is positioned as indicated by the layered tree shown in portion (A) of FIG. 26. In this structure, the next data is Enc(K(t)00, K(t)0) and is positioned on the lower left side of the previous data. When there is data, zero (0) is set as a tag. When there is no data, one (1) is set as a tag. The tag is set in the form of {left (L) tag, right (R) tag}. Since there is data on the left of Enc(K(t)0, K(t)R), L tag=0. Since there is no data on the right of Enc(K(t)0, K(t)R), R tag=1. Subsequently, tags are set for all pieces of data, so that the data string and tag string shown in portion (C) of FIG. 26 is formed.

Each tag is a key-arrangement identification tag that is set to represent the position of data Enc(Kxxx, Kyyy) in the tree structure. Key data Enc(Kxxx, Kyyy) stored in the data part 1006 is nothing but a row of data of simply encrypted keys. Accordingly, by using the above tag, the position in the tree structure of the encryption key stored as data can be identified. It is possible that, without using the above tag, by using node indices corresponding to pieces of encrypted data as shown in FIG. 12A, for example, the following data configuration be formed:

0:Enc(K(t)0, K(t) root),
00:Enc(K(t)00, K(t)0),
000:Enc(K(t)000, K(t)00),

However, this configuration using indices forms redundant data, thus increasing the amount of data, so that it is not preferable for distribution via a network, etc. Instead, by using the above tag as index data representing the position of each key, the use of a small amount of data enables recognition of the position of each key.

Referring back to FIG. 25, the EKB format is further described below.

The signature 1008 is an electronic signature by an EKB issuing authority having issued the EKB, such as a certification authority, a key management center, a content provider, or a settlement organization. A device that receives the EKB uses signature verification to verify that the received EKB has been issued by an authorized EKB issuer.

As can be understood from the description using FIG. 26, each tag stored in the EKB uses zero and one to respectively represent the presence and absence of key data in the right and left nodes with respect to the node corresponding to the tag. In other words, the presence of data is represented by zero, and the absence of data is represented by one. The processing based on leaf IDs of following the values of the EKB, that is, a follow technique, is performed by using set conditions as described above.

The processing of following the values of the EKB based on leaf IDs is described below with reference to FIGS. 27A and 27B.

Figure 27B:
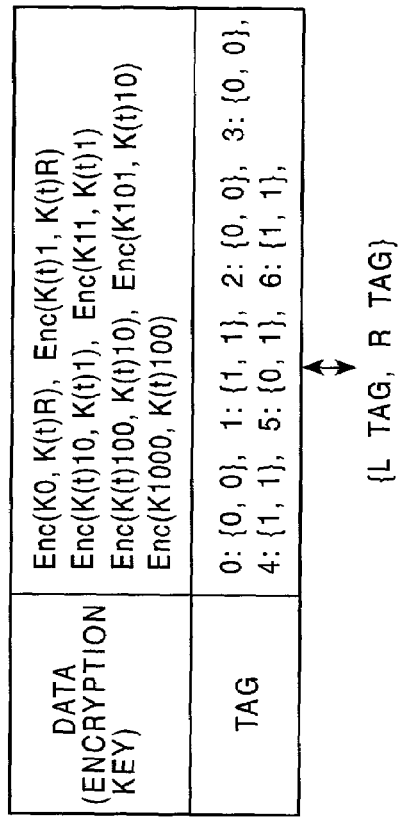
FIGS. 27A and 27B are first illustrations of EKB-following processing for determining a revoked entity.
Figure 27A:
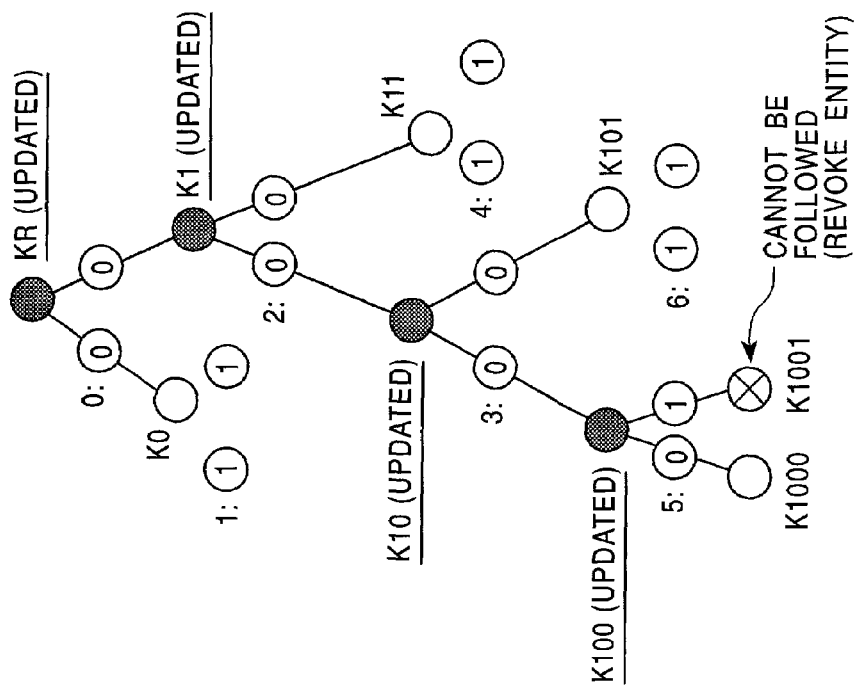

As FIG. 27A shows, it is assumed that a device having leaf key K1001 is a revoked device "1001". At this time, the EKB has the encryption keys and tags shown in FIG. 27B.

The EKB in FIG. 27B is obtained by updating KR, K1, K10, and K100 in order to revoke the device "1001".

By processing the EKB in FIG. 27B, all leaves other than revocation device "1001" can acquire updated root key K(t)R. In other words, in each of lower leaves connected to node key K0, node key K0 which has not been updated is stored in the device. Thus, by using K0 to decrypt Enc(K0, K(t)R), updated root key K(t)R can be acquired. Leaves lower than K11 acquire updated node key K(t)1 by using K11 which has not been updated to decrypt Enc(K11, K(t)1). The leaves can acquire an updated root key by using K(t)1 to decrypt Enc(K(t)1, K(t)R). Similarly, leaves lower than K101 can acquire the updated root key in a process in which only an additional decryption step is added.

Device "1000" having leaf key K1000 which has not been revoked uses its leaf key to decrypt Enc(K1000, K(t)100) and acquires K(t)100. After that, it can acquire the updated root key by sequentially decrypting upper node keys.

Only the revoked device "1001" cannot acquire updated node key K(t)100, which is on a layer upper than the corresponding leaf, by using the EKB processing. Thus, updated root key K(t)R cannot be acquired.

An EKB having the data part and tags shown in FIG. 27B is distributed from the EKB issuing authority and stored in a valid device which has not been revoked.

After verifying a public key certificate of revocaton device "ID=1001", each device that verifies revocation acquires an ID from the public key certificate. This ID is "1001" and represents a leaf position in the EKB-distribution tree structure.

The device that acquires the ID "1001" verifies whether or not a device corresponding to the leaf of ID=1001 is set as a valid leaf device in the EKB. This verification is executed as processing to determine whether the root key K(t)R in which leaf "1001" has been updated can be acquired.

For example, it is clear that leaves lower than nonupdated node keys (e.g., K0, K11, etc., in FIG. 27A) have not been revoked. Accordingly, it can be determined that the leaves are valid devices. In the case of a leaf lower than an updated node key, determination of whether its entity has been revoked can be performed based on determination of whether encrypted data capable of acquiring the updated node key is stored in the EKB.

A case in which the EKB-following processing is performed based on tags stored in an EKB is described below as an example of the determination process.

In an EKB-following process, it is determined whether the key-distribution tree structure can be followed from an upper root key. For example, by regarding the ID "1001" of leaf "1001" in FIG. 27A as four bits composed of "1", "0", "0", and "1", the key-distribution tree structure is sequentially followed from the most significant bit to lower bits. Bit "1" indicates going to the right, and bit "0" indicates going to the left.

According to the route in FIG. 27A, the most significant bit of ID "1001" is "1", which indicates going to the right. The first tag in the EKB is 0:{0, 0}, and it is determined that both branches have pieces of data, so that going to the right can reach K1. Next, the process goes to nodes lower than K1. Since the second bit of ID "1001" is "0", the process goes to the left. A tag representing the presence or absence of data which is lower than K1 is 2:{0, 0} as shown in FIGS. 27A and 27B, and the process determines that both branches have data, so that the process goes on the left and reaches K10. A tag representing the presence or absence of data which is lower than K10 is 3:{0, 0} as shown in FIGS. 27A and 27B, and the process determines that both branches have data, so that the process goes on the left and reaches K100. The last significant bit of ID "1001" is "1", so the process goes on the right. A tag representing the presence or absence of data which is lower than K100 is 5:{0, 1} as shown in FIGS. 27A and 27B, and represents the absence of data on the right. Thus, the process determines that it cannot reach node "1001", and determines that the device of ID "1001" is a revoked device which cannot acquire an EKB-updated root key.

For example, a device ID having the leaf key K1000 shown in FIG. 27A is "1000", and when EKB-following processing based on a tag in an EKB is performed as described, that is, the tree structure is followed, node "1000" can be reached. Thus, it is determined that the device is a valid one which has not been revoked and which can acquire a root key updated by the EKB.

In addition, node keys which have not been updated, for example, lower leaves such as K0 and K11, cannot be reached. However, in this case, an end leaf which has not been updated can be reached. A leaf lower than a node which has not been updated can perform EKB processing by using a node key which has not been updated, thereby acquiring an updated root key. Thus, the leaf is a valid device. Determination of whether or not a node key has been updated can be performed based on each tag corresponding to the node. Node keys K0, K11, and K101 which have not been updated correspond to tags 1:{1, 1}, 4:{1, 1}, and 6{1, 1}, respectively. These indicate that the nodes have lower nodes or leaves and do not have any encryption key data in the EKB. Accordingly, it is determined that the devices corresponding to the lower leaves are valid ones which have not been revoked.

Figures 28A, 28B:
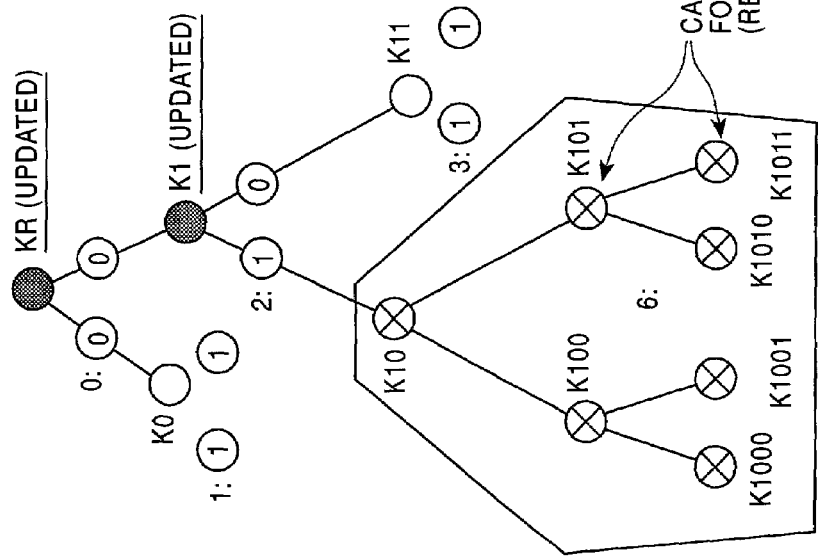
FIGS. 28A and 28B are second illustrations of EKB-following processing for determining a revoked entity.

FIG. 27A shows a revocation model in which only one device is revoked. However, as FIG. 28A shows, all leaf devices lower than a node can be revoked, with the devices treated as a group. EKB data (encryption keys) and tags in this case are as shown in FIG. 28B.

For example, if a device acquires ID "1000" from a public key certificate of a revoked leaf device corresponding to K1000, processing that follows the tree structure, based on ID "1000" and EKB tags, is executed.

From the route in FIG. 28A, it is found that the most significant bit is "1", and the process goes to the right. Since the first tag in the EKB is 0:{0, 0}, it is determined that both branches have data, and the process goes to the right and can reach K1. Next, the process goes to nodes lower than K1. Since the second bit of ID "1000" is "0", the process goes to the left. A tag that indicates whether there is data lower than K1 is 2:{1, 0} as shown in FIG. 28B. This indicates that the left side has no data. Thus, node "1000" cannot be reached. In this case, a tag corresponding to the end node K1 is {1, 0}, which does not represent {1, 1} indicating that there is no lower data.

The tag {1, 0} indicates that encryption key data for acquiring updated K(t)1 which can be decrypted in a right node or leaf lower than K1 is stored in the EKB.

In the above case in which the final spot reached by the leaf ID is a node, and the tag corresponding to the final node has values other than {1, 1}, it is indicated that lower encryption key data is stored in the EKB. In this case, a leaf device having the ID cannot acquire the updated root key, so that it is determined that the leaf device is a revoked device.

As described above, it can be determined whether a device with which one communicates is revoked based on a leaf ID stored in a public key certificate acquired from the device in certification processing.

Figure 29:
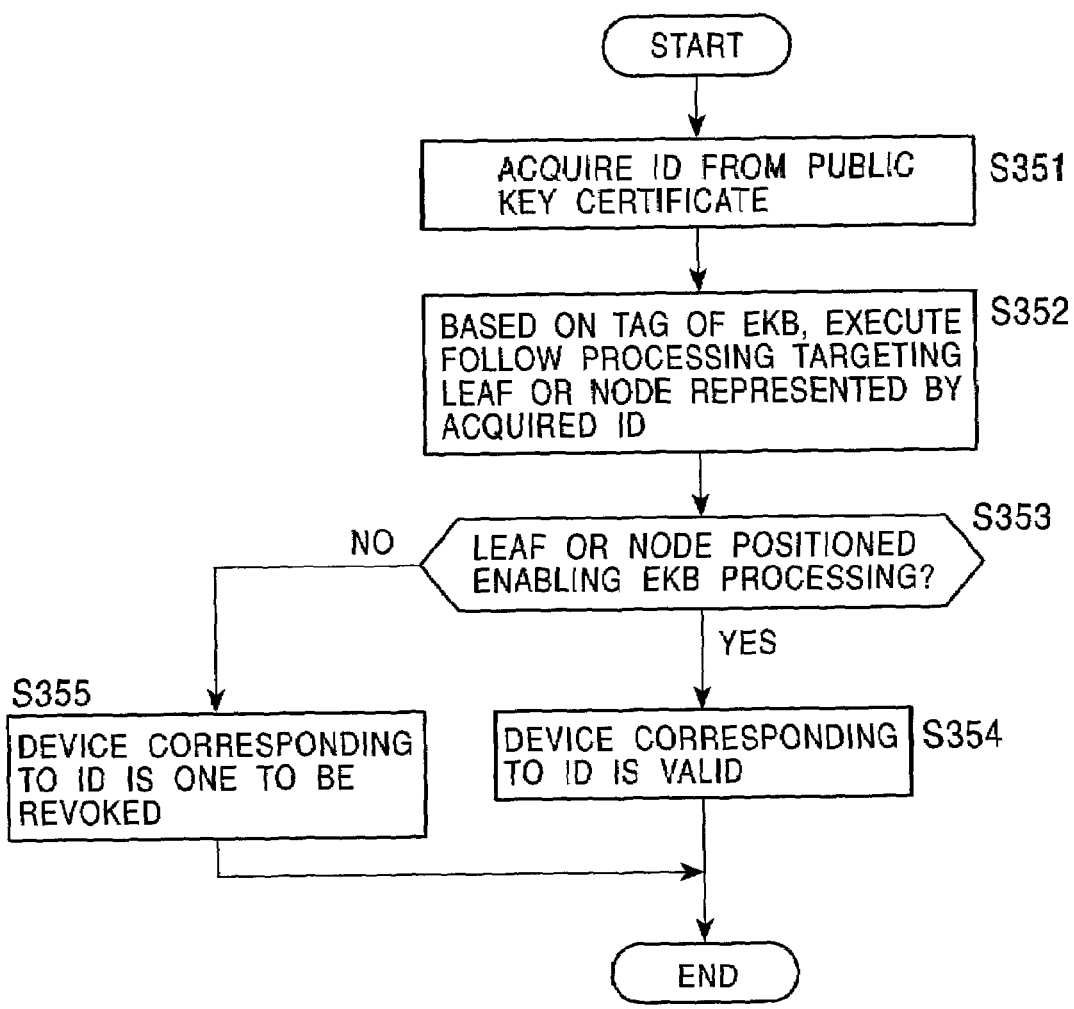
FIG. 29 is a flowchart showing EKB-following processing for determining a revoked entity.

In FIG. 29, a flowchart of EKB-used revoked-device determination processing is shown. In step S351, an ID is acquired from a public key certificate to be inspected. In step S352, by using the acquired ID, and based on EKB tags, follow processing targeting a leaf and node represented by the ID is executed.

The follow processing is executed in accordance with the processing described with reference to FIGS. 27A to 28B. In step S353, the process determines whether the follow processing has reached the represented leaf or node, or whether EKB processing can be performed in the represented leaf or node, that is, whether an updated root key can be acquired.

If the process has determined that the ID is positioned so that the EKB processing can be performed, the process proceeds to step S354 and determines that the device corresponding to the ID is valid. Conversely, if the process has determined that the ID is positioned so that the EKB processing cannot be performed, the process proceeds to step S355 and determines that the device corresponding to the ID has been revoked.

In the above follow processing, the tag part of the EKB is used, but the data part is not used. For the purpose of representing revocation information, this technique is used. Specifically, by using not the normal EKB shown in FIG. 25 but an EKB which does not include a data part, the size of the EKB can be reduced. Of course, a normal content-protecting EKB as shown in FIG. 25 can be used in order to represent revocation information.

As described above, by performing revocation inspection in accordance with a revocation list or the EKB-tree-following processing, verification of whether a device that has recorded content on a recording medium has been revoked is performed. Under the condition that it has been verified that the device having recorded content on a recording medium has been revoked, a playback device continues to perform playback processing on the content data. In the playback processing, similarly to the encryption and recording processing described using FIG. 14, a disk unique key is generated from a media key and a disk ID, a title unique key is generated from the disk unique key and a title key, and a block key is generated from the title key and a block seed read from a recording medium. By using the block key as a decryption key, processing that decrypts encrypted data in units of blocks read from the recording medium 200 is executed.

Figure 30:
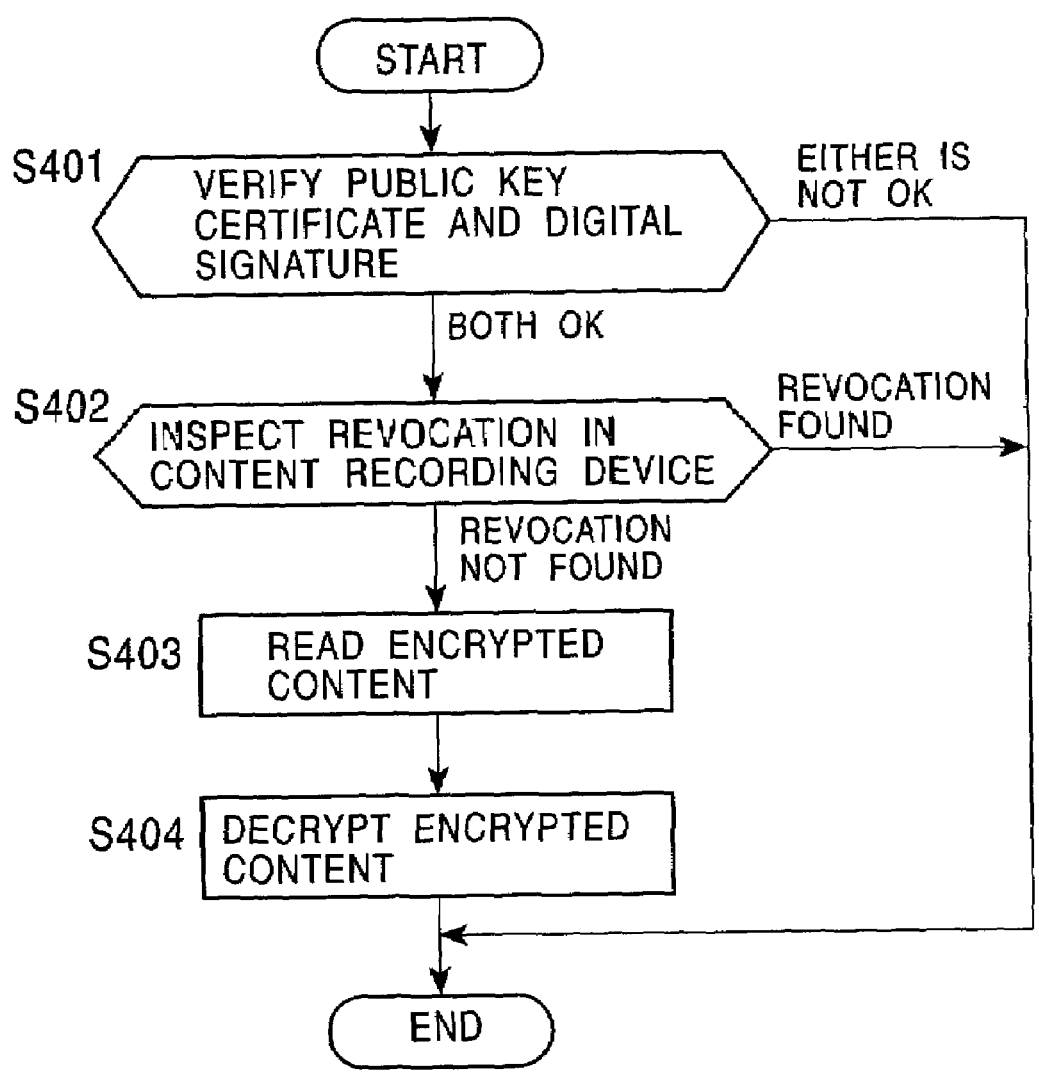
FIG. 30 is a flowchart showing a process of playing back data after verifying a digital signature in the information recording/playback device of the present invention.

The outline of the playback processing is described below with reference to the flowchart shown in FIG. 30.

In step S401, the playback device performs verification of a public key certificate and digital signature of a content recording device which are stored in a recording medium on which content to be played back is recorded. The verification is performed such that, after the validity of the public key certificate is verified by using the public key of a center to verify a center's signature of the public key certificate, a public key certificate of the content recording device which is stored in the public key certificate is extracted to verify the digital signature of the content recorder. When the public key certificate and the digital signature are verified, the processing proceeds to step S402. If one of the public key certificate and the digital signature is not verified, the subsequent steps are inhibited from being executed and the playback processing stops.

In step S402, revocation of the content recording device is inspected. The revocation inspection is performed by verifying whether, for example, each device ID stored in the revocation list shown in FIG. 23, which is stored in the playback device beforehand, matches a device ID in the public key certificate. Otherwise, a tree-structure-following process using the above-described EKB tree may be executed. If it is determined in step S402 that the content recording device has not been revoked, step S403 is executed. If the content recording device has been revoked, the subsequent steps are inhibited from being executed and the playback processing stops.

If it is determined in step S402 that the content recording device has not been revoked, in step S403, the encrypted content is read from the recording medium. In step S404, the encrypted content is decrypted and played back.

As described above, in the processing of playing back the content recorded on the recording medium, by determining a content-recording-device revocation condition, only content recorded by a device which has not been revoked is played back. Thus, illegally recorded content is prevented from being distributed and used without order. The revocation determination is performed based on an ID stored in the public key certificate, and its reliability is maintained.

Figure 31:
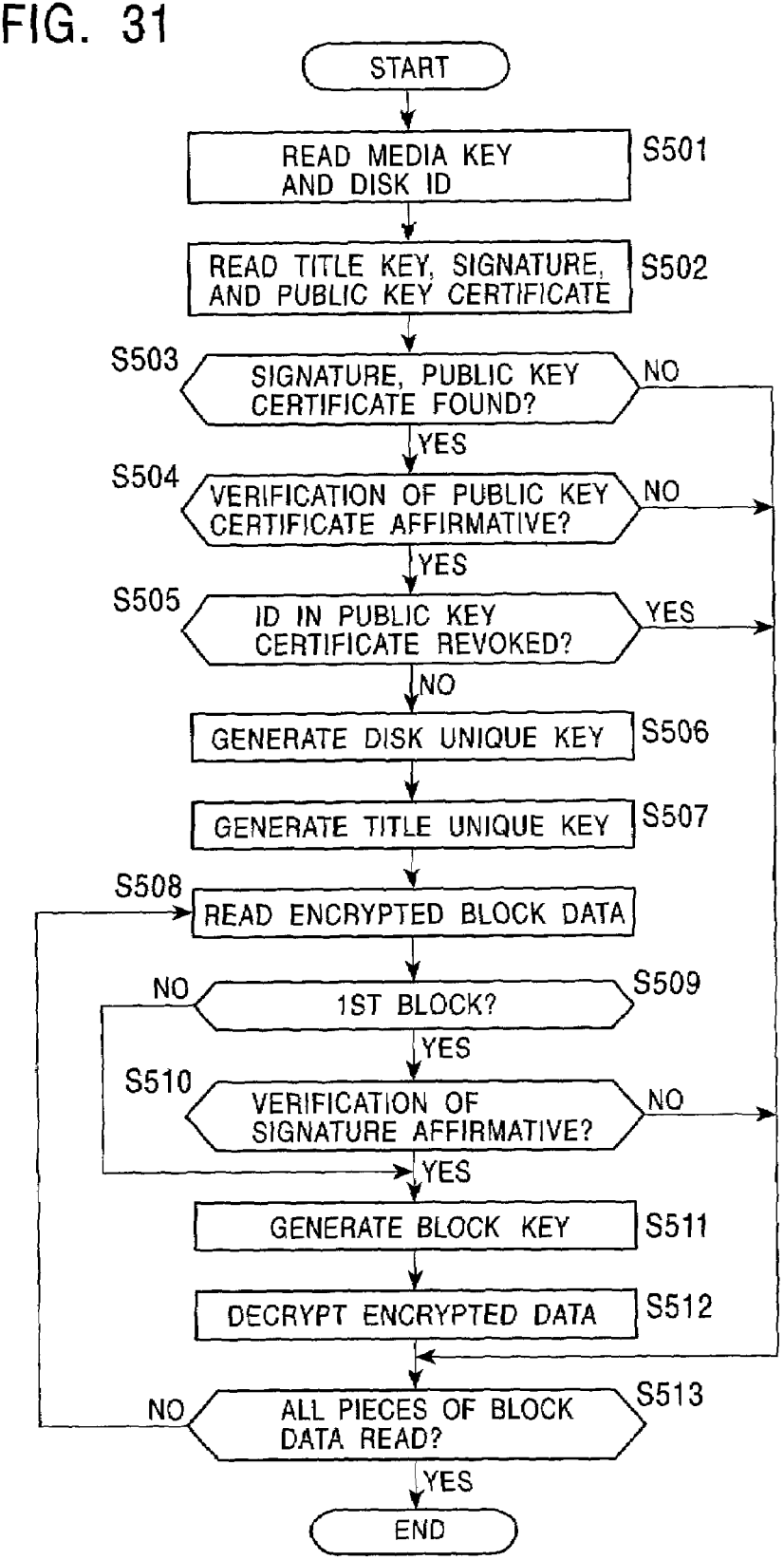
FIG. 31 is a flowchart showing a process of playing back data after verifying a digital signature on encrypted content in the information recording/playback device of the present invention.

Next, a detailed process for playing back a record obtained by putting a digital signature on the encrypted content is described below with reference to FIG. 31.

In step S501, the playback device reads a media key and a disk ID. In step S502, the playback device reads a title key, a digital signature, and a public key certificate. When the playback device does not find any digital signature and any public key certificate ("NO" in step S503), the playback device determines that the encrypted content is not one recorded by valid processing, and stops the subsequent steps. The playback processing ends.

When the playback device finds the digital signature and the public key certificate ("YES" in step S503), in step S504, verification of the public key certificate is executed. This verification is executed by using a public key, which is possessed by the playback device, of a center (certification authority) managing public-key-certificate issuance. When the verification is affirmative and validity is confirmed in step S504, the process proceeds to step S505. When the verification is negative in step S504, the execution of the subsequent steps is terminated and the playback processing stops.

In step S505, the ID of a recording device having recorded the content is extracted from the public key certificate, and revocation is checked. The revocation check is performed by using the revocation list shown in FIG. 23 or the tree-structure-following processing. When it is determined in step S505 that revocation is found, the execution of the subsequent steps is terminated and the playback processing stops.

In step S506, by using the media key and the disk ID, a disk unique key is generated. The disk unique key is found by using, for example, the method using hash function SHA-1 defined in the FIPS 180-1 or the method of using the hash function based on block encryption as described above, as shown in FIGS. 15A and 15B.

In step S507, a title key is read, and from the title key and the disk unique key, a title unique key is generated, as shown in FIGS. 16A and 16B.

In step S508, the playback device reads block data of the content data to be played back. In step S509, the playback device determines whether the read block is the first block. When the read block is the first block, in step S510, verification of a digital signature of the content recorder (recording device) which is generated for the first block is executed. The verification of the digital signature is executed by using the public key of the content recording device which is extracted from the validity-verified public key certificate. When the verification in S510 is affirmative and the validity is confirmed, the process proceeds to step S511. When the verification in S510 is negative, the execution of the subsequent steps is terminated and the playback processing stops.

In step S511, from the first 32 bits (block seed including an ATS) of the block data and the title unique key generated in step S507, a block key as a key that decrypts the block data is generated (see FIGS. 17A and 17B).

In step S512, by using the block key, the block data is decrypted. For example, the DES defined in FIPS 46-2 may be used as an algorithm for decryption.

In step S513, the process determines whether all the pieces of data have been read. When all the pieces of data have been read, the playback processing is terminated. When all the pieces of data have not been read, the process goes back to step S508 and executes the processing of the remaining pieces of data.

As described above, the verification of the public key certificate, the determination of the revocation of the content recording device, and the verification of the digital signature on block data of the encrypted content are sequentially executed. Based on satisfaction of all conditions, content validity is verified, and the encrypted content is decrypted and played back from the recording medium.

Figure 32:
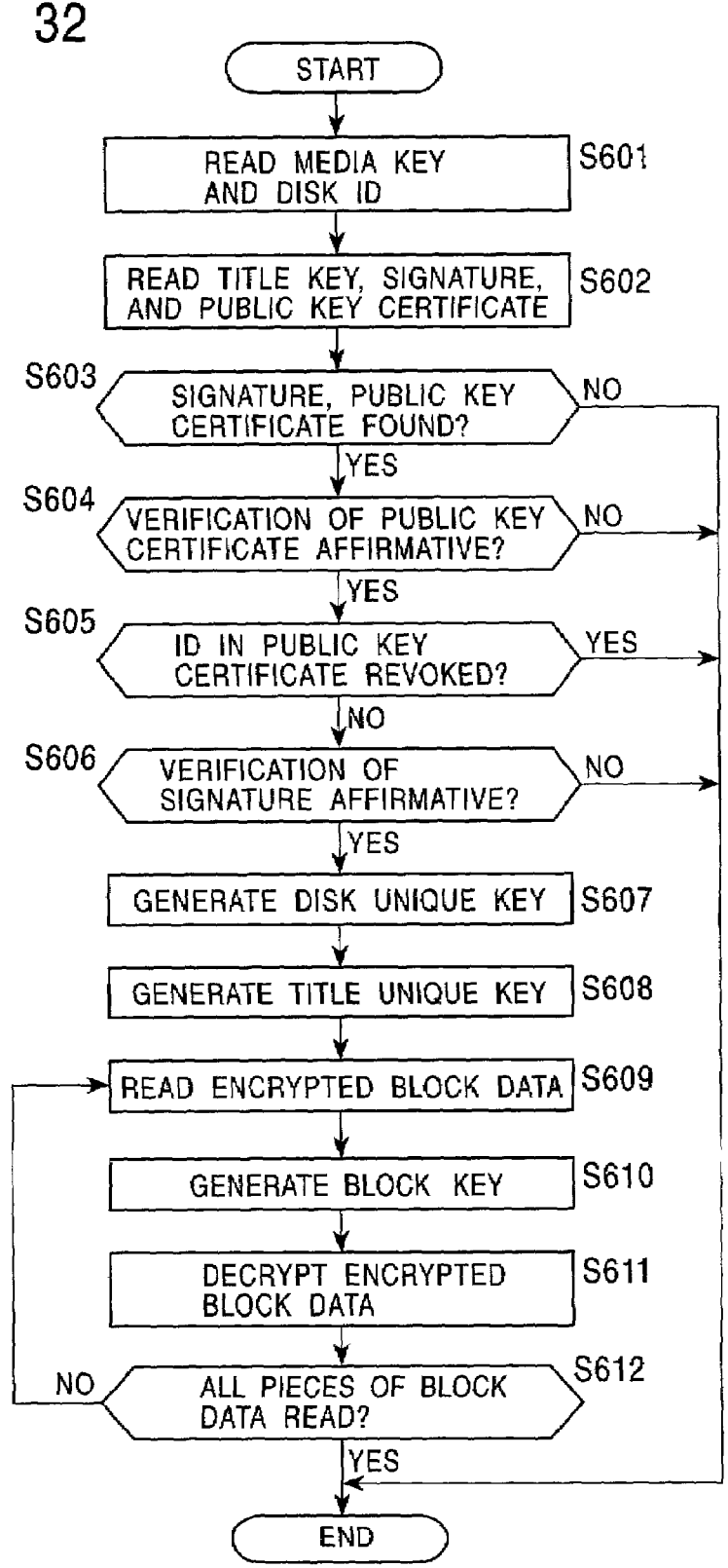
FIG. 32 is a flowchart showing a process of playing back data after verifying a digital signature on a title key in the information recording/playback device of the present invention.

Next, a detailed process for playing back recorded content having a digital signature on a title key is described below with reference to FIG. 32.

In step S601, the playback device reads a media key and a disk ID from the recording medium. In step S602, the playback device executes reading of a title key, a digital signature, and a public key certificate. When the public key certificate is not found ("NO" in step S603), it is determined that the recorded content is not one recorded by valid processing, and the execution of the subsequent steps is terminated and the playback processing stops.

When the public key certificate is found ("YES" in step S603), in step S604, verification of the public key certificate is executed. The verification of the public key certificate is executed by using a public key, which is possessed by the playback device, of a center (certification authority) managing public-key-certificate issuance. When the verification of the public key certificate is affirmative and its validity is confirmed, the process proceeds to step S605. When the verification of the public key certificate is negative, the execution of the subsequent steps is terminated and the playback processing stops.

In step S605, the ID of a recording device having recorded content is extracted from the public key certificate, and a revocation check is performed. The revocation check is executed by using either the revocation list shown in FIG. 23 or the tree-structure-following processing. When it is determined that no content recording device has been revoked, the process proceeds to step S606. When revocation is found, the execution of the subsequent steps is terminated and the playback processing stops.

In step S606, verification of a digital signature of the content recorder (recording device) which is generated for the title key is executed. The verification of the digital signature is executed by using the public key of the content recording device which is extracted from the validity-verified public key certificate. When the verification in S606 is affirmative and the validity is confirmed, the process proceeds to step S607. When the verification in S606 is negative, the execution of the subsequent steps is terminated and the playback processing stops.

In step S607, by using the media key and the disk ID, a disk unique key is generated. The disk unique key is found by using, for example, the method of using hash function SHA-1 defined in the FIPS 180-1 or the method of using a hash function based on block encryption, as shown in FIGS. 15A and 15B.

In step S608, the title key is read, and by using the read title key and the disk unique key, a title unique key is generated (see FIGS. 16A and 16B).

In step S609, the playback device reads block data of content data to be played back. In step S610, from the first 32 bits (block seed including an ATS) of the block data and the title unique key generated in step S608, a block key as a key that decrypts the block data is generated (see FIGS. 17A and 17B).

In step S611, by using the block key, the block data is decrypted. For example, the DES defined in FIPS 46-2 may be used as an algorithm for decryption.

In step S612, the process determines whether all the pieces of data have been read. When all the pieces of data have been read, the playback processing is terminated. When all the pieces of data have not been read, the process goes back to step S609 and executes the processing of the remaining pieces of data.

As described above, the verification of the public key certificate, the determination of the revocation of the content recording device, and the verification of the digital signature on block data of the encrypted content are sequentially executed. Based on satisfaction of all conditions, content validity is verified, and the encrypted content is decrypted and played back from the recording medium.

As described above, in encryption processing in the case of recording content data on a recording medium and in decryption processing in the case of playing back content data from a recording medium, a media key is calculated based on an EKB, and based on the calculated media key and other identifiers, etc., a key for encryption processing on content or a key for decryption processing on encrypted content is generated.

In the above embodiments, a case in which a key for encryption processing on content or a key for decryption processing on encrypted content is generated by using a media key has been described. However, by acquiring not the media key but a master key common to a plurality of recording/playback devices, or a device key unique to a recording/playback device from an EKB, a key for encryption processing or a key for decryption processing may be generated based on the acquired key. In addition, the media key, the master key, or the device key itself, which is acquired from the EKB, can be used as a key for encryption processing or for decryption processing of content data.

As described above, in the present invention, when recording data on an information recording medium, a recording/playback device records its digital signature and public key certificate with the data. Therefore, since evidence showing which recording/playback device was used for recording is always recorded with the data in the case of recording information, which recording/playback device was used for recording is specified and can be excluded from the system, even if recording media including illegally recorded data are distributed.

In addition, a recording/playback device is designed so that it reads data after verifying the validity of the digital signature and the public key certificate, and verifying that it has not been revoked from the system. This strongly excludes an invalid device from the system by invalidating an attack in which an invalid recording device does not digitally sign unlawfully recorded data and by preventing a valid device from playing back data recorded by the invalid device.

Copy Control in Record Processing

To protect profit of a copyright holder or the like, a licensed device must control copying of content.

Specifically, when content is recorded on a recording medium, the content is checked to determine whether it may be copied, and only the content that may be copied is recorded. In addition, when content recorded on the recording medium is played back and output, the output content must be prevented from being illegally copied afterward.

Processing of the recording/playback device shown in FIG. 1 when it records/plays back content while controlling the copying of the content is described with reference to the flowcharts shown in FIGS. 33A and 33B, and 34A and 34B.

Figure 33A:
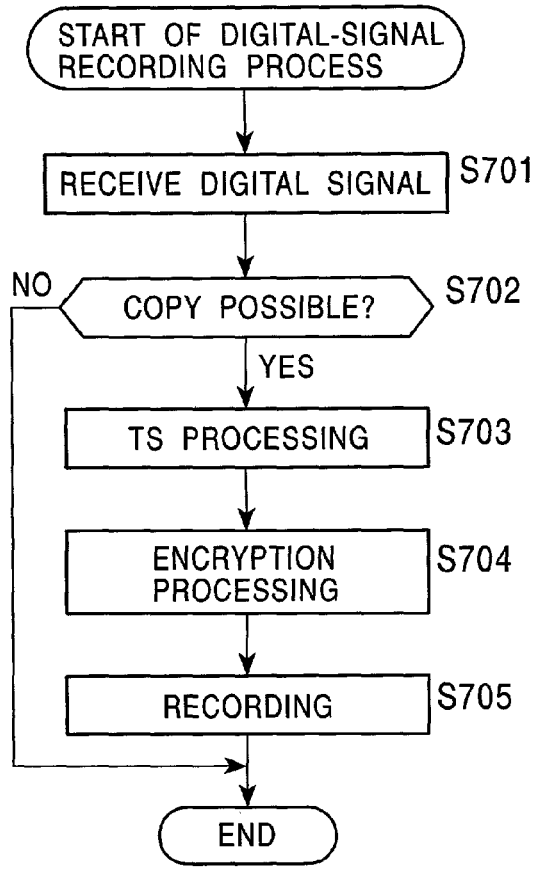
FIGS. 33A and 33B are flowcharts respectively showing copy control processes performed when recording a digital signal and when recording an analog signal in the information recording/playback device of the present invention.

When digital-signal content (digital content) from the exterior is recorded on the recording medium, the recording process shown in FIG. 33A is performed. The recording process in FIG. 33A is described below.

The recording/playback device 100 in FIG. 1 is used for the description. When the digital content is supplied to the input/output I/F 120, for example, via an IEEE 1394 serial bus or the like, the input/output I/F 120 receives the digital content in step S701, and proceeds to step S702.

In step S702, the input/output I/F 120 determines whether the received digital content may be copied. Specifically, when the content received by the input/output I/F 120 is not encrypted, for example, when plaintext content is supplied to the input/output I/F 120 without using the above-described DTCP, the input/output I/F 120 determines that the received content may be copied.

It is assumed that the recording/playback device 100 is a device based on the DTCP which executes the process in accordance with the DTCP. The DTCP defines 2-bit EMI (Encryption Mode Indicator) as copy control information for controlling copying. When the EMI is "00B", where B indicates that the adjacent value is a binary number, the content is of a "Copy-freely" type. When the EMI is "01B", the content is of a "No-more-copies" type in which the content may not be copied further. When the EMI is "10B", the content is a "Copy-one-generation" type in which the content may be copied once. When the EMI is "11B", the content is a "Copy-never" type in which copying of the content is prohibited.

When the signal supplied to the input/output I/F 120 in the recording/playback device 100 includes an EMI, and the EMI is of a Copy-freely or Copy-one-generation type, the input/output I/F 120 determines that the content may be copied. When the EMI is of a No-more-copies or Copy-never type, the input/output I/F 120 determines that the content may not be copied.

In step S702, if the input/output I/F 120 has determined that the content may not be copied, steps S703 to S705 are skipped over and the recording process is terminated. Accordingly, in this case, the content is not recorded on the recording medium 200.

In step S702, if the input/output I/F 120 has determined that the content may be copied, the process goes to step S703. After that, steps S703, S704, and S705 are performed which are similar to steps S12, S13, and S14 shown in FIG. 3A. In other words, the addition by the TS processing unit 300 of the arrival time stamp to the transport packet, and encryption processing by the cryptosystem processing unit 150 are executed. The resultant encrypted content is recorded on the recording medium 200, and the recording process is terminated.

The EMI is included in the digital signal supplied to the input/output I/F 120 so that when the digital content is recorded, an EMI or information (e.g., embedded CCI in the DTCP, etc.) which represents a copy-control status similar to the EMI are also recorded with the digital content.

In the recording, in general, information which represents a Copy-one-generation type is recorded after being converted into information which represents a No-more-copies type so that more copies are not allowed.

In a recording/playback device of the present invention, copy control information, such as an EMI or embedded CCI, is recorded in a form in which it is added to the TS packet. In other words, 32 bits which include an arrival time stamp having 24 to 30 bits and copy control information, as shown in example 2 and example 3 of FIG. 10, are added to each TS packet, as shown in FIG. 5.

Figure 33B:
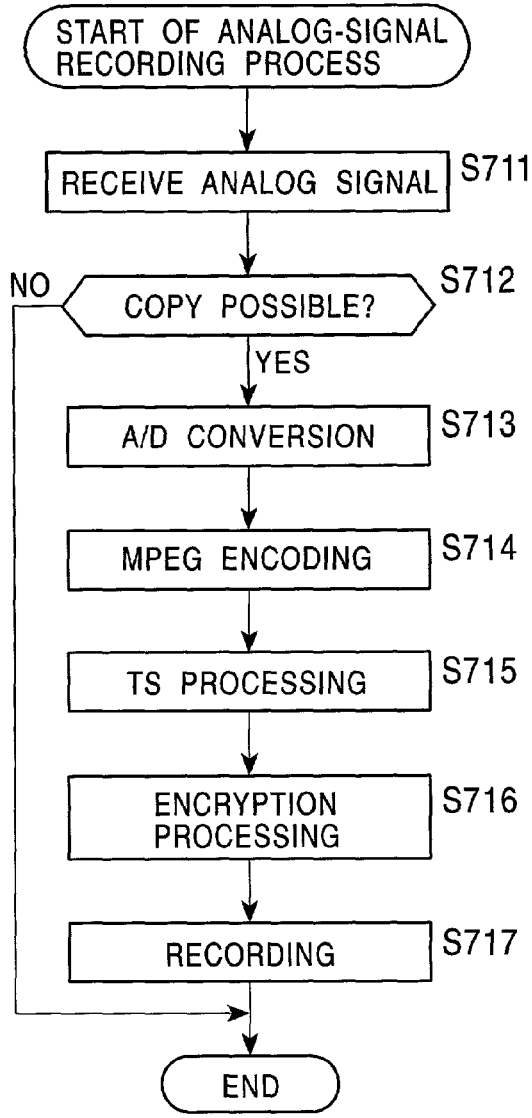

When analog signal content from the exterior is recorded on the recording medium 200, the recording process in accordance with the flowchart shown in FIG. 33B is performed. According to this recording process, when the analog signal content is supplied to the input/output I/F 140, the input/output I/F 140 receives the analog signal content in step S711 and goes to step S712. In step S712, the analog signal content determines whether the received analog signal content may be copied.

The determination in step S712 is performed by, for example, determining whether the signal received by the input/output I/F 140 includes a Macrovision signal or a CGMS-A (Copy Generation Management System-Analog) signal. The Macrovision signal is a signal that becomes noise after being recorded on a VHS videocassette tape. When this is included in the signal received by the input/output I/F 140, the input/output I/F 140 determines that the analog content may not be copied.

The CGMS-A signal is such that a CGMS signal for use in digital signal copy control is applied to analog signal copy control. The CGMS-A signal represents either a Copy-freely type in which the content may be freely copied, a Copy-one-generation type in which the content may be copied only once, or a Copy-never type in which copying of the content is prohibited.

Accordingly, when the CGMS-A signal is included in the signal received by the input/output I/F 140 and represents either the Copy-freely type or the Copy-one-generation type, it is determined that the analog content may be copied. When the CGMS-A signal represents the Copy-never type, it is determined that the analog content may not be copied.

In addition, for example, when neither the Macrovision signal nor the CGMS-A signal are included in the signal received by the input/output I/F 140, it is determined that the analog content may be copied.

In step S712, if the input/output I/F 140 has determined that the analog content may not be copied, it skips over steps S713 to S717 and terminates the recording process. Accordingly, in this case, the content is not recorded on the recording medium 200.

In step S712, if the input/output I/F 140 has determined that the analog content may be copied, it goes to step S713. After that, steps S713 to S717 are performed which are similar to steps S22 to S26 shown in FIG. 3B, whereby after performing MPEG encoding, TS processing, and encryption processing, the content is recorded on the recording medium 200 and the recording ends.

When the analog signal received by the input/output I/F 140 includes the CGMS-A signal, and the analog content is recorded on the recording medium 200, the CGMS-A 'signal is also recorded. The CGMS-A signal is recorded in the copy control information or the other information shown in FIG. 10. In the recording, in general, information which represents a Copy-one-generation type is recorded after being converted into information which represents a No-more-copies type so that more copies are not allowed. Although in the system, copy control information such as the Copy-one-generation type may be recorded without being converted into the No-more-copies type, this does not apply to the case in which there is a rule that the copy control information is treated as the No-more-copies type.

Copy Control in Playback Processing

Next, in a case in which the content recorded on the recording medium 200 is played back and output as digital content to the exterior, the playback process in accordance with the flowchart shown in FIG. 34A is performed. According to the process, steps S801, S802, and S803 are performed first. Steps S801, S802 and S803 are similar to steps S31, S32, and S33 shown in FIG. 4A, whereby the encrypted content read from the recording medium 200 is decrypted in the cryptosystem processing unit 150 and is processed by TS processing. The processed digital content is supplied to the input/output I/F 120 via the bus 110.

In step S804, the input/output I/F 120 determines whether the supplied digital content may be later copied. In other words, when the digital content supplied to the input/output I/F 120 does not include an EMI or information (copy control information) representing a copy control status, it is determined that the content may be later copied.

When the digital content supplied to the input/output I/F 120 includes copy control information such as an EMI, that is, when copy control information such as an EMI is recorded in accordance with the DTCP in content recording, and the recorded copy control information (recorded EMI) is of the Copy-freely type, it is determined that the content may be later copied. When the copy control information such as an EMI is of the No-more-copies type, it is determined that the content may not be later copied.

In general, there is no case in which the recorded copy control information (EMI) is of the Copy-one-generation type or Copy-never type. This is because the Copy-one-generation type of EMI is converted to the No-more-copies type of EMI when performing recording, and because digital content having the Copy-never type of EMI is not recorded on a recording medium.

In step S804, if the input/output I/F 120 has determined that the digital content may be later copied, it goes to step S805, and outputs the digital content to the exterior. After that, the playback process ends.

In step S804, if the input/output I/F 120 has determined that the digital content may not be later copied, it goes to step S806. In step S806, the input/output I/F 120 outputs the digital content to the exterior in accordance with the DTCP so that the digital content cannot be later copied. After that, the playback process ends.

In other words, when the recorded copy control information (EMI) is of the No-more-copies type, or in a case in which the system has a rule that the Copy-one-generation type of copy control information is recorded without being converted into the No-more-copies type of copy control information, and the copy control information (EMI) recorded under the rule is of the Copy-one-generation type, the content may not be copied again.

Accordingly, the input/output I/F 120 performs mutual authentication with another device in accordance with the DTCP standard. When the device is right (or is based on the DTCP standard), the digital content is encrypted and output to the exterior.

Next, in a case in which the content recorded on the recording medium is played back and output as analog content to the exterior, a playback process in accordance with the flowchart shown in FIG. 34B is performed. According to the process, steps S811 to S815 are performed first. Steps S811 to S815 are similar to steps S41 to S45 shown in FIG. 4B. In other words, the reading of the encrypted content, TS processing, MPEG decoding, and D/A conversion are executed. The obtained analog content is received by the input/output I/F 140.

In step S816, the input/output I/F 140 determines whether the supplied content may be copied. If copy control information such as an EMI is not recorded with the content, the input/output I/F 140 determines that the content may be copied.

In a case in which, when recording the content, copy control information such as an EMI is recorded in accordance with the DTCP, and the copy control information is of the Copy-freely type, the input/output I/F 140 determines that the content may be later copied.

When the copy control information is of the No-more-copies type, or when in the system there is, for example, a rule that the Copy-one-generation type of copy control information is recorded without being converted and is treated as the No-more-copies type of copy control information, and copy control information recorded under the condition is of the Copy-one-generation type, the input/output I/F 140 determines that the content may not be later copied.

When the analog content supplied to the input/output I/F 140 includes, for example, a CGMS-A signal, in other words, in a case in which, when recording the content, the CGMS-A signal is recorded with the content, and the CGMS-A signal represents the Copy-freely type, it is determined that the analog content may be later copied. If the CGMS-A signal represents the Copy-never type, it is determined that the analog content may not be later copied.

In step S816, if the input/output I/F 140 has determined that the analog content may be later copied, it goes to step S817. In step S817, the input/output I/F 140 outputs the supplied analog signal to the exterior and terminates the playback process.

In step S816, if the input/output I/F 140 has determined that the content may not be later copied, it goes to step S818. In step S818, the input/output I/F 140 outputs the analog content to the exterior in a form in which the analog content cannot be later copied, and the playback process ends.

For example, when the recorded copy control information is of the No-more-copies type, as described above, or in a case in which in the system there is a rule that the Copy-one-generation type of copy control information is recorded without being converted and is treated as the No-more-copies type, and the copy control information recorded under the condition is of the Copy-one-generation type, the content may not be copied again.

Therefore, after adding, for example, a Macrovision signal or a CGMS-A signal representing a Copy-never type to the analog content, the input/output I/F 140 outputs the obtained content to the exterior. Also, when the recorded CGMS-A signal represents a Copy-never type, the content may not be copied again. Accordingly, after changing the CGMS-A signal to represent a Copy-never type, the input/ output I/F 140 outputs the changed CGMS-A signal to the exterior with the analog content.

As described above, by recording or playing back content while performing content-copy control, copying (unauthorized copying) beyond the allowable range of the content can be prevented.

Structure of the Data Processing Unit

Figure 35:
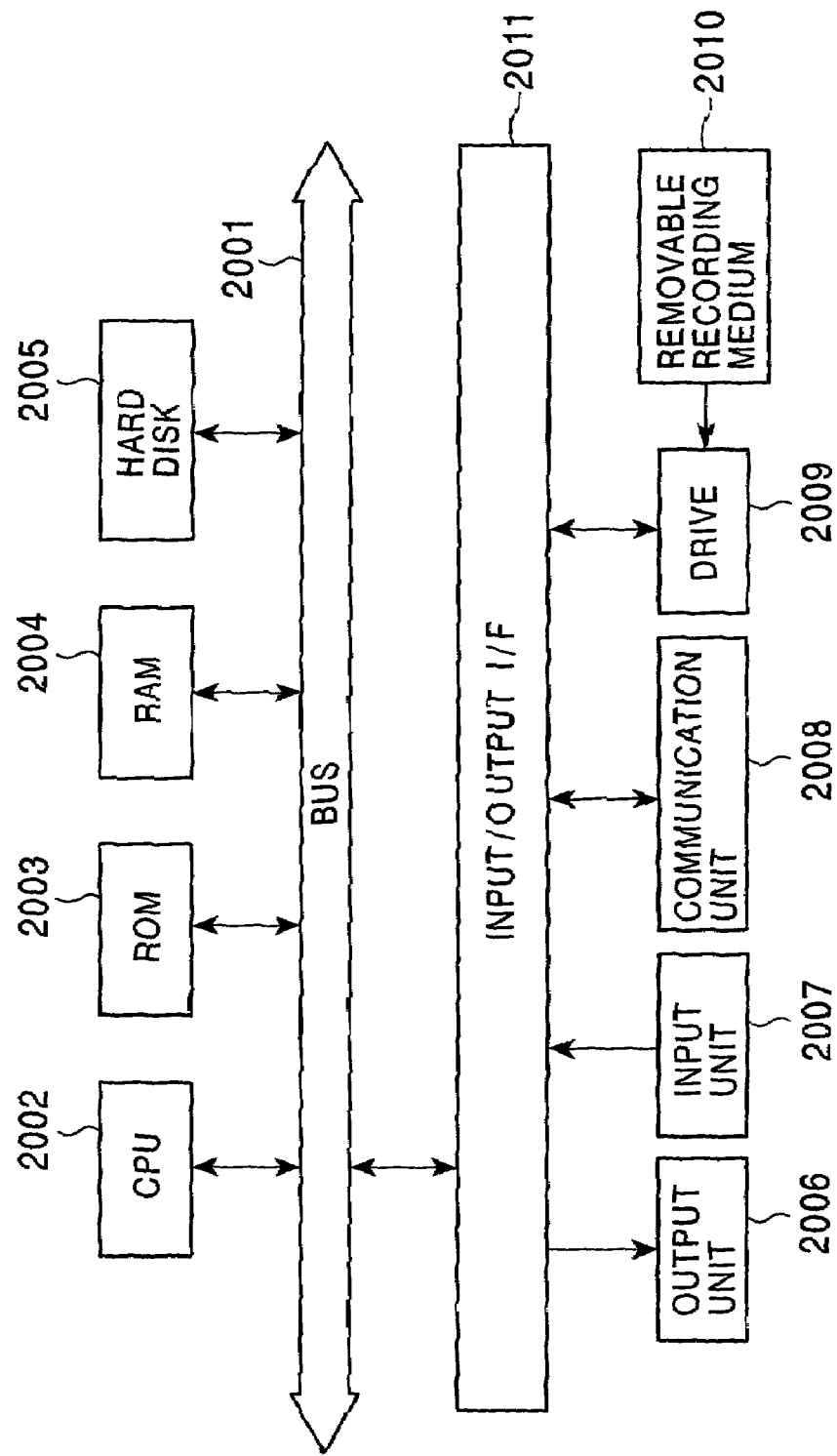
FIG. 35 is a block diagram showing a processing configuration in the case of using software to perform data processing.

The above successive processes can be performed not only by hardware but also by software. For example, although the cryptosystem processing unit 150 can be formed by an encryption/decryption LSI, processing by the cryptosystem processing unit 150 can be executed such that a general-purpose computer or a single-chip microcomputer executes programs. Similarly, processing by the TS processing unit 300 can be also performed by software. When software is used to perform successive processes, programs constituting the software are installed in a device such as a general-purpose computer or a single-chip microcomputer. FIG. 35 shows an example of a computer in which programs for executing the successive processes are installed.

The programs can be recorded beforehand on a hard disk 2005 or a read-only memory (ROM) 2003 as a recording medium which is built into the computer. Alternatively, the programs can be temporarily or externally stored (recorded) in a removable recording medium 2010 such as a floppy disk, a CD-ROM, a magneto-optical disk, a digital versatile disk, a magnetic disk, or a semiconductor memory. The removable recording medium 2010 can be provided in the form of so-called "packaged software".

In addition to the installation of the programs from the removable recording medium 2010, after transmitting the programs from a download site to the computer via a satellite by wireless digital satellite broadcasting or by wire via a network such as the Internet, the transmitted programs may be received in a communication unit 2008 and can be installed in the hard disk 2005 in the computer.

The computer includes a CPU 2002. An input/output interface (I/F) 2011 is connected to the CPU 2002 via a bus 2001. When a command is input by a user operating an input unit 2007 having a keyboard and a mouse, the CPU 2002 executes a program stored in a read-only memory (ROM) 2003 in accordance with the input command.

Also, the program stored in the hard disk 2005, the program installed in the hard disk 2005 after being transmitted via a satellite or a network and received by the communication unit 2008, or the program installed in the hard disk 2005 after being read from the removable recording medium 2010, is loaded in a random access memory (RAM) 2004 and is executed in the CPU 2002.

This allows the CPU 2002 to perform the above processes in accordance with the above flowcharts or the processes performed by the block diagrams. The CPU 2002 outputs the obtained results from an output unit 2006 having a liquid crystal display (LCD), a speaker, etc., transmits the results from the communication unit 2008, and records the results on the hard disk 2005, as required.

Here, in this specification, processing steps that describe each program for controlling the computer to perform various types of processing do not always need to be time-sequentially performed along the order in flowchart form, and include processes (e.g., parallel processes or object-based processes) which are executed in parallel or separately.

Each program may be executed either by a single computer or by a plurality of computers. Each program may be executed after being transferred to a remote computer.

In the second embodiment, a case in which a content encryption/decryption block is formed by a single-chip encryption/decryption LSI has been mainly described. However, the content encryption/decryption block can be implemented as a software module executed by the CPU 170 in FIG. 1. Similarly, processing by the TS processing unit 300 can be implemented as a software module executed by the CPU 170.

The present invention has been described with reference to specified embodiments. However, it is obvious that a person skilled in the art will make a modification or substitution of the embodiments without departing the spirit of the present invention. In the foregoing embodiments, the present invention has been exemplified and should not be limitedly interpreted. To determine the spirit and scope of the present invention, the following claims should be considered.

The invention claimed is:

1. An information playback device for playing back information from a recording medium having encrypted content recorded thereon by a content recording entity, the information playback device comprising:

a cryptosystem unit operable to determine the validity of a public key certificate of the content recording entity, to acquire a public key of the content recording entity from the public key certificate if the public key certificate is valid, and to decrypt the encrypted content if the validity of a digital signature of the content recording entity is verified based on the acquired public key;

whereby the device corresponds to a leaf of a key-tree structure, said key-tree structure including a plurality of nodes and a plurality of leaves, said plurality of nodes including a root node, and each of said nodes and each of said leaves corresponding to a respective encryption key; and whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

2. An information playback device according to claim 1, wherein the digital signature of the content recording entity is generated by digitally signing the encrypted content, and the cryptosystem unit decrypts the encrypted content if the validity of the generated digital signature is verified.

3. An information playback device according to claim 1, wherein the digital signature of the content recording entity is generated by digitally signing a title key which corresponds to the encrypted content, and the cryptosystem unit decrypts the encrypted content if the validity of the generated digital signature is verified.

4. An information playback device according to claim 1, wherein the cryptosystem unit is operable to acquire decryption-key-generating data required for decrypting the encrypted content by decrypting an enabling key block composed of data generated by using each key on the node path to encrypt a next adjacent upper key on the node path.

5. An information playback device according to claim 4, wherein the decryption-key-generating data is a master key common to the plurality of different information playback devices or a media key unique to the recording medium.

6. An information recording device for recording information on a recording medium, the information recording device comprising:
a cryptosystem unit operable to encrypt content recorded on the recording medium by a content recording entity, to generate a digital signature of the content recording entity, and to record the encrypted content, the digital signature, and a public key certificate of the content recording entity on the recording medium so as to correspond to one another;
whereby the recording medium is operable with a device that corresponds to a leaf of a key-tree structure, said key-tree structure including a plurality of nodes and a plurality of leaves, said plurality of nodes including a root node, and each of said nodes and each of said leaves corresponding to a respective encryption key; and
whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

7. An information recording device according to claim 6, further comprising:
a processing unit operable to generate a management table having correspondences among addresses of the encrypted content, the digital signature, and the public key certificate, and to record the management table on the recording medium.

8. An information recording device according to claim 6, wherein the cryptosystem unit is operable to generate the digital signature of the content recording entity by digitally signing the encrypted content, and to record the generated digital signature in association with the encrypted content.

9. An information recording device according to claim 6, wherein the cryptosystem unit is operable to generate the digital signature of the content recording entity by digitally signing a title key which corresponds to the encrypted content, and to record the generated digital signature in association with the encrypted content.

10. An information recording device according to claim 6, wherein the cryptosystem unit is operable to acquire encryption-key-generating data required for encrypting the content recorded on the recording medium by decrypting an enabling key block composed of data generated by using each key in the node path to encrypt a next adjacent upper key on the node path.

11. An information recording device according to claim 10, wherein the encryption-key-generating data is a master key common to the plurality of different information playback devices or a media key unique to the recording medium.

12. A method for playing back information from a recording medium having encrypted content recorded thereon by a content recording entity, the method comprising:
determining the validity of a public key certificate of the content recording entity;
acquiring a public key of the content recording entity from the public key certificate if the public key certificate is valid;
verifying the validity of a digital signature of the content recording entity based on the acquired public key; and
decrypting the encrypted content if the validity of the digital signature is verified;
whereby the method is implemented on a device for playing back information from the recording medium and the device corresponds to a leaf of a key-tree structure, said key-tree structure including a plurality of nodes and a plurality of leaves, said plurality of nodes including a root node, and each of said nodes and each of said leaves corresponding to a respective encryption key; and
whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

13. An information playback method according to claim 12, further comprising:
generating the digital signature of the content recording entity by digitally signing the encrypted content, wherein the step of verifying the validity of the digital signature includes verifying the validity of the generated digital signature.

14. An information playback method according to claim 12, further comprising:
generating the digital signature of the content recording entity by digitally signing a title key which corresponds to the encrypted content, wherein the step of verifying the validity of the digital signature includes verifying the validity of the generated digital signature.

15. An information playback method according to claim 12, further comprising:
acquiring decryption-key-generating data required for decrypting the encrypted content by decrypting an enabling key block composed of the key data.

16. A method for recording information on a recording medium, comprising:
encrypting content recorded on the recording medium by a content recording entity;
generating a digital signature of the content recording entity; and
recording the encrypted content, the digital signature, and a public key certificate of the content recording entity on the recording medium so as to correspond to one another;
whereby the recording medium is operable with a device that corresponds to a leaf of a key-tree structure, said key-tree structure including a plurality of nodes and a plurality of leaves, said plurality of nodes including a root node, and each of said nodes and each of said leaves corresponding to a respective encryption key; and
whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

17. An information recording method according to claim 16, further comprising:
generating a management table having correspondences among addresses of the encrypted content, the digital signature, and the public key certificate; and
recording the management table on the recording medium.

18. An information recording method according to claim 16, further comprising generating the digital signature of the content recording entity by digitally signing the encrypted content; and
recording the generated digital signature on the recording medium in association with the encrypted content.

19. An information recording method according to claim 16, further comprising:
generating the digital signature of the content recording entity by digitally signing a title key which corresponds to the encrypted content; and
recording the generated digital signature on the recording medium in association with the encrypted content.

20. An information recording method according to claim 16, further comprising:
acquiring encryption-key-generating data required for encrypting the content recorded on the recording medium by decrypting an enabling key block composed of the key data.

21. A computer-readable medium, comprising:
encrypted content recorded thereon by a content recording entity;
identification data for identifying the content recording entity;
a public key certificate of the content recording entity; and
a digital signature of the content recording entity;
whereby the medium is operable with a device that corresponds to a leaf of a key-tree structure, said key-tree structure including a plurality of nodes and a plurality of leaves, said plurality of nodes including a root node, and each of said nodes and each of said leaves corresponding to a respective encryption key; and
whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

22. An information recording medium according to claim 21, further comprising:
a management table having correspondences among addresses of the encrypted content, the digital signature, and the public key certificate.

23. A program storage medium storing a computer program for controlling a computer system to execute a process for playing back information from a recording medium having encrypted content recorded thereon by a content recording entity, the computer program comprising:

determining the validity of a public key certificate of the content recording entity;
acquiring a public key of the content recording entity from the public key certificate if the public key certificate is valid;
verifying the validity of a digital signature of the content recording entity based on the acquired public key; and
decrypting the encrypted content if the validity of the digital signature is verified;
whereby the computer system corresponds to a leaf of a key-tree structure, said key-tree structure including a plurality of nodes and a plurality of leaves, said plurality of nodes including a root node, and each of said nodes and each of said leaves corresponding to a respective encryption key; and
whereby decryption by the computer system of said encrypted content is selectively inhibited by changing all keys corresponding to nodes included in a node path between said leaf corresponding to the computer system and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the computer system's leaf key.

24. A program storage medium storing a computer program for controlling a computer system to execute a process for recording information on a recording medium, the computer program comprising:
encrypting content recorded on the recording medium by a content recording entity;
generating a digital signature of the content recording entity; and
recording the encrypted content, the digital signature, and a public key certificate of the content recording entity on the recording medium so as to correspond to one another;
whereby the recording medium is operable with a device that corresponds to a leaf of a key-tree structure, said key-tree structure including a plurality of nodes and a plurality of leaves, said plurality of nodes including a root node, and each of said nodes and each of said leaves corresponding to a respective encryption key; and
whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

25. An information playback device for playing back information from a recording medium having encrypted content recorded thereon by a content recording entity, the information playback device comprising:
a cryptosystem unit operable to acquire from the recording medium identification data representing the content recording entity, to determine a revocation state of the content recording entity based on the acquired identification data, and to decrypt the encrypted content if the content recording entity has not been revoked;

whereby the device corresponds to a leaf of a key-tree structure, said key-tree structure including a plurality of nodes and a plurality of leaves, said plurality of nodes including a root node, and each of said nodes and each of said leaves corresponding to a respective encryption key; and whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

26. An information playback device according to claim 25, wherein the cryptosystem unit is operable to determine the validity of a public key certificate of the content recording entity, to acquire data identifying the content recording entity from the public key certificate if the public key certificate is valid, and to determine whether the content recording entity has been revoked based on the identifying data.

27. An information playback device according to claim 25, wherein the cryptosystem unit is operable to decrypt the encrypted content if the validity of a digital signature of the content recording entity is verified.

28. An information playback device according to claim 25, wherein the cryptosystem unit is operable to determine the validity of a public key certificate of the content recording entity, to acquire a public key of the content recording entity from the public key certificate if the public key certificate is valid, and to decrypt the encrypted content if the validity of a digital signature of the content recording entity is verified based on the public key.

29. An information playback device according to claim 25, wherein the cryptosystem unit is operable to determine the validity of a digital signature of the content recording entity generated by digitally signing the encrypted content, and to decrypt the encrypted content if the digital signature is valid.

30. An information playback device according to claim 25, wherein the cryptosystem unit is operable to determine the validity of a digital signature of the content recording entity generated by digitally signing a title key corresponding to the encrypted content, and to decrypt the encrypted content if the digital signature is valid.

31. An information playback device according to claim 25, wherein the cryptosystem unit is operable to determine the validity of a public key certificate of the content recording entity, to acquire data identifying the content recording entity from the public key certificate if the public certificate is valid, and to determine whether the content recording entity has been revoked based on a comparison between the identifying data and an identification stored in a revocation list.

32. An information playback device according to claim 25, wherein the cryptosystem unit is operable to determine the validity of a public key certificate of the content recording entity, to acquire data identifying the content recording entity from the public key certificate if the public key certificate is valid, and to determine whether the content recording entity has been revoked by executing a process, based on the identifying data, of following the indices of an enabling key block composed of data generated by using each of the keys on a selected path to encrypt a next adjacent upper key on the selected path.

33. An information playback device according to claim 25, wherein the cryptosystem unit is operable to acquire decryption-key-generating data required for decrypting the encrypted content by decrypting an enabling key block composed of data generated by using each of the keys on the node path to encrypt a next adjacent upper key on the node path.

34. An information playback device according to claim 33, wherein the decryption-key-generating data is a master key common to the plurality of different information playback devices or a media key unique to the recording medium.

35. A method for playing back information from a recording medium having encrypted content recorded thereon by a content recording entity, the method comprising:

acquiring from the recording medium identification data representing the content recording entity;

determining a revocation state of the content recording entity based on the acquired identification data; and decrypting the encrypted content if the content recording entity has not been revoked;

whereby the method is implemented on a device for playing back information from the recording medium and said device corresponds to a leaf of a key-tree structure, said key-tree structure including a plurality of nodes and a plurality of leaves, said plurality of nodes including a root node, and each of said nodes and each of said leaves corresponding to a respective encryption key; and whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

36. An information playback method according to claim 35, further comprising:

determining the validity of a public key certificate of the content recording entity;

acquiring data identifying the content recording entity from the public key certificate if the public key certificate is valid; and determining whether the content recording entity has been revoked based on the identifying data.

37. An information playback method according to claim 35, further comprising:

verifying the validity of a digital signature of the content recording entity; and decrypting the encrypted content if the validity of the digital signature is verified.

38. An information playback method according to claim 35, further comprising:

determining the validity of a public key certificate of the content recording entity;

acquiring a public key of the content recording entity from the public key certificate if the public key certificate is valid;

verifying the validity of a digital signature of the content recording entity based on the public key; and decrypting the encrypted content if the validity of the digital signature is verified.

39. An information playback method according to claim 35, further comprising:

verifying the validity of a digital signature of the content recording entity generated by digitally signing the encrypted content; and decrypting the encrypted content if the digital signature is valid.

40. An information playback method according to claim 35, further comprising:

verifying the validity of a digital signature of the content recording entity generated by digitally signing a title key corresponding to the encrypted content; and decrypting the encrypted content if the digital signature is valid.

41. An information playback method according to claim 35, further comprising:

determining the validity of a public key certificate of the content recording entity;

acquiring data identifying the content recording entity from the public key certificate if the public key certificate is valid; and determining whether the content recording entity has been revoked based on a comparison between the identifying data and an identification stored in a revocation list.

42. An information playback method according to claim 35, further comprising:

determining the validity of a public key certificate of the content recording entity;

acquiring data identifying the content recording entity from the public key certificate if the public key certificate is valid; and determining whether the content recording device has been revoked by executing a process, based on the identifying data, of following the indices of an enabling key block composed of data generated by using each of the keys on a selected path to encrypt a next adjacent upper key on the selected path.

43. An information playback method according to claim 35, further comprising:

acquiring decryption-key-generating data for decrypting the encrypted content by decrypting an enabling key block.

44. A computer-readable medium, comprising:

encrypted content recorded thereon by a content recording entity;

a public key certificate for the content recording entity;

a digital signature of the content recording entity; and a revocation list;

whereby the medium is operable with a device that corresponds to a leaf of a key-tree structure, said key-tree structure including a plurality of nodes and a plurality of leaves, said plurality of nodes including a root node, and each of said nodes and each of said leaves corresponding to a respective encryption key; and whereby decryption by a device of said encrypted content is selectively inhibited by changing all keys corresponding to nodes included in a node path between said leaf corresponding to an inhibited device and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the inhibited device's leaf key.

45. An information recording medium according to claim 44, further comprising:

a management table having correspondences among addresses of the encrypted content, the digital signature, and the public key certificate.

46. A program storage medium storing a computer program for controlling a computer system to execute a process for playing back information from a recording medium having encrypted content recorded thereon by a content recording entity, the computer program comprising:

acquiring from the recording medium identification data representing the content recording entity;

determining a revocation state of the content recording entity based on the acquired identification data; and decrypting the encrypted content if the content recording entity has not been revoked;

whereby the computer system corresponds to a leaf of a key-tree structure, said key-tree structure including a plurality of nodes and a plurality of leaves, said plurality of nodes including a root node, and each of said nodes and each of said leaves corresponding to a respective encryption key; and whereby decryption by the computer system of said encrypted content is selectively inhibited by changing all keys corresponding to nodes included in a node path between said leaf corresponding to the computer system and said root node to generate a plurality of changed keys, said changed keys being propagated through said key-tree structure by encrypting each changed key according to a lower-level changed key, wherein the lowest level node of the key-tree structure to which a changed key is assigned has its said assigned changed key encrypted by a device leaf key other than the computer system's leaf key.

* * * * *

UNITED STATES PATENT AND TRADEMARK OFFICE
CERTIFICATE OF CORRECTION

| | |
|---|---|
| PATENT NO. | : 7,088,822 B2 |
| APPLICATION NO. | : 10/075016 |
| DATED | : August 8, 2006 |
| INVENTOR(S) | : Tomoyuki Asano |

Page 1 of 1

It is certified that error appears in the above-identified patent and that said Letters Patent is hereby corrected as shown below:

Title page, item (74) Attorney, Agent, or Firm "Learner" should read -- Lerner --;

Column 1, Line 13, "2001-034968" should read -- 2001-034969 --;

Column 1, Lines 13-14, "disclosures" should read -- disclosure --;

Column 1, Line 14, "are" should read -- is --;

Column 1, Line 15, insert subtitle -- BACKGROUND OF THE INVENTION --;

Column 10, Line 13, delete "the data a";

Column 27, Line 51, "corresponds" should read -- correspond --.

Signed and Sealed this

Third Day of April, 2007

JON W. DUDAS
*Director of the United States Patent and Trademark Office*